April 28, 1942.  R. L. EWALD ET AL  2,280,813
FRUIT TREATING APPARATUS
Filed Jan. 17, 1938  24 Sheets-Sheet 1

Inventors
Raymond L. Ewald
Henry A. Skog
By: Cox & Moore attys

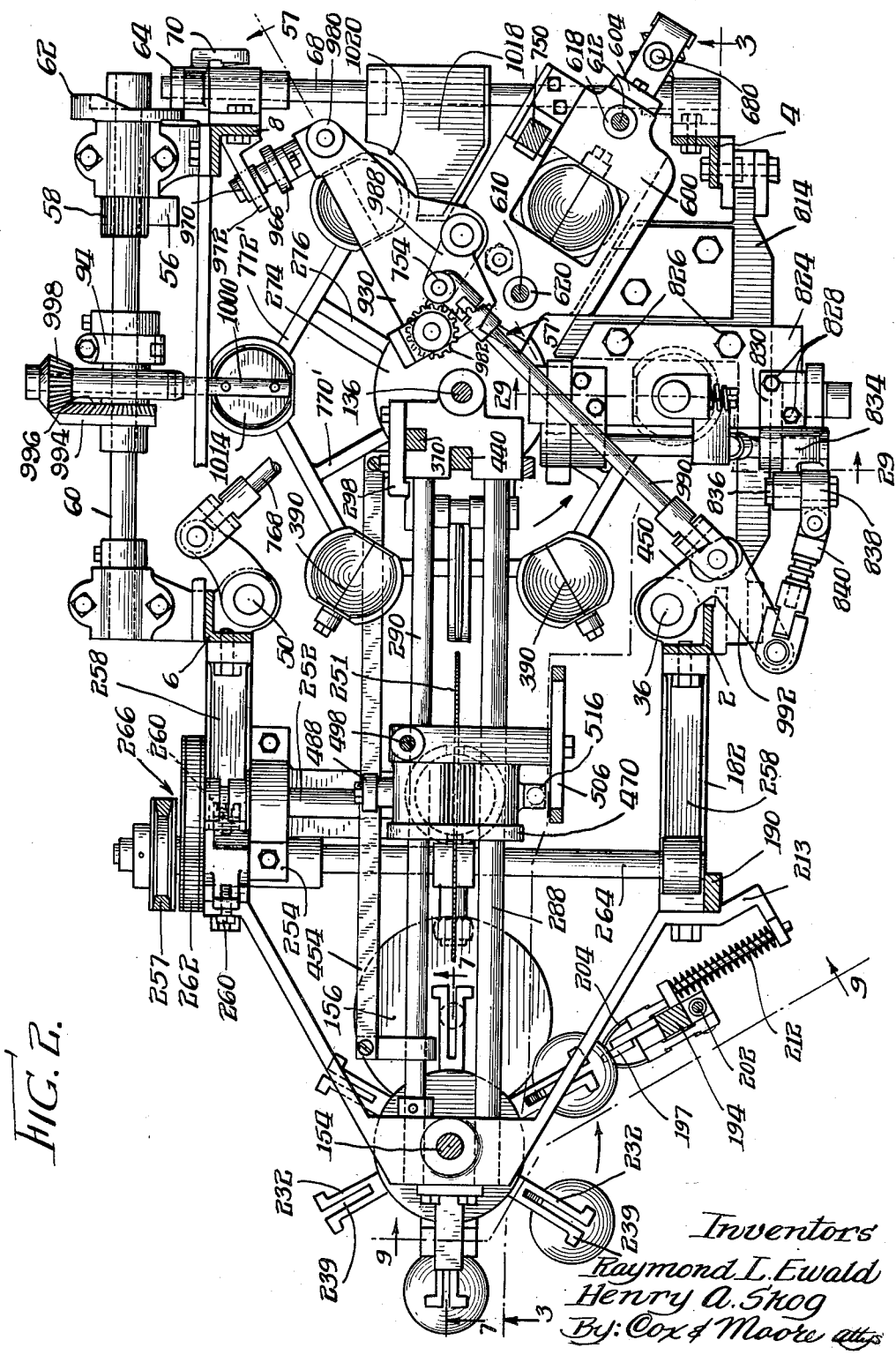

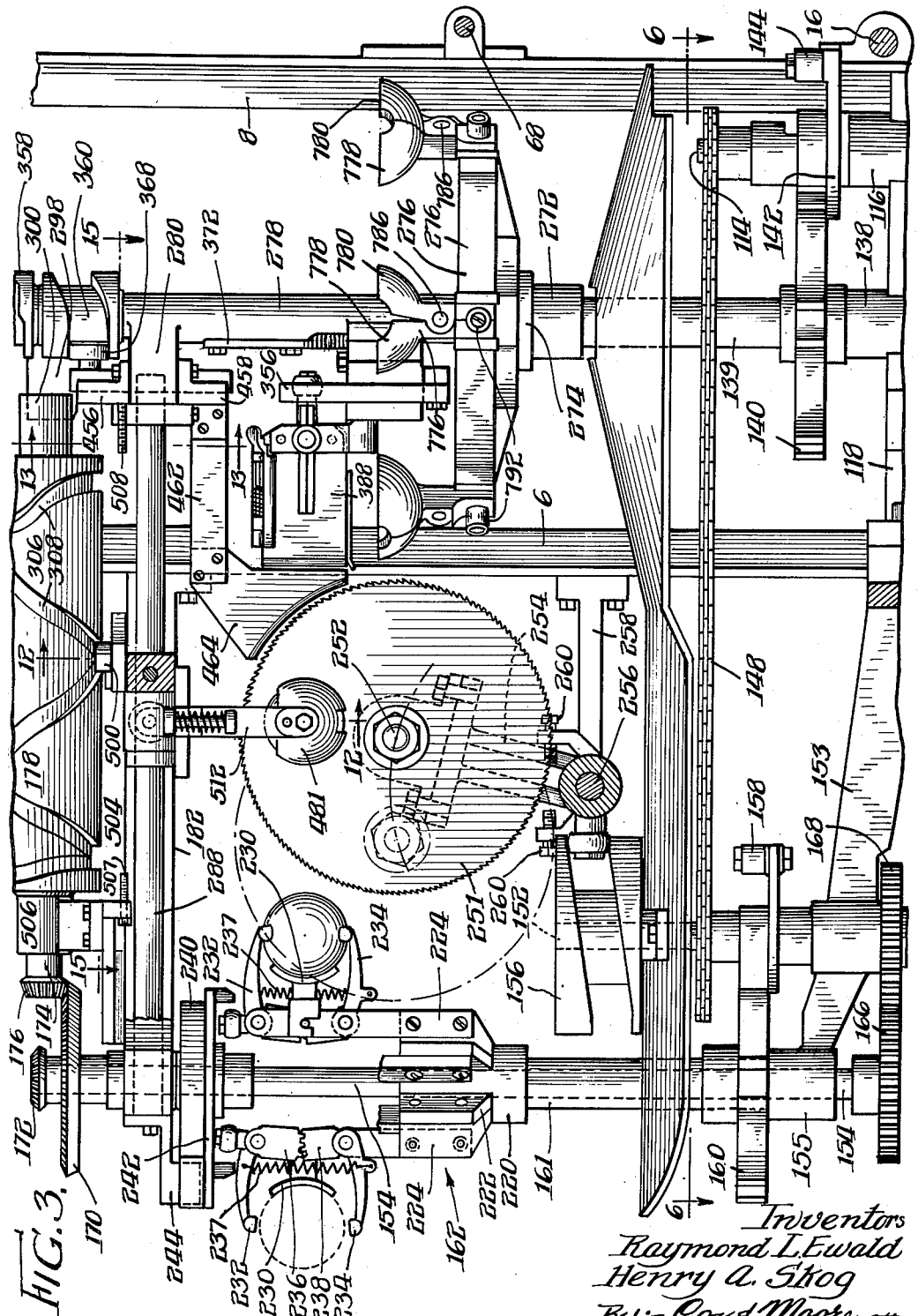

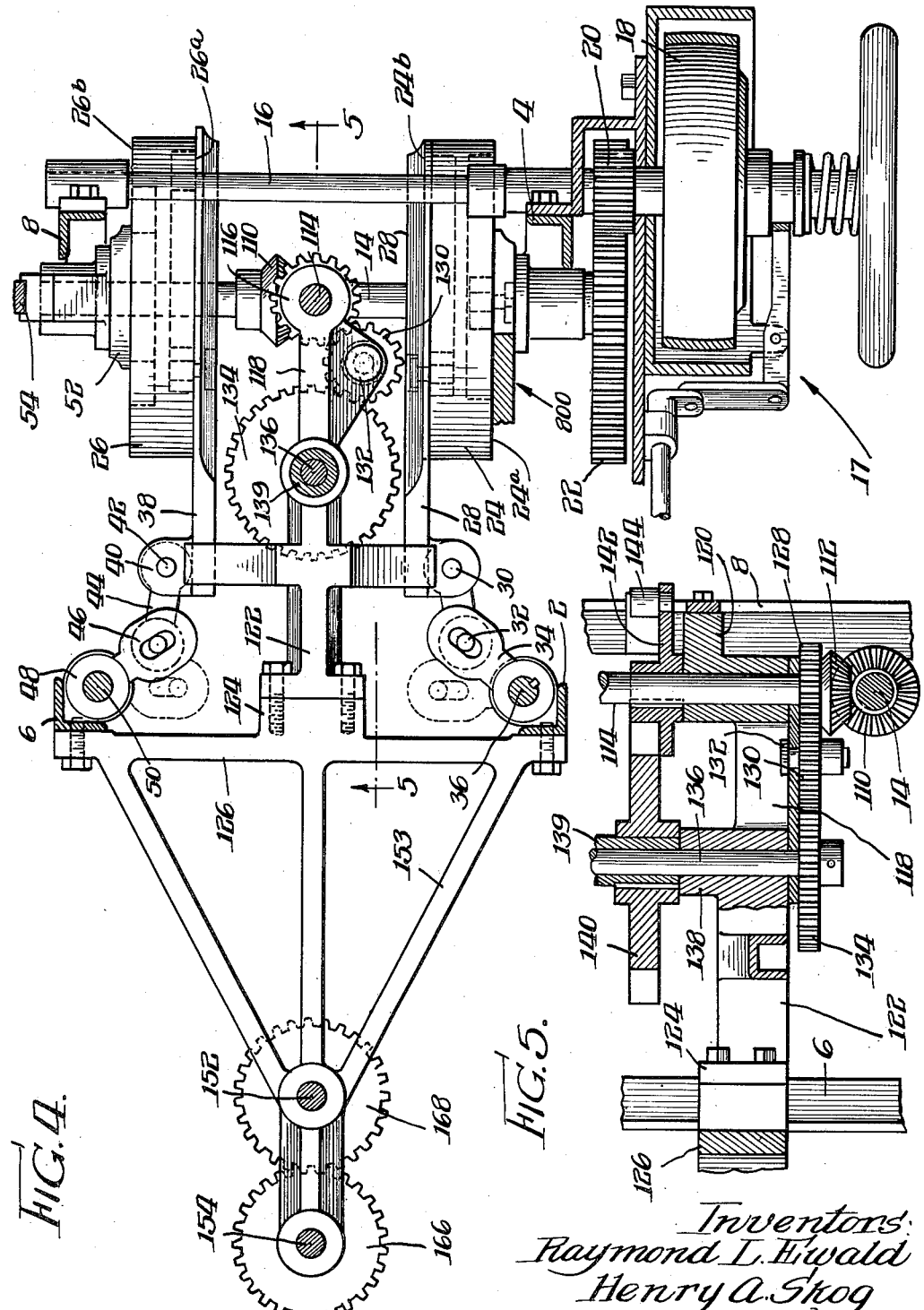

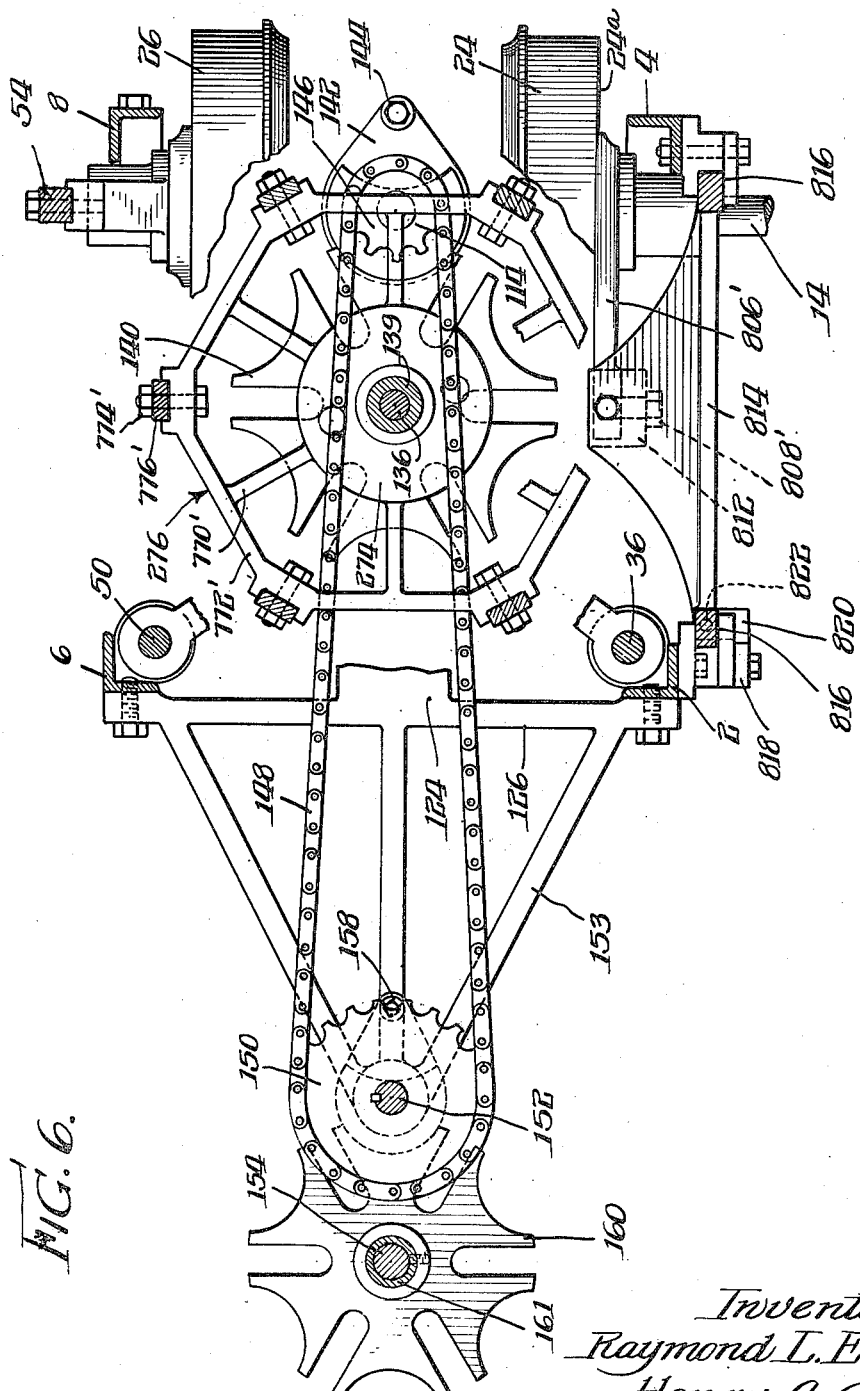

April 28, 1942.  R. L. EWALD ET AL  2,280,813
FRUIT TREATING APPARATUS
Filed Jan. 17, 1938  24 Sheets-Sheet 6

Inventors
Raymond L. Ewald
Henry A. Skog
By: Cox & Moore attys.

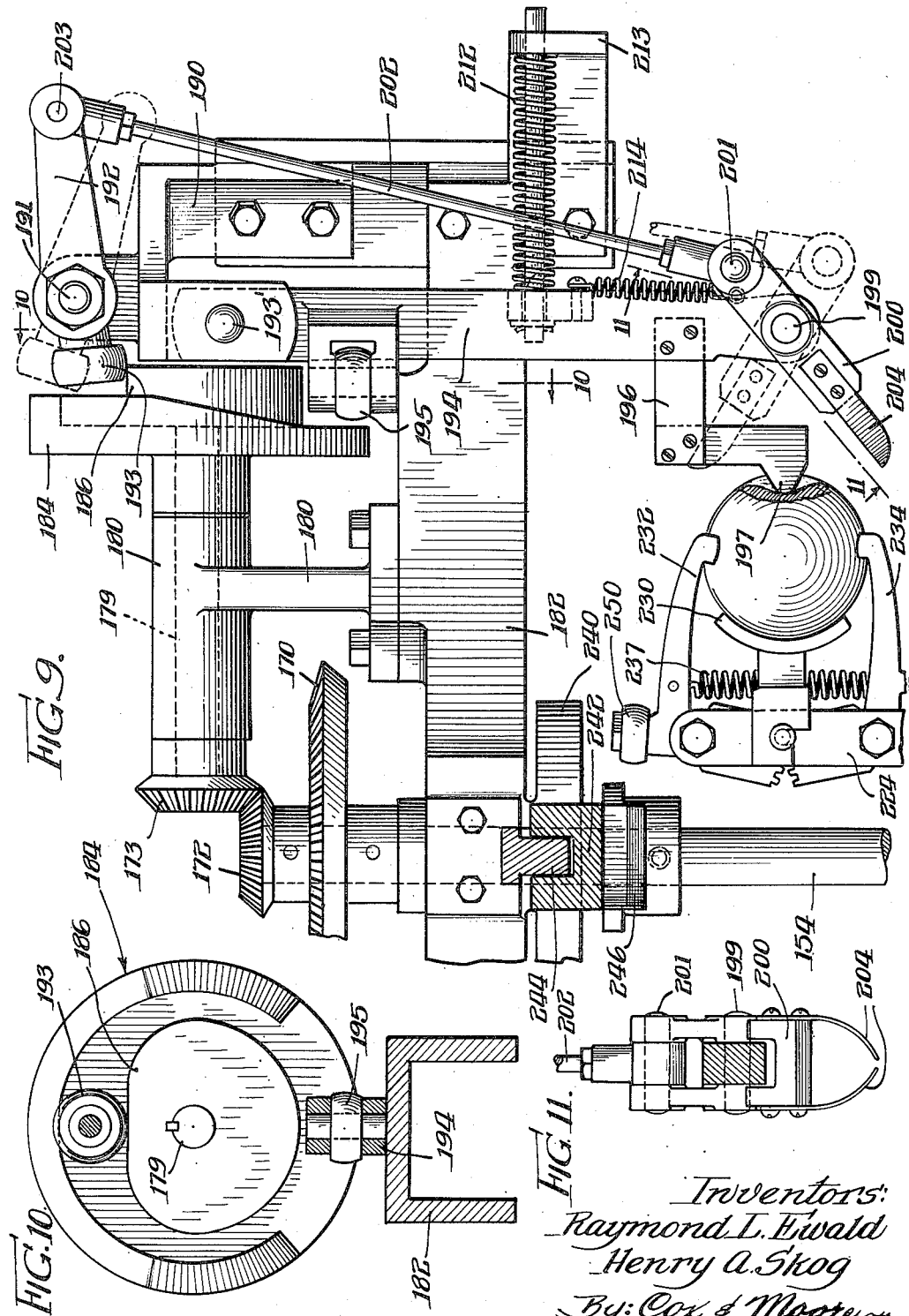

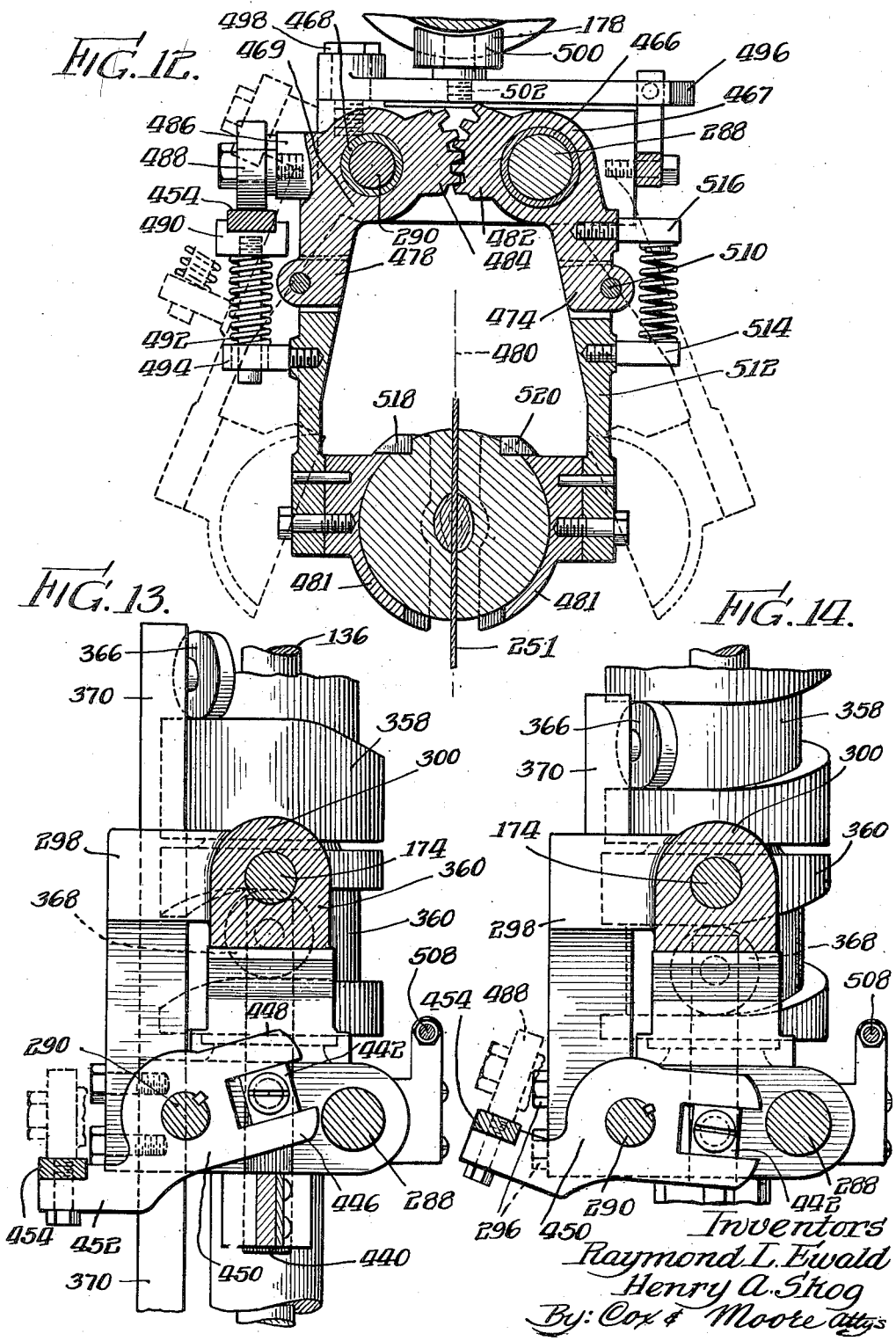

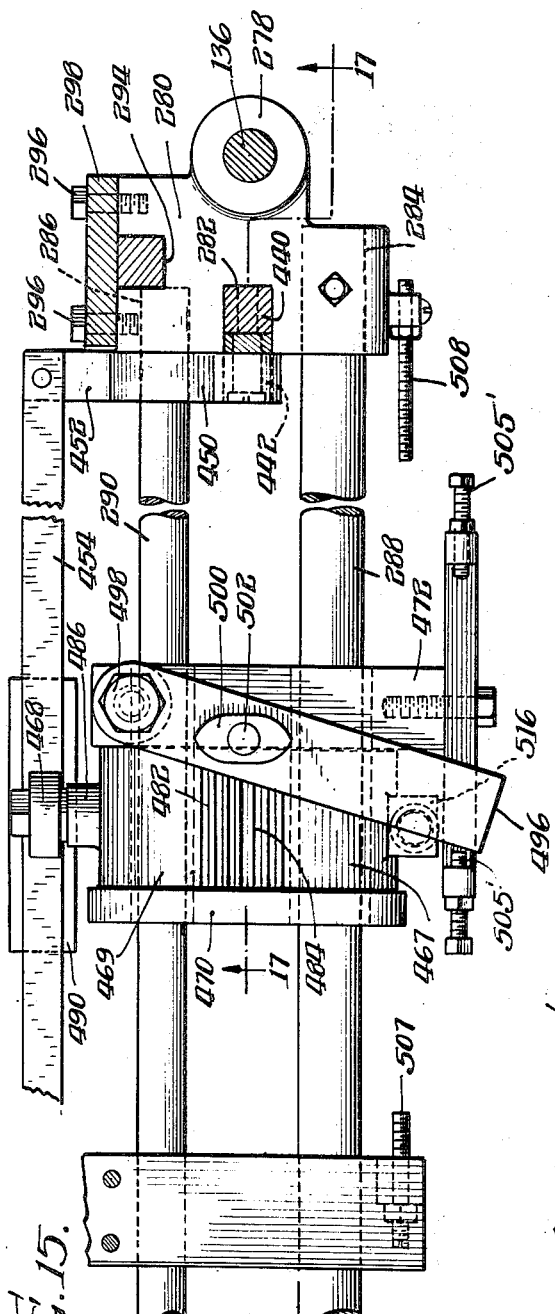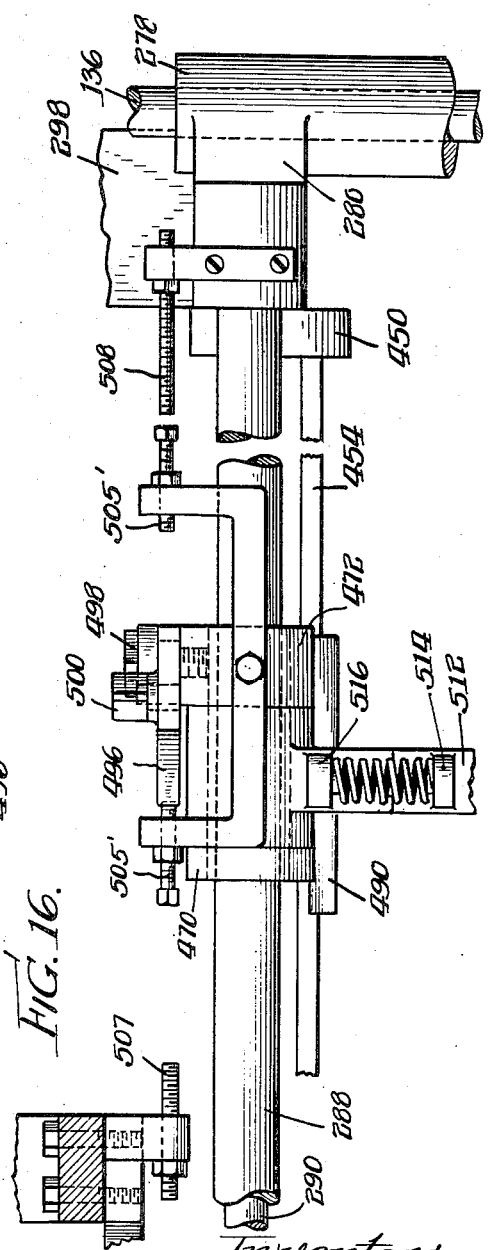

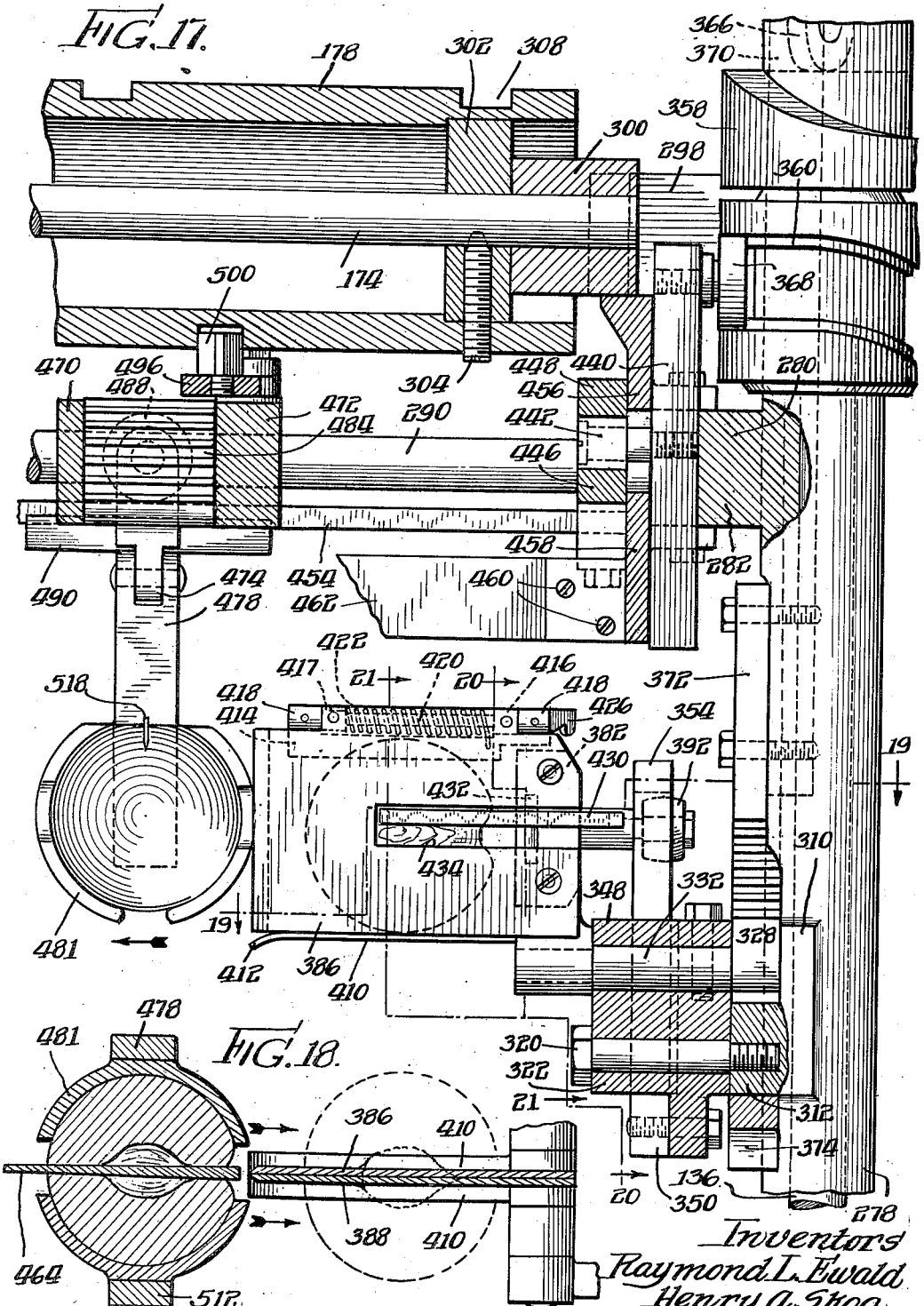

April 28, 1942.   R. L. EWALD ET AL   2,280,813
FRUIT TREATING APPARATUS
Filed Jan. 17, 1938   24 Sheets-Sheet 11

Inventors:
Raymond L. Ewald
Henry A. Skog
By: Cox & Moore attys

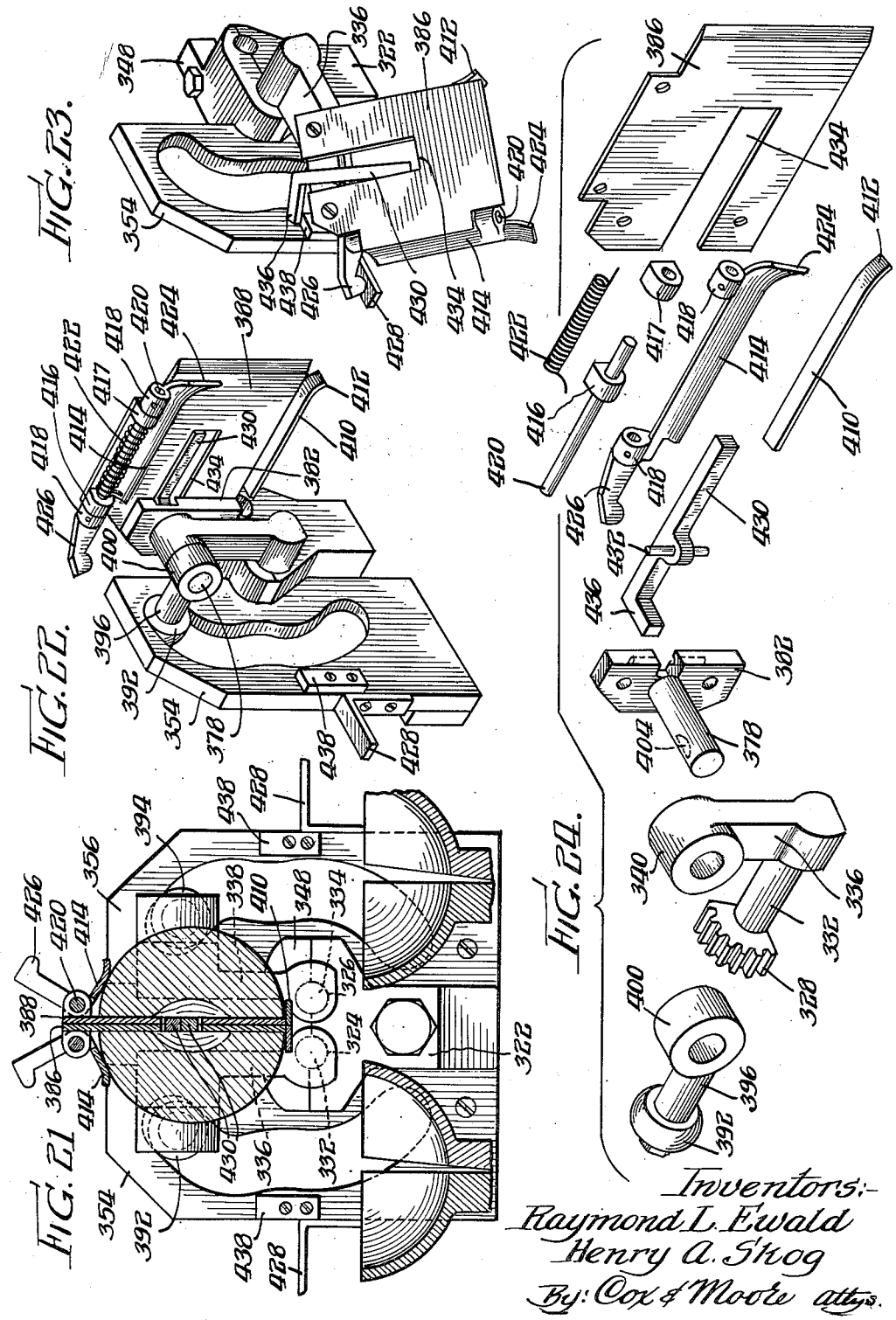

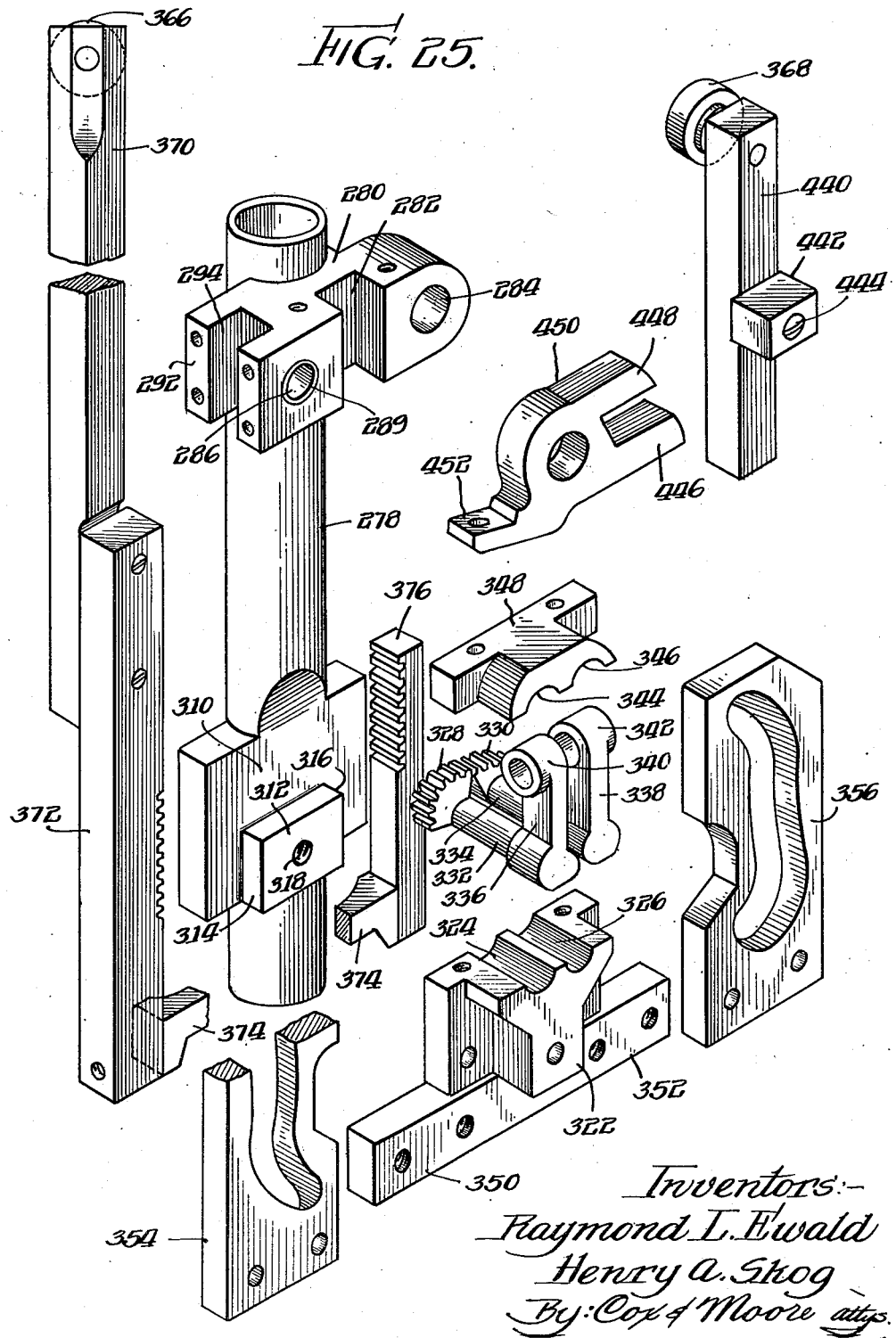

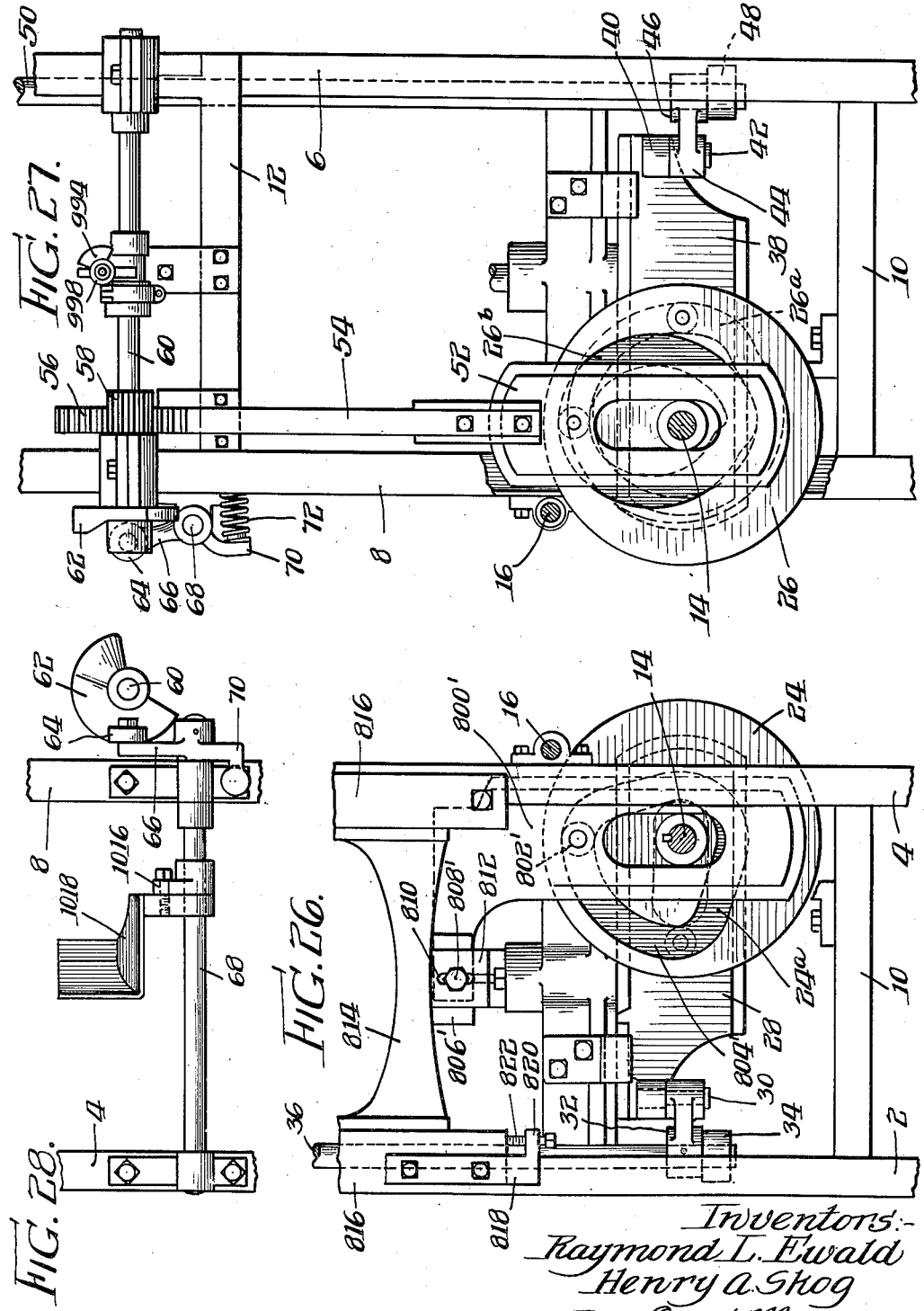

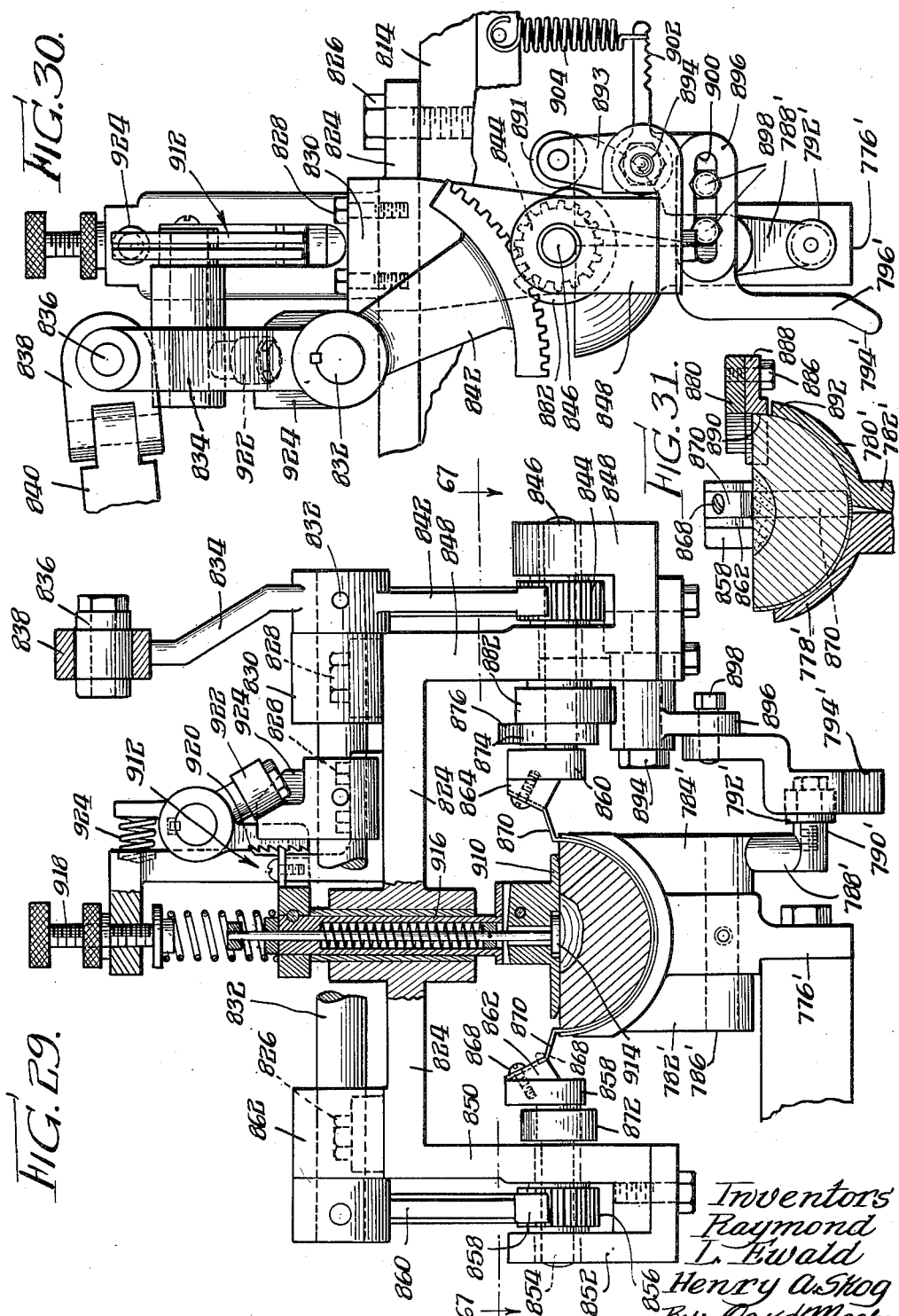

April 28, 1942.  R. L. EWALD ET AL  2,280,813
FRUIT TREATING APPARATUS
Filed Jan. 17, 1938  24 Sheets-Sheet 16

Inventors.
Raymond L. Ewald
Henry A. Strog
By: Cox & Moore attys

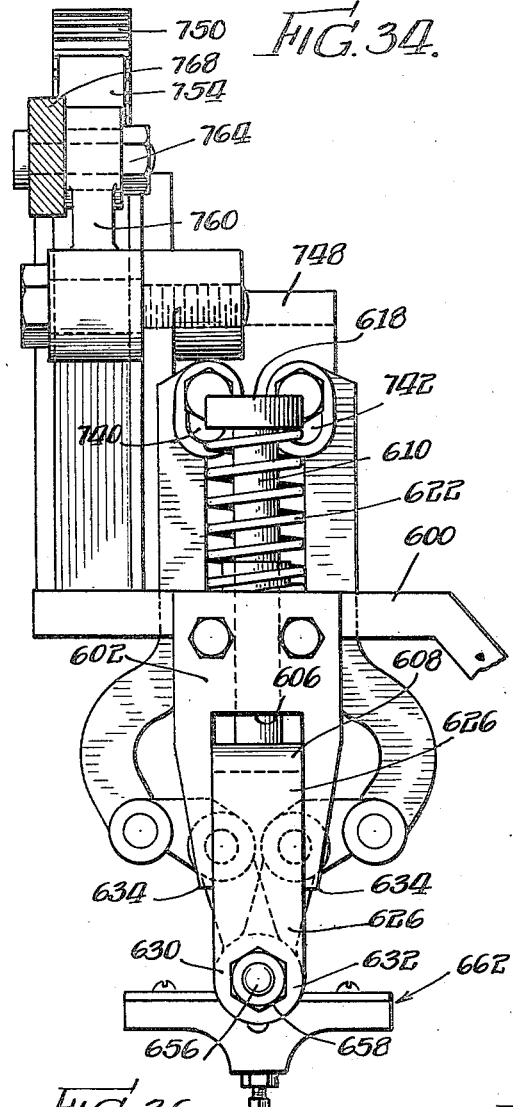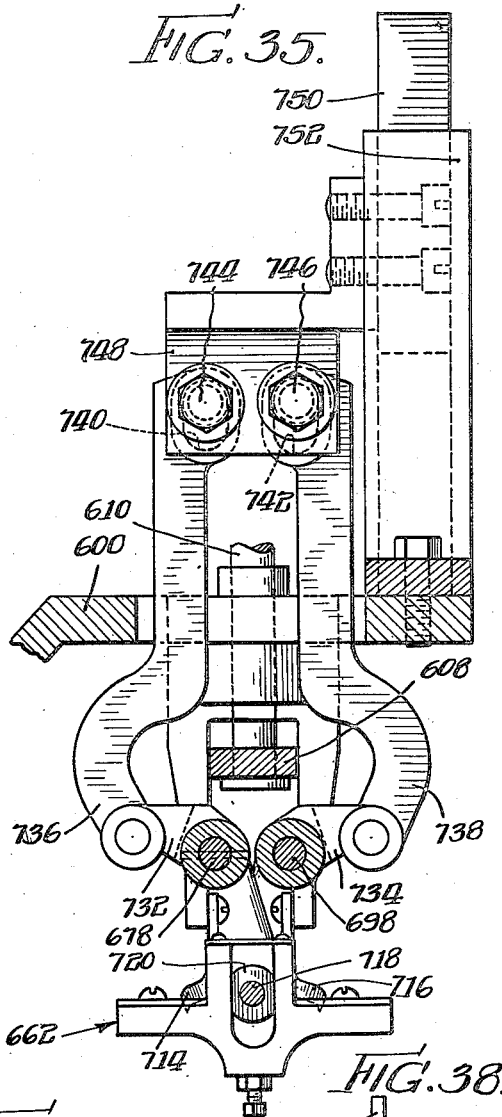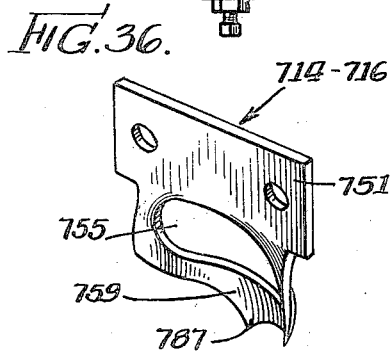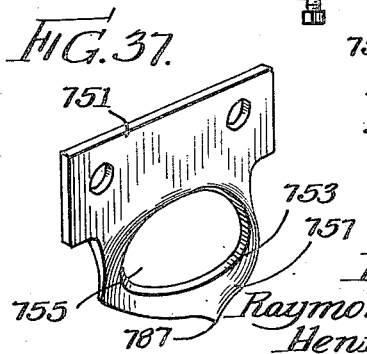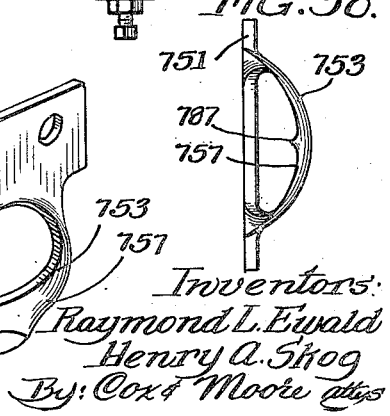

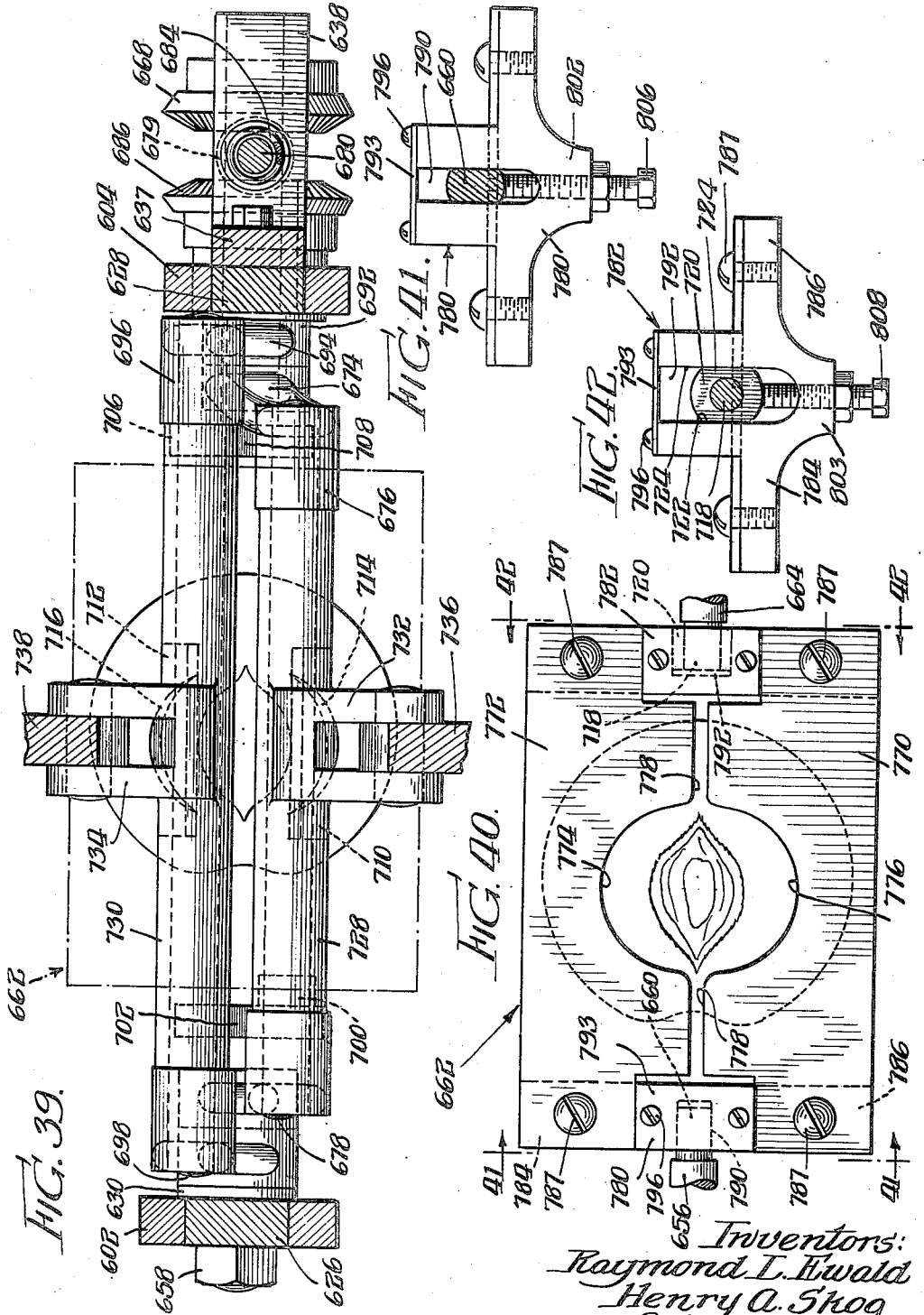

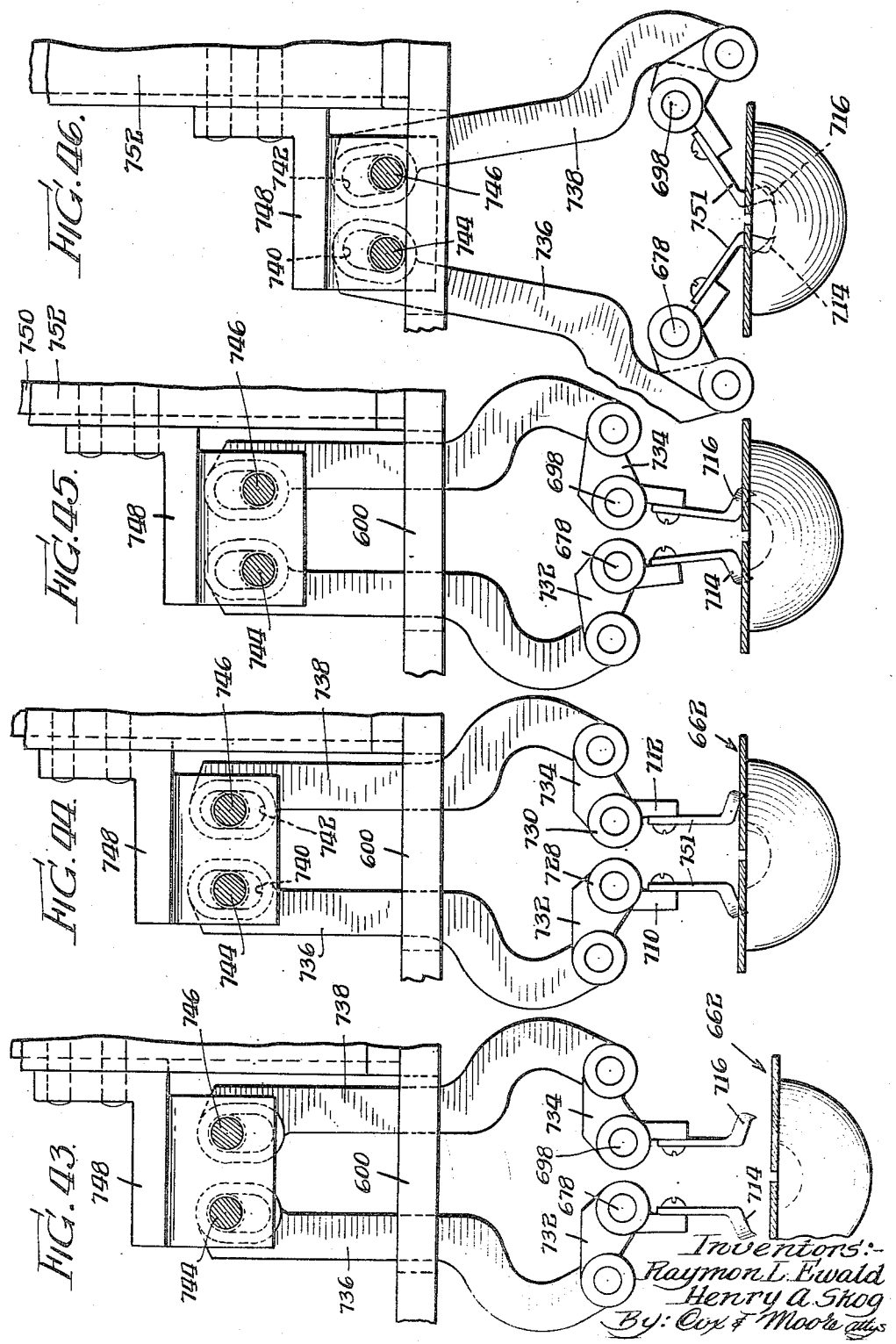

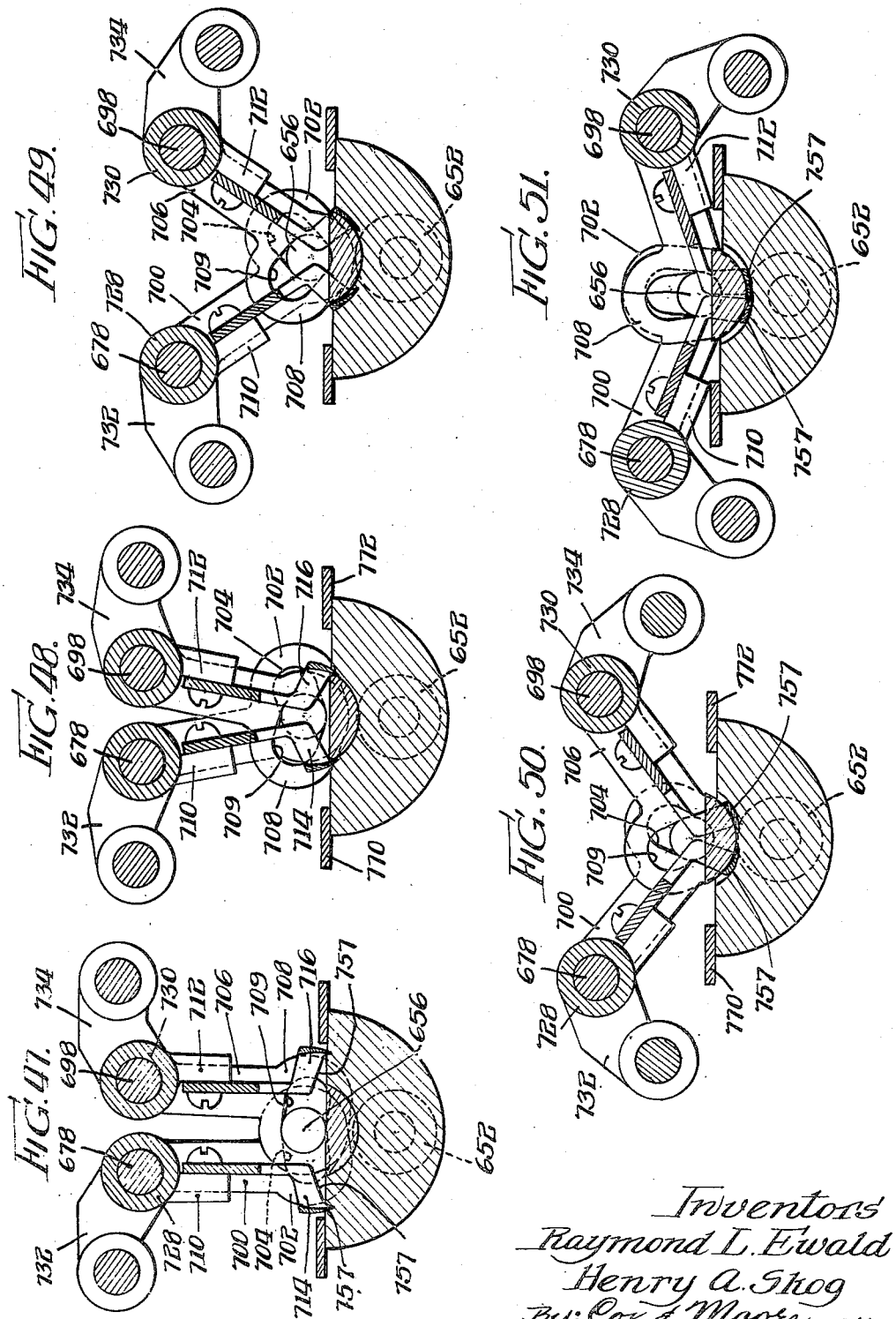

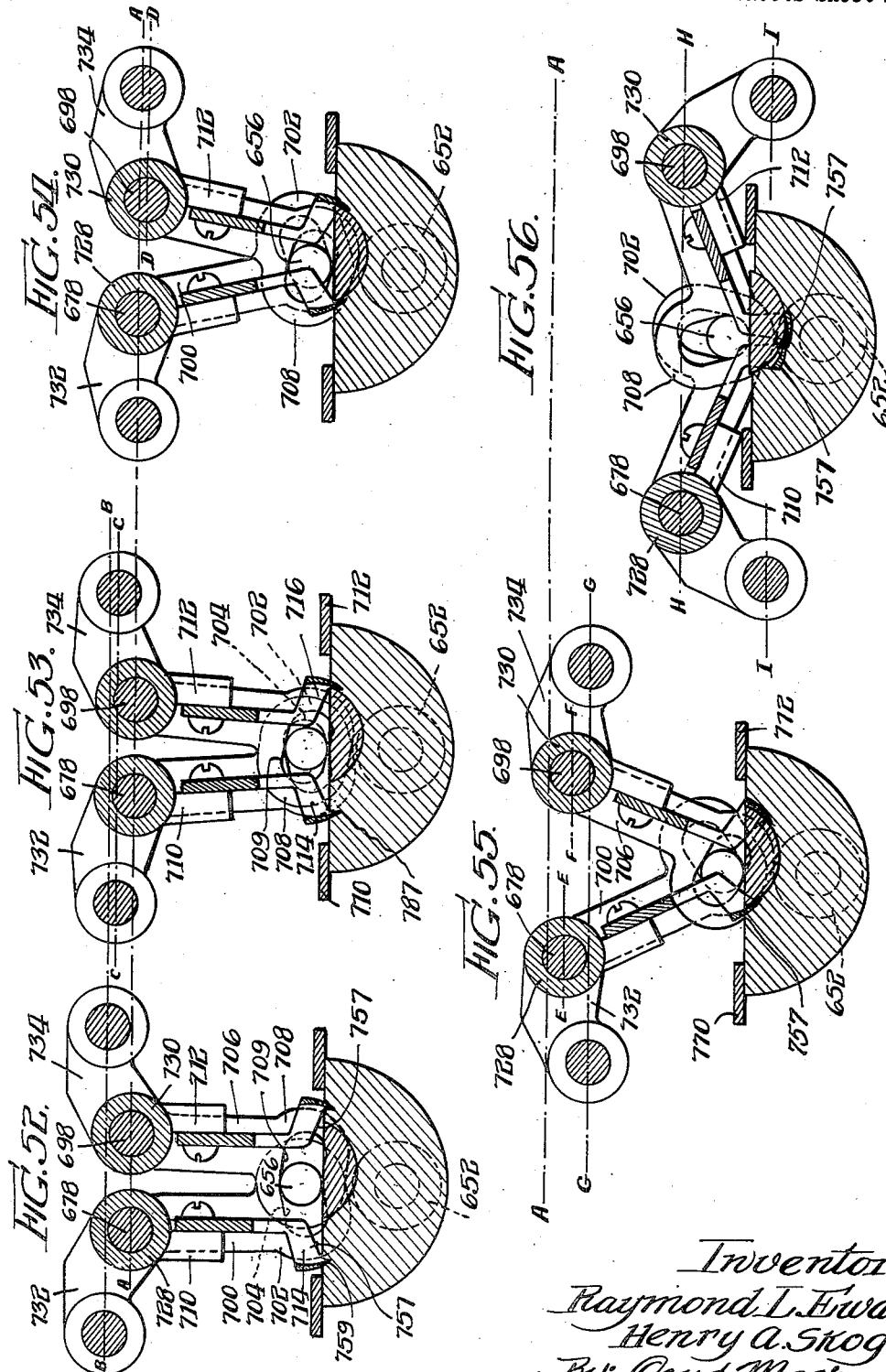

April 28, 1942. R. L. EWALD ET AL 2,280,813
FRUIT TREATING APPARATUS
Filed Jan. 17, 1938 24 Sheets-Sheet 22

Inventors
Raymond L. Ewald
Henry A. Shog
By Cox & Moore attys

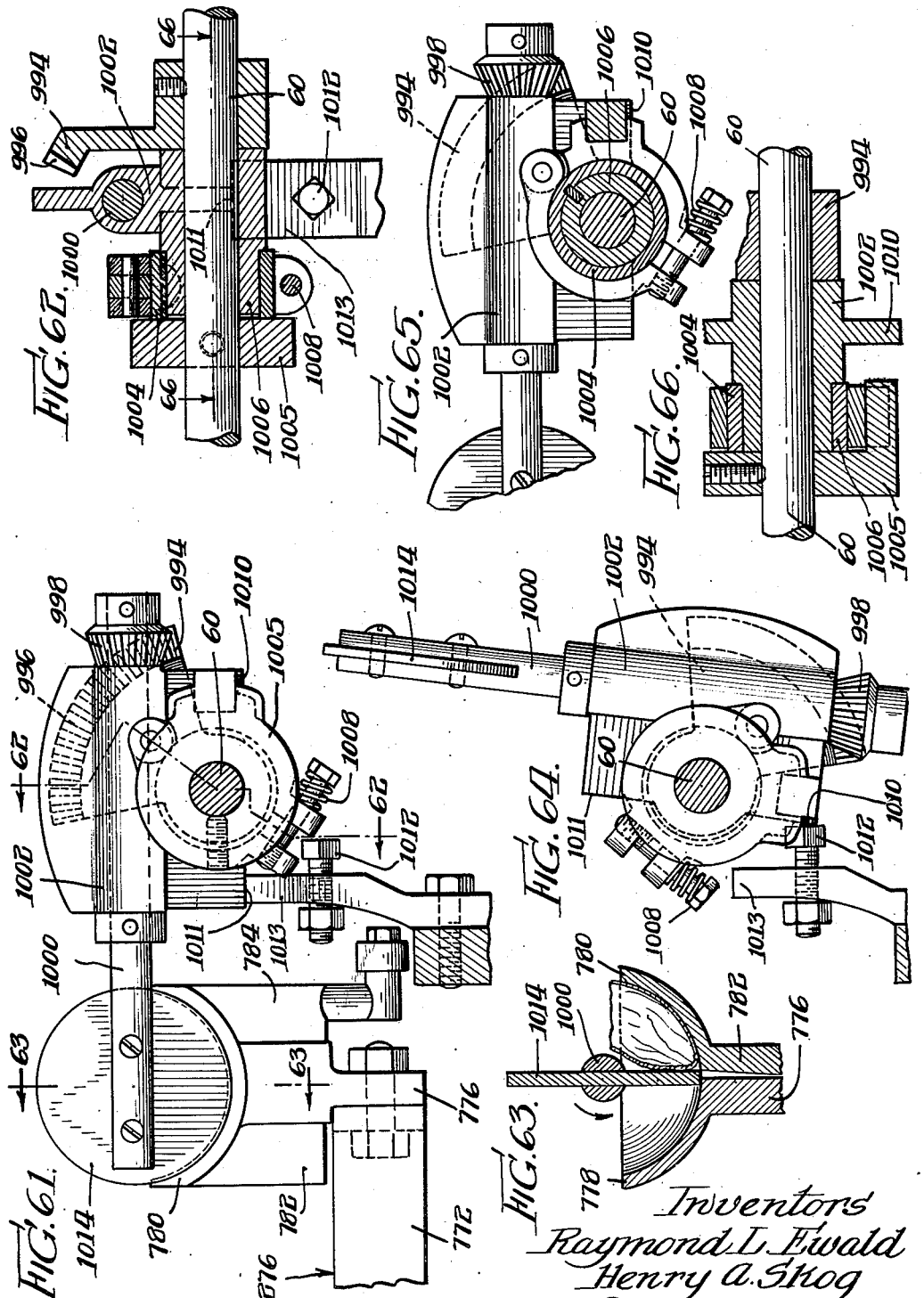

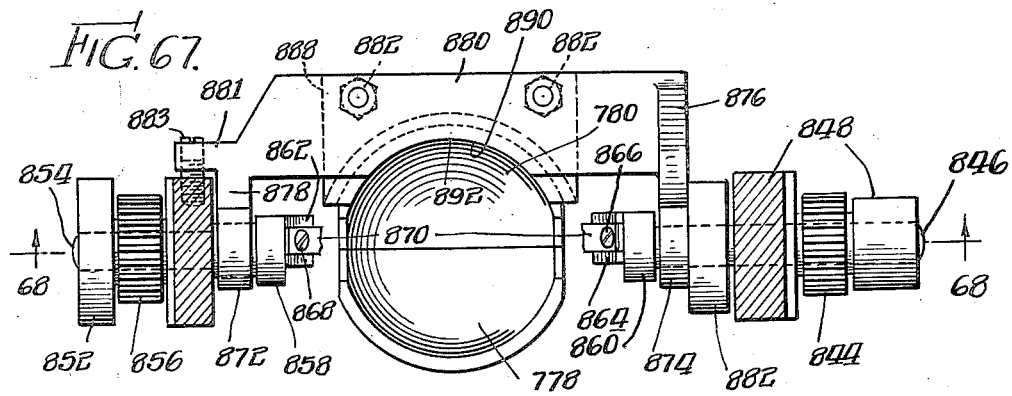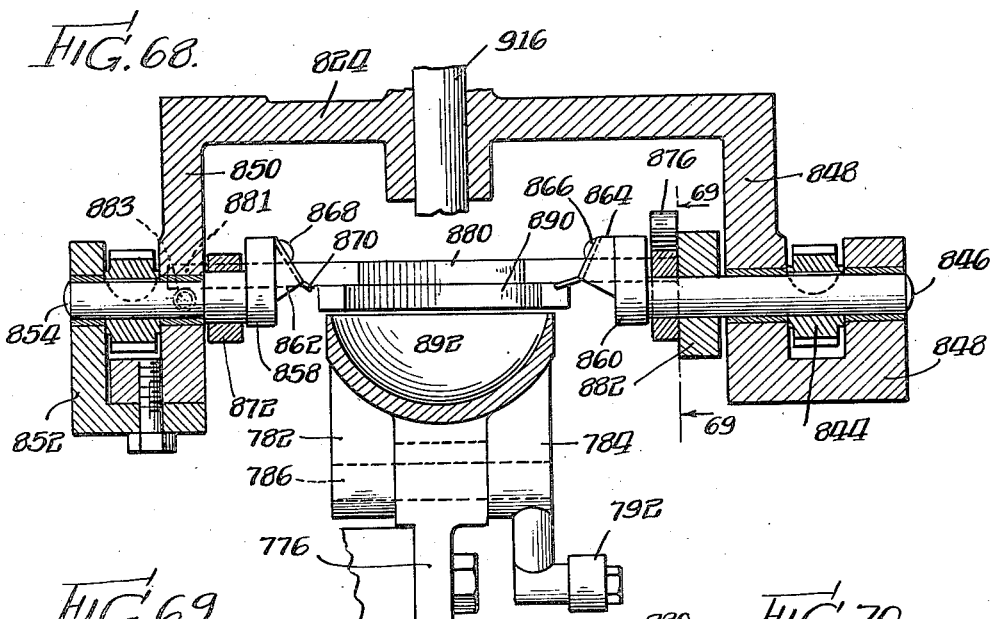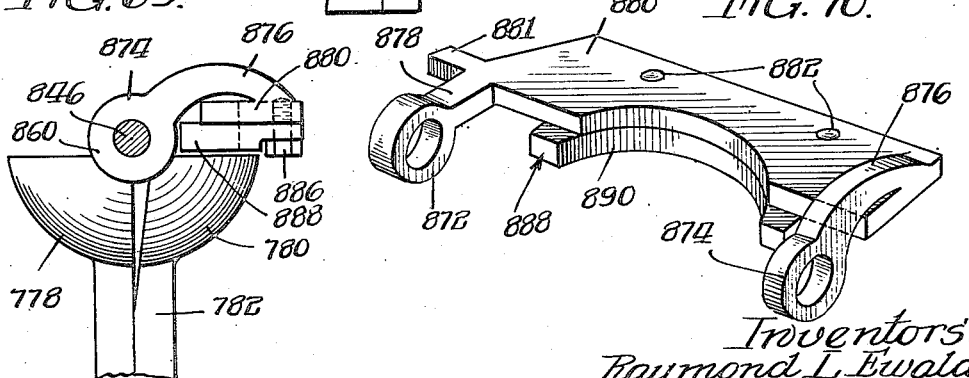

Patented Apr. 28, 1942

2,280,813

UNITED STATES PATENT OFFICE 2,280,813

FRUIT TREATING APPARATUS

Raymond L. Ewald and Henry A. Skog, Olympia, Wash., assignors to Special Equipment Company, Portland, Oreg., a corporation of Oregon Application January 17, 1938, Serial No. 185,332

48 Claims. (Cl. 146—33)

This invention relates to fruit treating apparatus, and more particularly to an organized machine adapted to receive a whole fruit and automatically to process the fruit for canning purposes.

Among the objects of the present invention are to provide an organized, automatic machine particularly adapted for the processing of whole peaches, especially of the clingstone variety, which machine is adapted to halve, completely peel, and pit the peach without the use of lye, chemicals or water, and in such a manner as to preserve the natural color, appearance, odor and taste of the peach; to provide an automatic machine for halving, peeling, and pitting tree-ripened peaches in such a manner as to preserve the original appearance; to provide an improved type of peeling mechanism for peeling half peaches or peach segments; to provide a novel automatic mechanism for dividing a succession of whole peaches into halves, including the halving of the pit, irrespective of the shape of the whole peach; to provide an automatic machine for splitting a succession of whole peaches into halves, including the pits thereof, and for automatically removing the pits from the successive half peaches to provide an improved half fruit discharging means for discharging a peeled and pitted half fruit from a fruit holder while leaving the peel and pit therein; to provide an organized, automatic machine for receiving a succession of whole peaches irrespective of their symmetry and shape, for automatically presenting each whole peach to a trimming station for peeling the stem end, for thereafter automatically presenting the whole fruit to a dividing station for splitting successive whole peaches in half, including splitting the pit, for thereafter automatically transporting each half peach and half pit to a fruit holder, for thereafter automatically peeling each half fruit, for automatically pitting each half fruit, for automatically discharging each peeled and pitted half fruit, and for thereafter independently discharging the peel and pit of each half fruit; to provide various adjustments for the various operations hereinbefore set forth to be carried out in said automatic machine; to provide an improved feed-in turret for receiving, gripping and transporting whole fruit from a feed-in station to a sawing station; to provide improved means for sawing a whole fruit, including the pit thereof, into half sections without exerting lateral clamping pressure upon the whole fruit during the sawing action; to provide means for transferring severed halves of a whole fruit from the dividing mechanism onto spreader mechanism, which in one position is adapted to pass between the severed halves and to receive each half upon said spreader mechanism, and thereafter to move outwardly and arcuately in such a manner that one end of the spreader mechanism moves in a greater arc than the other, and to provide means for releasably holding each half peach upon a vertical face of one of the spreader mechanisms during the transferring operation and without marring the appearance of each half fruit so held; to provide these and other objects of invention as will be apparent from a perusal of the following specification when taken in connection with the accompanying drawings.

Referring now to the drawings in detail:

Fig. 2 is a plan sectional view taken on line 2—2 of Fig. 1;

Fig. 3 is a vertical section taken on line 3—3 of Fig. 2;

Fig. 4 is a plan sectional view taken on line 4—4 of Fig. 1, showing a part of the driving mechanism;

Fig. 5 is a sectional view taken on line 5—5 of Fig. 4, likewise showing a part of the driving mechanism;

Fig. 6 is a plan sectional view taken on line 6—6 of Fig. 3, showing part of the driving mechanism;

Fig. 9 is a vertical sectional view of the means for cutting the peeling out of the stem end of the fruit, the view being taken on line 9—9 of Fig. 2;

Fig. 10 is a sectional view taken on line 10—10 of Fig. 9, the view showing the cams that operate the cutter knives and the fruit holding means;

Fig. 11 is a detail sectional view of a knife carrier, taken on line 11—11 of Fig. 9;

Fig. 12 is a detail sectional view of the fruit carrying arm, being taken on line 12—12 of Fig. 3;

Fig. 13 is a detail sectional view showing the means for operating the carrier jaws, the view being taken on line 13—13 of Fig. 3;

Fig. 14 is a view similar to Fig. 13, but showing the mechanism in a different operating position;

Fig. 15 is a plan sectional view taken on line 15—15 of Fig. 3, and showing the means for imparting an additional movement to the transfer jaw carriage;

Fig. 16 is a side view of the mechanism shown in Fig. 15;

Fig. 17 is a vertical sectional view taken on line 17—17 of Fig. 15 and showing the carrier arms and separating blades;

Fig. 18 is a detail plan sectional view showing the carrier arm approaching the separating blades, and also showing the fruit halves disposed upon the blades in dotted lines;

Fig. 21 is a sectional view taken on the line 21—21 of Fig. 17, showing the fruit disposed upon the separating blades;

Fig. 22 is a perspective view of one of the spreader means;

Fig. 23 is a view showing one of the spreaders in a downward position;

Fig. 24 is an exploded view of the parts of one of the spreaders and its operating means;

Fig. 25 is an exploded view of the mechanism for operating the fruit spreaders;

Fig. 26 is a fragmentary view of the lower portion of the right-hand end of the machine as viewed in Fig. 1, showing part of the actuating mechanism;

Fig. 27 is a fragmentary elevational view of the opposite side of the machine as that shown in Fig. 1, with a portion of the frame broken away;

Fig. 28 is a fragmentary view showing the mechanism for expelling the fruit from the machine;

Fig. 29 is a vertical sectional view taken on line 29—29 of Fig. 2, showing the peeling head;

Fig. 30 is a front elevational view of the peeling head as it appears in Fig. 29 when viewing it from the right;

Fig. 31 is a sectional view taken through one of the peeling cups, showing the means for extending one of the inner walls of the cup sections;

Fig. 34 is a side elevational view of the pitter assembly, being viewed from the left as indicated by section lines 34—34, Fig. 32;

Fig. 35 is a vertical sectional view taken on line 35—35 of Fig. 32;

Figs. 36, 37 and 38 are front, rear and bottom plan views, respectively, of one of the pitter blades;

Fig. 39 is a sectional plan view of a portion of the pitting mechanism, being taken on line 39—39 of Fig. 32;

Fig. 40 is a plan view of the presser plate;

Fig. 41 is a sectional view through one end of the presser plate, being taken on line 41—41, Fig. 40;

Fig. 42 is a sectional view through the opposite end of the presser plate, being taken on line 42—42, Fig. 40;

Figure 57:
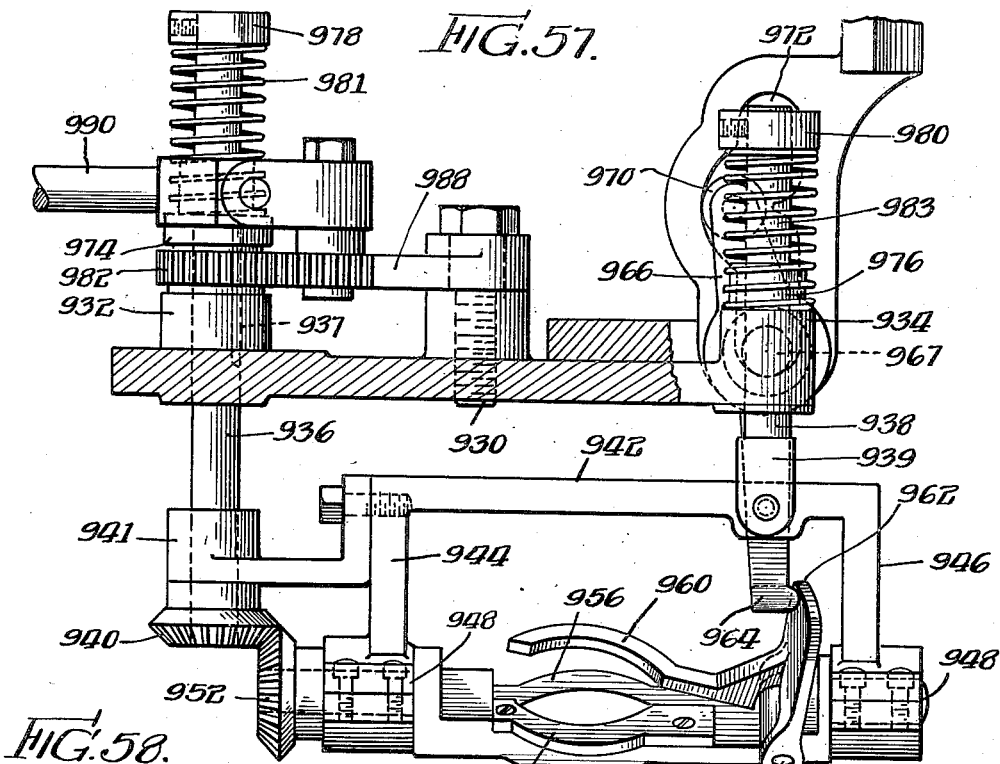
Figures 58, 59, 60:
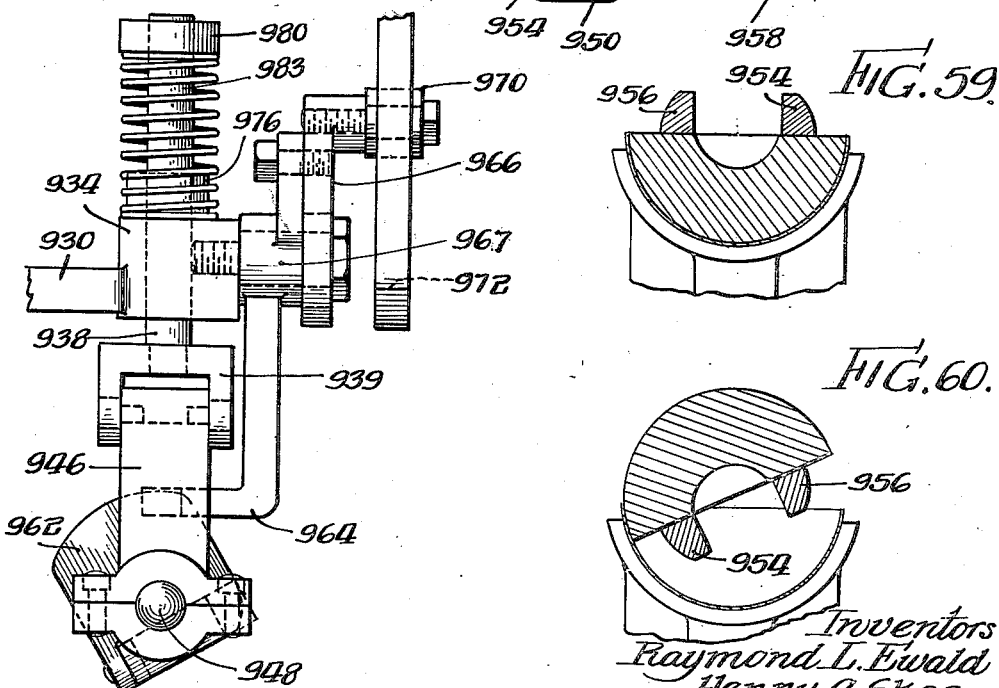

Figs. 43-46, inclusive, are successive views of the pitting mechanism, showing the operation of the link connection of the pitter actuating connections to the carriage mechanism;

Figs. 47-51, inclusive, are successive views of the pitting operation when the half pit is substantially centrally located with respect to the half peach;

Figs. 52-56 are views corresponding to Figs. 47-51, inclusive, but showing an instance where-in the half pit is eccentrically located with relation to the half peach;

Fig. 57 is a detail sectional view of the processed fruit extractor and discharge mechanism, being taken on the line 57—57 of Fig. 2;

Fig. 58 is an end view of the mechanism shown in Fig. 57 as it appears looking from the right;

Figs. 59 and 60 are successive views of the manner of extracting the processed half fruit from the fruit holder;

Figs. 61-66, inclusive, are detail views of the scavenger mechanism;

Fig. 67 is a plan sectional view taken on line 67—67 of Fig. 29;

Fig. 68 is a vertical sectional view taken on line 68—68 of Fig. 67;

Fig. 69 is a detail sectional view taken on line 69—69 of Fig. 68; and

Fig. 70 is a perspective view of the plate which forms the extension for the fruit cup during the peeling operation.

The present invention is best exemplified by reference to an organized, automatic machine adapted to receive a succession of whole fruit, such, for instance, as whole peaches, and particularly peaches of the clingstone variety, for continuously passing each of the succession of whole fruits through the machine, and for discharging each whole fruit as two processed half peaches in a manner suitable for subsequent canning; specifically, each whole fruit first has the peeling at its stem end removed; the whole peach is then split or divided substantially in half, which includes a division of the pit itself; the two halves are then automatically transferred onto spreader mechanism which deposits each half fruit into a fruit receiving means, which succession of fruit receiving means moves past a peeling station where the peeling of each half fruit is automatically removed, thence past a pitting station where the half pit of each half fruit is automatically removed; thence past a discharging station where a processed half fruit is discharged from the machine free of its peel and pit, and thence past a scavenging station where the peel and pit are discharged from the fruit holding means independently of the half fruit.

It must be apparent that the present invention has a plurality of aspects. First, from the standpoint of an organized, automatic machine, the invention resides in the arrangement of the various operating mechanisms successively to process a whole fruit into two peeled and pitted half fruits, including mechanism for automatically discharging the same from the machine, and in addition the invention includes, as ancillary aspects, the various and sundry mechanisms which enter into the complete machine, such for instance as the feeding mechanism for feeding whole peaches to the stem cavity trimmer and to the dividing mechanism; the dividing mechanism itself; the transfer mechanism for bodily conveying the divided halves of the whole fruit to the spreader means; the spreader means itself, 5. A peeling station.
6. A pitting station.
7. A discharge station for the peeled and pitted half fruit.
8. A pit and peel scavenging station.

In the present organized machine, particularly as distinguished from the prior Ewald type of machine, it is not practicable to discharge the half fruit from the machine at the same station at which the seed-containing section is severed. This, therefore, resulted in the provision of a separate station for effecting this half fruit discharge. This in turn has made desirable a six half fruit holder turret instead of a four as heretofore provided. This six holder arrangement for the half fruit in turn makes desirable the disposition of single half fruit holders radially of the turret instead of in parallel pairs as heretofore; and this in turn, in conjunction with the six fruit holder feed-in turret for the whole fruit, requires means for spreading the fruit halves from a parallel position of the suture axes of the severed halves of a fruit to a position where such suture axes converge and lie radially of the axis of the second turret, which has demanded a different motion of the half fruit spreaders as distinct from the single arcuate swing in the prior Ewald devices plus provision of means for driving the half fruit turret at twice the speed of the whole fruit turret whereby each half fruit holder of the latter turret is shifted say one hundred twenty degrees intermittently as the corresponding whole fruit holder is shifted sixty degrees to provide two spaced adjacent empty holders to receive the split halves of a whole fruit from each of the single holders of the whole fruit turret.

A second level of the main rectangular frame of the machine, bounded by the uprights 2, 4, 6, and 8, provides a location for the Geneva gears for driving the main half fruit holding turret and also the whole fruit feed turret, including the driving means therebetween, whereby the main half fruit holder turret is driven twice as fast as the whole fruit feed-in turret. For effecting this function, shaft 14 carries between its ends a bevel gear 110, see Fig. 4, meshing with a bevel gear 112 on a vertical shaft 114 mounted in a bearing 116, see Fig. 3, carried by a cross frame 118. This cross frame is supported at one end by suitable vertical bracing connected to a cross bar 120, see Fig. 5, carried by the vertical upright frame members 4 and 8. The opposite end 122 of cross frame 118 is bolted to an end support by a projection 124 from a horizontal cross bar 126 carried by the opposite vertical uprights 2 and 6 of the main frame at about the level of the cross frame 118. This cross bar 126 is preferably an integral part of the substantially triangular-shaped supplemental frame carrying the whole fruit feed-in turret and the transfer mechanism.

Shaft 114 carries a bevel gear 112 and also carries above it a gear 128, which latter meshes with a second gear 130 on a bearing 132 on the cross frame 118. Gear 130 meshes with a larger gear 134 horizontally fixed on a vertical turret shaft 136 having a bearing in cross frame 118. Turret shaft 136 is surrounded by a bearing 138, above which is a long sleeve 139 upon which is fixed a Geneva gear 140 having six slots, cooperating with a Geneva member 142 on shaft 114. This latter geneva 142 has the usual circular periphery provided with a roller 144 for cooperation with the six radial slots aforesaid, for rotating the Geneva wheel and sleeve 139 and for holding it stationary between partial turns. The upper end of shaft 114 above the Geneva member carries a sprocket gear 146, see Fig. 6, driving a chain 148 running horizontally across the frame of the machine to a larger sprocket 150 fixed to shaft 152. This shaft 152 is mounted on a substantially triangular frame 153 carried by and integral with the cross bar 126. The outer end of frame 153 carries a bearing for the shaft 152 and also has a heavy extension bearing 155, Fig. 3, for whole fruit turret shaft 154. Both of these shafts are vertical and parallel to each other. Shaft 152 extends upwardly a short distance and is provided on its upper end with a disc-like cam 156 of the tracker type, for operating the saw shifting mechanism. Whole fruit turret shaft 154 extends vertically upwardly toward the top of the frame and carries the whole fruit feed turret sleeve 161 rotatably mounted thereon, Fig. 3.

Shaft 152 at its lower end has a roller element 158 of a Geneva movement fixed to it, and sleeve 161 has a slotted element 160 of the cooperating Geneva part fixed to it. This slotted geneva has fixed to it the sleeve 161, see Fig. 3, which sleeve in turn carries the feed finger turret 162 provided with six whole fruit feed fingers.

*The whole fruit feed-in station*

Concentrically within sleeve 161 is the shaft 154, see Fig. 3, the lower end of which extends below the bearing 155, Fig. 3, and which has fixed thereto a gear 166 meshing with a gear 168 on the bottom end of shaft 152, whereby as the Geneva part 158 intermittently rotates the sleeve 161, the gears 166 and 168 rotate the shaft 154. The upper end of shaft 154 is provided with a crown gear 170 having radially extending peripheral teeth, and shaft 154 is also provided with a bevel gear 172. Crown gear 170 drives a shaft 174 through bevel gear 176, which shaft rotates an endless screw 178 for operating the fruit transfer mechanism, hereinafter described, while bevel gear 172, through another bevel gear 173, drives a horizontal shaft 179, see Fig. 9, rotating in a bearing 180 mounted on upper frame 182, which latter is a horizontal frame extension corresponding in general to the lower frame extension 153, see Fig. 4, and in which upper extension 182 the shaft 154 has a bearing.

*The stem cavity cutter or peeler*

Means is provided for automatically peeling or cutting the peel of the whole peach within the cavity in which the stem is located. Referring to Figs. 9, 10 and 11, on the opposite end of shaft 179 is fixed a compound cam comprising a large cam disc 184 having a peripheral high and low edge and a concentrical, cylindrical cam 186. On a support 190 mounted on frame 182 is pivoted, as at 191, a lever 192 having a cam roll 193 rotatable thereon, and adapted to cooperate with the edge of cam 186 for pivotally shifting lever 192 in a vertical plane. Pivoted at 193' to mounting 190 is a long lever 194, the lower end of which carries a substantially L-shaped arm 196 having a nose or holder 197 adapted to enter the stem indentation or cavity of the whole peach as the latter is held by the whole fruit feed mechanism hereinafter described, and is thereby brought opposite to and held by the feed fingers of said feed mechanism. The upper end of arm 194 below its pivot 193' is provided with a roller 195 adapted to be contacted by a lateral edge of which is adapted to receive the half sections and position them automatically in the successive fruit holders on the main turret of the machine; the discharge means for bodily discharging the peeled and pitted half fruit from the machine, leaving the peel and pit in the fruit holder; and finally the scavenging mechanism for removing the peel and the half pit.

With respect to certain of the above individual features of invention, claims are herewith included to such individual inventive features irrespective of the combination, as well as in combination with the other features.

It is to be understood that while the present invention is peculiarly adapted for the treatment of peaches, certain aspects of the invention are not to be specifically limited thereto but are capable of application to other types of fruit.

Description of machine

In order to exemplify various features of not only the broad but narrower aspects of the present invention, the same is described as applied to a type of machine disclosed in the drawings. It is, however, understood that such machine is but one form of the many different embodiments the invention is capable of taking, and that such illustration and disclosure is purely by way of illustration and not by way of limitation.

The machine of the present construction preferably takes the form of an upright, substantially square frame comprising four corner posts or angle irons 2, 4, 6 and 8, suitably braced at top and bottom by cross braces 10 and 12. In addition, other hereinafter described cross bars serve as rigid bracing for these upright members. In a general way, extending laterally from this rectangular frame, projects a supplementary frame adapted to be bolted or otherwise attached thereto, as clearly shown in Figs. 1, 4 and 6. This supplementary frame is utilized to support the mechanism which initially receives the fruit, the mechanism which cuts the fruit in halves and transports it to the peeling, pitting, fruit discharging and peel and pit scavenging mechanism, the latter mechanism being supported on the rectangular frame. A fuller description of this arrangement will be given subsequently.

The upright frame hereinafter described is provided on a relatively low level thereof with horizontally disposed shafts 14 and 16. Shaft 16 is power driven through clutch mechanism 17, which includes a drive pulley 18 adapted to be driven from any suitable motor 21 carried on a bracket mounted on the frame of the machine. The clutch mechanism 17 on the power drive is similar to that described in the pending applications of Mark Ewald and comprises purely a clutch for connecting and disconnecting the electric power source to the main operating shaft of the machine, and no portion of the present invention is concerned with the details of the clutch mechanism.

Shaft 16 carries a gear 20 driving another gear 22 on the horizontal shaft 14. This shaft 14 carries two main cams 24 and 26 fixed on opposite ends thereof. Each of these cams is double faced so as to provide cam operating means on the two opposed faces of each cam. Cam face 24a comprises a cam track in which operates a roller, hereinafter described, of a vertically reciprocable slide for raising and lowering the main tool carrying slide, hereinafter described. Cam face 24b forms a roller race in which a roller on a horizontally reciprocable slide 28 shifts in a horizontal motion transversely of shaft 14, and carries on its outer end a bearing pivot 30 linked to a bearing pivot 32 on an arm 34 fixed on a vertical shaft 36 having fixed bearings in the corner frame 2 of the main upright frame of the machine. This vertical shaft 36 is oscillated by the slide 28 for operating the peeling mechanism hereinafter described and also for operating the fruit discharging mechanism hereinafter described by means of cranks fixed to the upper end of this vertical oscillatable shaft 36.

The cam 26 on shaft 14 has a cam face 26a formed as a cam race in which operates a roller on a somewhat similar horizontal reciprocable slide 38 and corresponding to slide 28, which slide 38 is also provided on its outer end with a bearing 40 for a vertical pin 42, to the lower end of which is pivoted a link 44. This link 44 carries at its outer end a link 46, the outer bearing 48 of which is pinned to a vertically oscillatable shaft 50 which is mounted in the corner post 6 of the frame and in an opposite manner to the vertical shaft 36. This shaft 50 carries on its upper end a fixed arm hereinafter referred to, which in turn pivotally connects at its outer end to a relatively long rod running diagonally across to a universal connection in turn connected to mechanism which operates a gear sector reciprocable on a horizontal axis for operating the mechanism which actuates the pitting knives, all as will be hereinafter set forth.

Cam race 26b operates a vertically reciprocable slide 52, see Fig. 27, the upper end of which is provided with a rod 54 having a rack tooth portion 56 operating a pinion 58 on a horizontal shaft 60. This shaft 60 is oscillated by the rack and pinion to operate a cam 62 on the outer end of this shaft, which in turn is adapted through the instrumentality of a roller 64, mounted on a pivoted arm 66, to operate a horizontal shaft 68 having bearings on the outside of the vertical frame member and on a level of the main fruit cup turret, hereinafter described, and above the lower levels of the machine that carry the shafts 14 and 16.

The arm 66 which is carried by the shaft 68 has an extending portion 70 which engages a spring 72 mounted between it and the corner post of the main frame for normally pressing the roller 64 toward the cam 62. The shaft 68 operates the mechanism for (a) positioning the rubber pad over the fruit cup for vertically holding the peel therein, and for (b) oscillating the fruit discharge trough, preferably carrying this rubber pad. These mechanisms (a) and (b) will hereinafter be more fully set forth.

As clearly shown in Fig. 2, the present machine provides a greater number of stations and operations than prior types of machines disclosed in the patents and pending applications of Mark Ewald. While the present invention is not limited to a machine having the exact sequence of apparatus for performing the different operations upon the fruit passing through the machine, the present disclosed arrangement is particularly desirable for the automatic treatment and processing of peaches and in the disclosed sequence of operations. In the present instance these stations and operations include:

1. A whole fruit feed station.
2. A peach stem cavity cutter and peeler.
3. A whole peach dividing and transfer station.
4. A spreader station where the cut halves are deposited in the half fruit receptacles on the main intermittently rotating turret mechanism.

cam disc 184 for shifting this lever 194 toward and from the feed fingers of the whole fruit feed turret. The lower end of arm 194 is also provided with a pivot 199 on which swings another arm 200, the rear end of which has a pivotal connection 201 with a rod 202. This rod 202 pivots at 203 to the rear end of the lever 192. The front end of lever 200 is provided with any desired means for cutting the peel within the stem cavity. In the present form this means includes opposed blades 204 spaced apart about one-eighth inch to allow the points to pass either the holder 197 or the end of the pit, depending upon the depth of the cut. By the foregoing mechanism, when a peach or similar fruit is fed or positioned with its stem indentation opposite the nose 197, and when the latter is swung outwardly to enter the indentation, the lever 200 will be automatically swung upwardly, carrying the knives 204 through the cavity and form opposed, spaced cuts thereacross to cut the peel free from such indentation, and particularly when the subsequent peeling operation is carried out as hereinafter will be described.

The rear of lever 194 has a coiled spring 212 abutting thereagainst, which also acts against a fixed arm 213 on support 190 for returning the lever 194 resiliently to press the nose 197 into the stem cavity of the whole peach. In addition, a coiled spring 214 connected to the rear end of lever 200 serves to pull the knives 204 downwardly after the cutting operation.

The whole fruit feed-in turret

Means is provided whereby an operator may feed whole peaches one at a time to the feed-in turret, and this feed-in means preferably comprises a plurality of conveying means, specifically, relatively movable fingers which are adapted to grasp the curved surface of each of the whole peaches and to convey them to the splitting or dividing station as hereinafter described. Whole peaches are of varying shapes. Some are lopsided with respect to the plane of the suture, others are symmetrical with respect to the plane of the suture. In the great majority of cases the maximum diameter of the pit of the peach is in the plane of the suture; in a smaller percentage of whole peaches, the maximum diameter of the pit may be positioned to one side of the plane of the suture. In any event, it is desirable to cleave or cut through the flesh of the fruit and also the pit in a plane parallel with the plane of the maximum diameter of the pit. The feed-in turret for the whole peaches, in the present invention, is constructed and arranged so that whole peaches are positioned in the holding mechanism of the feed-in turret in such a way that the plane of the maximum diameter of the peach, irrespective of the plane of the suture, is centrally located with respect to the grasping or holding means of the feed-in turret whereby when the feed-in turret is intermittently moved to the peach dividing position, the plane of operation of the dividing mechanism will be parallel with the plane of the maximum diameter of the pit. In the present instance, also, the feed-in turret and dividing station are constructed and arranged so that the peach, together with its whole pit, is divided while the whole peach is held within the grasping means of the turret and in such a manner that the contacting pressure of the grasping means is disposed on opposite sides of the peach dividing means and relatively close to the line of cleavage whereby any lateral pressure of the grasping means in holding the peach during the cleaving operation is avoided, and whereby a clean cut is effected. In addition, the peach is positioned and held in the housing means of the turret with preferably the longer axis of the pit disposed horizontally and also radially of the axis 154 of the turret.

Figure 7:
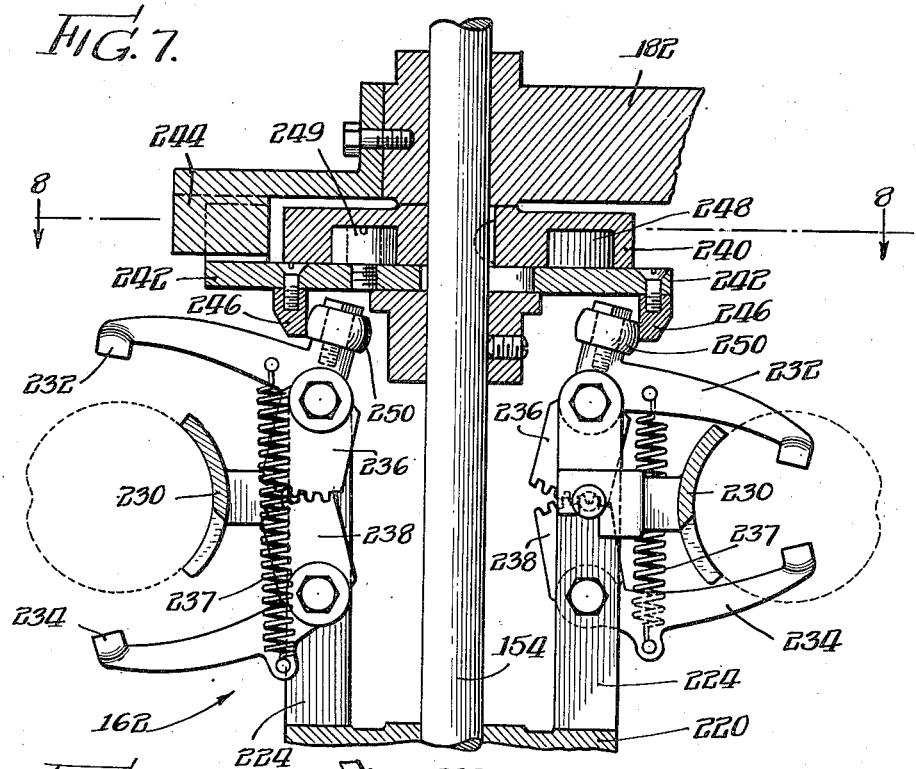
Fig. 7 is a vertical sectional view taken on line 7—7 of Fig. 2, showing the feed turret.
Figure 8:
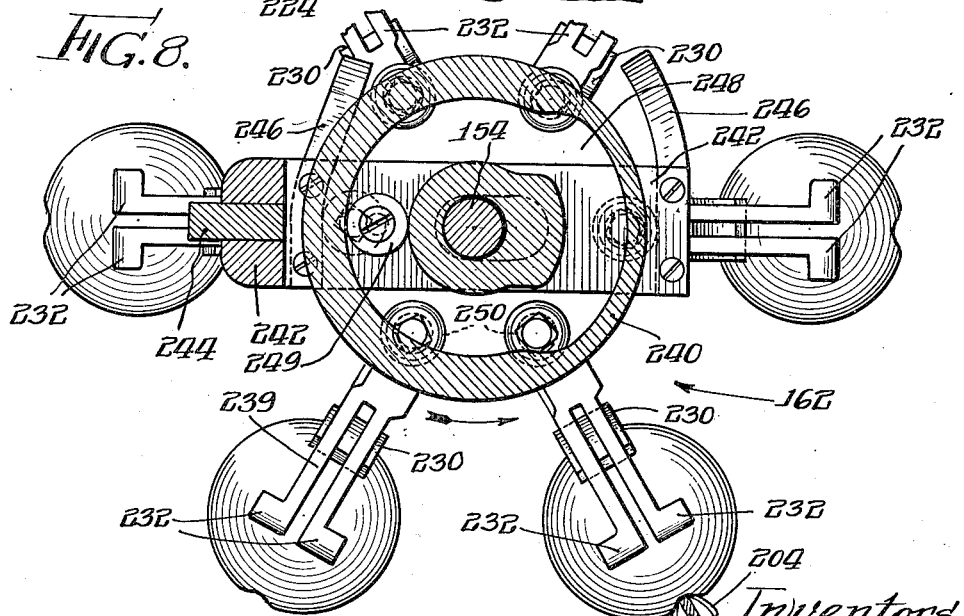
Fig. 8 is a plan sectional view of the feed turret, taken on line 8—8 of Fig. 7.

Referring now to the specific mechanism for accomplishing the foregoing and other functions, fixed on the upper end of sleeve 161, see Figs. 3 and 7, is a feed head comprising a second sleeve 220 having in the present instance six radially disposed outstanding lugs 222, to each of which is fixed upstanding support bars 224 carrying the relatively shiftable feed fingers which comprise the whole peach holding means. Each feed finger device includes a relatively fixed replaceable holder or finger 230, which finger may be of varying sizes and suitably curved to receive and position the butt end or blossom end of the whole peach. Any suitable means may be provided for detachably holding the finger 230 in place. In addition there are upper and lower fingers 232 and 234, each having an integral toothed sector 236 and 238, respectively, intermeshing to provide simultaneous opening and closing action. A spring 237 connecting the arms 232 and 234 normally tends to bring the fingers to relatively closed position whereby to hold the whole fruit therebetween. As shown more clearly in Figs. 2 and 8, each of these fingers is provided with radially extending slots 239 which extend back for substantially the entire length of the fingers whereby to permit the saw or cutting means, hereinafter referred to, to pass substantially through an entire whole fruit and completely to cut the pit of the whole fruit while the whole fruit is held stationarily between these fingers 232 and 234. It will be noted that these slots 239 substantially provide divided fingers which engage the whole fruit laterally and adjacent the line of cut so that the whole fruit is held substantially at the line of cut and not by any means that tends to press at an angle to and particularly at a right angle to the plane of action of the cutting means. It is important that the minimum lateral pressure be exerted on the whole fruit during the sawing action of the pit. This lateral pressure tends to press together the flesh of the fruit during the cutting action, and what is more important, tends to make jagged cuts in the marginal edges of the peach during the severance of the pit. This tends seriously to impair the appearance of the half peach sections during subsequent pitting, and tends to embed the slivers of pit into the flesh of the fruit, thereby impairing its flavor, appearance and quality.

Means is provided for positively opening the fingers and for permitting the spring resiliently to close these fingers whereby to engage and releasably hold the whole fruit therebetween during the cutting or sawing operation of the peach and whereby also to hold the two severed halves and to permit them to be grasped and transferred to the mechanism for depositing each half into a holding means, herein specifically illustrated as a cup. Beneath the support extension frame 182 and keyed on the upper end of shaft 154 is a cam 240. Below this cam is slidably disposed a cross slide 242 guided by a lug 244 on the under side of frame 182. This slide 242 has two depending lugs 246 forming extensions thereof and which lugs are 180 degrees apart. Cam 240 is provided with a cam race 248 which extends approximately 360 degrees of the total annular travel of the cam 240. Cam slide 242 has a roller 249 pivoted on its upper surface which runs in the cam race 248 on the under side of cam 240 to shift the slide 242 back and forth with a straight-line motion. When this slide 242 is moved toward the feed-in station of the machine, i. e., away from the pitting station, the depending lug 246 nearest the pitting station moves toward the feed-in station end, and thereby pushes the roll 250 on the top of the upper finger 232, see Fig. 7, inwardly toward the shaft 154 to open the fingers 232, 234. At the same time, the lug 246 which is spaced 180 degrees therefrom moves in the same direction to permit the spring 237 to close the oppositely located fingers and thereby hold the whole fruit between the fingers. The whole fruit, which is herein illustrated as a whole peach, is thus fed in step-by-step rotation of the feed turret, which carries the peach first to the stem cavity cutter for trimming the stem indentation and thence to the dividing or sawing station, at which station the feed fingers 232 and 234 are positively opened by a cross slide lug 246 in properly timed relation to permit the transfer fingers, hereinafter mentioned, to grasp and carry the severed halves or substantially severed halves of the peach from the sawing or dividing station to the spreading mechanism hereinafter mentioned.

By means of the foregoing mechanism, once the whole peach is placed manually with its suture line in a plane parallel with the plane of action of the rotary saw and with the maximum diameter of the peach placed centrally of the fingers 232 and 234, the whole peach will be firmly held in such position by these fingers and with the longitudinal axis of the pit extending radially of the turret. Thus held it will be positioned first opposite the trimming mechanism and thereafter will be laterally shifted by the turret into the plane of action of the rotary saw, whereby the stem end of the peach is first trimmed and thereafter sawed into two sections and in a plane parallel with the plane of maximum diameter of the pit, the line of severance made by the saw taking place through the plane of maximum diameter of the peach, which may or may not be through the plane of suture of the peach, although it will be parallel with the plane of suture of the peach.

*The flesh and pit dividing means*

Means is provided for splitting, cutting or sawing the flesh of the fruit and also the pit, and this is accomplished in a plane parallel with the plane of maximum diameter of the pit and while the whole fruit is held stationarily in the feed-in turret fingers as hereinbefore described. The fruit and pit dividing means preferably comprises a rotating saw 251, see Fig. 3, which is mounted on a shaft 252 carried in a swinging arm 254 in turn mounted on a shaft 256. This latter shaft is carried in bearings on arms 258 rigidly mounted on the main upright frame of the machine.

Opposed stops, i. e., screws 260, adjustably limit the oscillatory movement of the saw. The saw shaft 252 is rotated by a belt 262, see Fig. 1, through the instrumentality of a double pulley 264 and a pulley 266. A second and larger belt 257 runs on the pulley 264 and thence to a larger pulley 268 which latter is driven by the motor 21 mounted on the top of the main upright frame. This same motor 21 is utilized for driving the main driving pulley and clutch mechanism of the entire machine.

The whole peaches are hand fed between the open fingers 232 and 234 on the feed-in turret. As so fed, each peach is positioned with its crease vertical and its stem end outwardly. The upper and lower fingers 232 and 234, due to their intermeshing connection and their springs, always come to the same closed position with respect to a center line horizontally disposed half-way between the pivotal axis of the fingers 232 and 234. Peaches not being all of the same shape, some being generally round and others being lop-sided, it is necessary to position or feed the peaches between the fingers with the largest diameter of the peach centrally located with respect to the central plane of the fingers, and with the crease or suture line parallel to a vertical plane passing through the fingers. When the fingers are swung to position the whole peach opposite the saw, as shown in Fig. 3, the inner curved wall of the peach will be supported by the finger 230 and the upper and lower curved wall of the peach will be supported by the spaced apart fingers 232 and 234 and on opposite sides of the slots 239, the fingers being spaced apart by these long slots. In this position the rotary saw 251 will advance about its pivot 256 to saw through the flesh of the whole peach as well as through the pit. The line of severance will pass through the peach on a plane parallel with the greatest diameter of the pit and preferably through the greatest diameter of the pit, if such diameter of such particular peach happens to coincide with the fixed plane of oscillation of the rotating saw. In a large percentage of instances, the saw cut will occur to one side of the largest diameter of the pit. The oscillation of the saw is such that it passes into the slot in the upper and lower fingers 232 and 234 as well as through a vertical slot in the bottom of support 230. The saw in its upward movement is arranged to sever the peach into two parts. If desired, the swinging movement of the saw in its forward movement may be arranged to sever all but a relatively small cord of the whole peach. It will be noticed that during this sawing action the peach is supported on each side of the upper and lower peripheries, close to the line of severance, and not at points at right angles to the line of severance. This eliminates the tendency of the saw to bind as it goes through the hard pit.

*The main fruit holding turret*

Means is provided for holding the divided or half fruit sections in a manner so that such sections may be subjected to one or more treatments; specifically, so that the half peach sections carrying the half pits therein uppermost may be held preferably with the longer axes of the pits substantially coinciding with the radius line of the turret that passes through the fruit holder holding such half fruit, whereby the axis of movement of not only the pitting means but also the peeling means will lie approximately parallel to the longer axis of the pit, and whereby the peeling, pitting and discharging of the half fruit from the holding means is facilitated.

In the present instance there is provided a sleeve 139 which turns loosely on the main vertical shaft 136 and extends upwardly above the Geneva disc 140. This disc is fixed to the lower end of sleeve 139. The upper end of sleeve 139 carries a boss 272, see Fig. 3, having an upper disc 274 to which the bottom-most spider of the fruit holding turret 276 is adjustably bolted, the adjustment serving to provide angular adjustment of the fruit holding turret relative to its turning sleeve, whereby to provide an adjustment for insuring that the half fruit receiving and spreading transfer wings or members, hereinafter described, are at the proper closed together position at the time the fruit halves come onto them.

As clearly shown in Fig. 2, the turret disc is provided with a spider providing a mounting for the half fruit receiving means, herein specifically shown as cups. There are six of these cups, each disposed with its center located radially of the shaft 136.

Directly surrounding shaft 136 above turret 276, is located a long sleeve 278, see Figs. 17 and 25. This sleeve forms a mounting for a plurality of devices. It is formed at its upper portion with a preferably integral outstanding projection 280 which faces toward the transfer jaws. As shown clearly in these figures, this projection 280 is formed somewhat generally rectangular. In the side facing the feed-in station it is formed with a substantially central vertical guideway 282 of rectangular cross section. On either side there are provided horizontal bores 284 and 286. Bore 284 receives stationarily one of the rails 288, see Fig. 15, for the slidable carriage of the transfer jaws. The rail is held fixed therein by means of a set screw. The other bore, 286, receives a bushing 289, see Fig. 25, into which is turnably mounted the other round rail 290, see Fig. 15, forming the carriage slide. Lateral face 292 of the projection 280 is formed with a vertical guideway 294 of rectangular cross section. In addition, the walls of this lateral face 292 are provided with bolt holes to receive bolts 296 for attaching to this face and closing the face of the guideway 294 a vertically extending bracket 298, the top of which overhangs the projection 280 and is formed with a laterally extending arm terminating in a bearing sleeve 300 in which is loosely mounted shaft 174, see Fig. 3. Shaft 174 is driven by shaft 154 of the feed-in turret and has a circular collar 302 pinned thereto, as at 304, which circular collar supports fixedly thereto by means of the same pin 304 the cylinder 178, upon the outer wall of which an endless screw 308 is formed.

The lower portion of long, vertical sleeve 278 is formed with a preferably integral, substantially rectangular, flat portion 310 which extends laterally of the sleeve. This plate is likewise provided with a rectangular raised boss 312 which terminates on each side short of the vertical sides of the flat portion 310 to provide two spaced guides 314 and 316. The front face of the raised boss 312 is formed with a threaded bore 318 into which passes a bolt 320, see Fig. 17, for firmly fixing to the raised boss a bearing block 322, having on its top spaced half bearings 324 and 326 so that the upper inner faces of the half bearings 324 and 326 are spaced from the front face of the flat portion 310 to provide room for intermeshing sectors 328 and 330 fixed on the inner ends of short shafts 332 and 334. These shafts oscillate in the bearings 324 and 326, and their outer ends have fixed thereto short levers 336 and 338, which each have at their upper ends outwardly and oppositely facing bushing sleeves 340 and 342. Bearings 324 and 326 are closed by upper half bearings 344 and 346 formed in a cap 348 fastened to the block 322. This bearing block 322 is formed at its bottom with opposed extensions 350 and 352 having threaded bolt holes. To each extension is bolted a vertically extending cam 354 and 356.

Means is provided for operating the half fruit spreaders from the central rotatable vertical fruit turret shaft 136 and for likewise operating therefrom the fruit transfer jaw mechanism. Above the upper end of the long, vertical sleeve 278 and adjacent the overhanging bracket 300 are positioned two cams 358 and 360, see Fig. 17. These cams directly surround shaft 136 and are pinned thereto for rotation with shaft 136. Each of these cams is formed with an endless cam race of desired shape, in each of which operates a roller 366 and 368. Roller 366 is mounted upon the upper end of a vertically reciprocable rack rod 370 which slides in guide way 294 of the upper bearing 280 on sleeve 278. This rack rod has fixed to its lower end a rack 372, the teeth of which, as shown in Figs. 17 and 25, mesh with the teeth of the sector 328.

*The half fruit spreaders*

This rack rod 372 slides against face 314 of the bushing 312. The bottom of this rack has bolted thereto a cross bar 374, to the other end of which is bolted a shorter, vertical rack 376 which slides against the face 316 of bearing 312. The teeth of this rack mesh with the teeth on the second sector 330, wherefore upon vertical reciprocation of the racks 372 and 376, the shafts 332 and 334 and their arms 336 and 338 will be oscillated.

Figure 19:
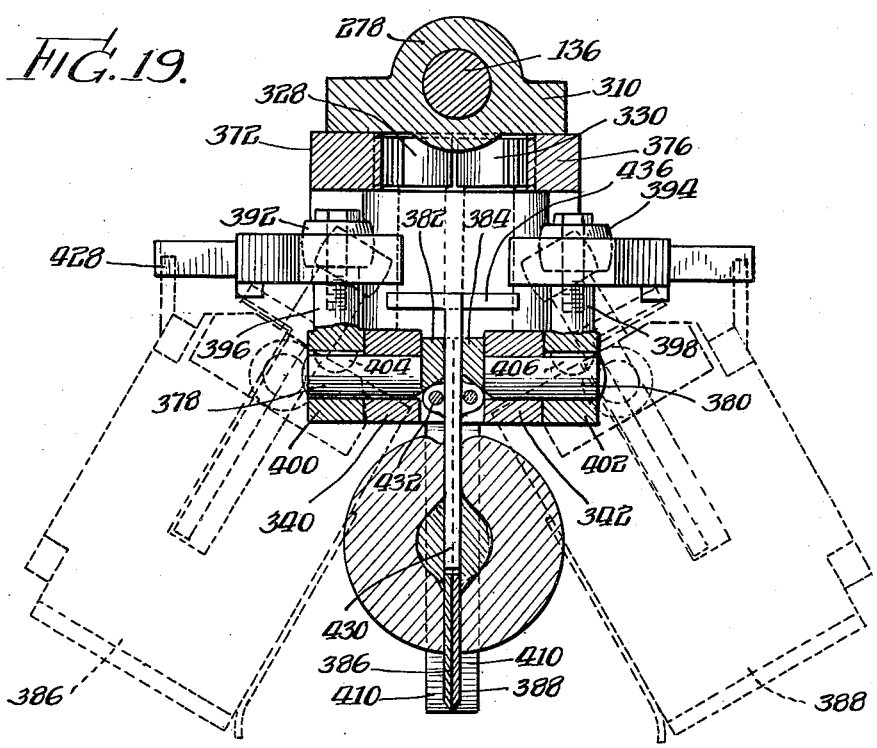
Fig. 19 is a plan sectional view taken on line 19—19 of Fig. 17, showing means for transferring fruit to the peeling cups, and also showing the separating blades in dotted lines indicating the positions they assume when depositing fruit into the fruit cups.

Loosely turnable in each of the bearing sleeves 340 and 342 are short shafts 378 and 380, see Figs. 19 and 24. Each such shaft has integrally, as a part of one end, a small plate 382, 384, see Fig. 24, extending at right angles to the shaft. These plates carry the spreader arms or plates 386, 388, which are relatively thin, flat and preferably rectangular.

Means is provided for oscillating each spreader plate from the vertical position, in which position the plates abut one another, and in which position the fruit halves are received on either side thereof, as shown in Fig. 21, to a position in which the two plates are substantially horizontal and wherein each plate is immediately over a fruit holding cup and approximately three-quarters of an inch, more or less, thereabove. This is the half fruit depositing position, and is accomplished by the racks 372 and 376 and the toothed sectors 328 and 330 heretofore described.

Means is provided for throwing the center line of each spreader plate exactly 30 degrees from the parallel central axis of the two parallel shafts 332 and 334 which oscillate the blades to a position wherein the blades will lie, when horizontal, radially of the fruit turret 276 to correspond with the radial position of the center line 390 of the fruit cups, which line lies on the radius of the central axis of the vertical shaft 136 of the fruit turret, as shown in Fig. 2. This means includes the two spaced cams 354 and 356 cooperating with the rollers 392 and 394 mounted on the ends of short arms 396 and 398, each having a sleeve 400, 402 keyed as at 404, 406, on the two shafts 378 and 380, see Figs. 17 and 24.

This motion of the spreaders demands that the outer ends of the spreaders describe a much greater arc than the innermost ends, in order to overlie the radial cups. This in turn requires means cooperating with the spreaders, and preferably on the spreaders, for positively holding the severed peach halves on the spreaders during this arcuate movement. In the prior Ewald machines disclosed in pending applications, the spreaders are provided with substantially central sharp fins that cut into the central relatively soft core of the half pears or other half fruits and tend to hold the half pears on the spreader during the quick downward flip thereof. In addition, the transfer jaws were positioned relatively close to the half pear on the spreader and moved directly outwardly away from the spreader and half pear as the spreader moved downwardly to deposit the half pear in the cup, whereas in the present peach machine, due to the necessity of the additional arcuate movement imparted to the outer portion of the spreader, the transfer jaws cannot be positioned so close to the spreader to provide the additional support for the peach. Also, due to the presence of the hard pit, no cutting fin or blade can be placed on the spreader to hold the half peach from slipping down on the spreader. Therefore it is necessary to provide a bottom shelf or ledge on the bottom side of the spreader with outwardly flaring outer ends to guide and support the bottom peripheries of the half peaches, and likewise to provide a top holding means with outwardly flaring entry edges to guide and to overlie the upper peripheries of the half peaches as each half peach is transferred onto the spreader. This upper holding means is spring pressed normally to closed position and is moved outwardly by the entering half peach so as to close over the upper edge of the half peach and to hold it on the spreader.

Means is also provided for automatically shifting the holder outwardly in the down position of the spreader to release the half peach into the cup. To this end the bottom outer face of each spreader, see Figs. 21–24, is provided with a narrow ledge 410 having a downwardly flaring front lip 412. The upper outer face of each spreader is provided with a retaining clamp 414 formed by providing the upper outer face with two spaced outstanding lugs 416 and 417 bored to receive a pin 420 which also passes through two spaced lugs 418 on the outer face of the elongated clamp 414. A tension spring 422 is coiled about the pin and arranged normally to resiliently hold the clamp 414 snugly against the upper outer face of each spreader. The front wall of each elongated clamp flares outwardly as at 424 so as to direct the peripheral wall of the half peach beneath the clamp, thereby slightly to open the clamp and to hold the upper edge of the half peach against the spreader plates 386 and 388 while at the same time the ledges 410 will hold the lower edge of each half peach. The rearmost portion of each pivoted clamp is provided with an integral releasing arm 426 which, when the spreader plates reach horizontal discharging position, as shown in dotted lines in Fig. 19, contacts a fixed stop 428 on a stationary part, whereby to open the clamp against the spring tension. In addition, each spreader plate is provided with means for ejecting the half peach from its surface when the spreader reaches horizontal position. This comprises an arm 430 pivoted at 432 within a cut-out 434 in each spreader plate and normally lying within the outer face of the spreader plate. Each such arm is provided with an extension 436 adapted on horizontl positioning of the spreader plate to contact a fixed stop 438 and swing the longer arm 430 of the ejector outwardly forcibly to eject a half peach downwardly into its cup. This ejecting movement takes place substantially simultaneously or in adjustably timed relation with the action of the arm 426 against the stop 428 for releasing the peach from the swinging peach distributing or spreader plates 386, 388.

The fruit transfer mechanism

Means is provided in association with the feed-in turret fingers and saw and spreader plates for transferring the severed or partly severed whole fruit from the first feed-in turret, past the saw, and for delivering the divided sections or half peaches onto the spreader plates for subsequent delivery into the fruit cups. To this end two parallel rod rails 288 and 290 are supported at one end in the bores 284 and 286, respectively, of the enlargement 280 on the upper end of the vertcal sleeve 278, see Figs. 12–17. The opposite ends of these rails are supported in bearings on a cross brace carried by the frame at the vertical shaft 154 which operates the feed-in turret. Rail 288 is fixed against turning, whereas rail 290 is mounted in its bearing 289 and its opposite bearing for oscillation. Cam 360 through its roller 368 vertically reciprocates a slide 440 carrying a pivotally mounted block 442, which block slides between furcations 446 and 448 on an arm 450 keyed on shaft 290. The opposite end of arm 450 carries an offset arm 452 on which is rigidly mounted an elongated rail 454 extending parallel to the rail rods 288 and 290. Bolted to the upper side and under side of the projection 280 are two guides 456 and 458 which form a vertical slideway for the vertical slide 440. In addition, the lower guide 458 has bolted to its front, as at 460, a bracket 462 for supporting a stationary spreader blade 464 interposed between the rear position of the saw 250 and the oscillatable spreader blades 386 and 388, see Fig. 3. This stationary blade shifts the peach halves laterally out of contact with the saw and onto the oscillatable spreaders.

A transfer jaw carriage is composed of two parallel sleeves 466 and 468 connected at opposite ends by castings 470 and 472. Rotatably mounted on sleeves 466 and 468 by means of concentrically surrounding sleeves 467 and 469 are two depending arms 474 and 478 maintained always at the same distance mutually from the center line 480 by means of intermeshing gear sectors 482 and 484. Projecting from one side of sleeve 469 is a lateral lug 486 carrying a roller 488 which is adapted to lie on the rail 454. Slidable on the rail 454 is a shoe 490 having a pin threaded into its under side and depending therefrom. A coiled spring 492 surrounds this pin between the shoe and a lug 494 which is screwed into the lower part of arm 478, and through which the pin moves freely. The function of this spring connection is to permit the cam mechanisms 360 and 368 and the arm 452 that oscillates the rail 454, to force the rail to its down position even if the arm 478 is pushed outwardly due to an oversized or larger half fruit engaged by the cup on the arm 478. This spring 492 also serves to maintain a proper tension upon the jaws on arms 474 and 478 to transfer the fruit.

The transfer jaw carriage is provided with an adjustable travel over and above the travel given to it by the screw 178. This is done by a lever 496, see Figs. 15 and 16, pivoted to casting 472 by a stud 498. This lever carries a dog 500 which is secured to the lever 496 by a stud 502 and which runs in the endless groove of the screw 178. As the carriage moves to the left through the endless groove and its dog 500, it reaches a point where the lever 496 contacts an adjustable pin 507 dependent from a bearing support casting 506, see Fig. 3. Since this contact stops further movement of the outer end of the lever 496, and since at this point the dog 500 on the lever is still continuing to travel to the left, the outer end of lever 496 will be swung to the left about stop 507 as a fulcrum, and since the transfer jaw carriage is rigid with the pivot 498, the carriage itself moves to the left an additional distance beyond the distance it is caused to travel by its endless screw. In addition, this mechanism provides a longer rest period at the points or times when the jaws are transferring fruit from the feed-in jaws to the transfer jaws and from the latter to the spreaders.

On the return movement of the carriage, the first action is that of dog 500 in shifting the lever 496 about its pivot 498 in a direction to the right until the free end of this lever strikes an oppositely adjustable stop 505, whereupon the continuing movement of the dog to the right compels movement of the carriage to the right through the pivotal connection 498. This additional travel of the carriage on the rails is limited by adjustable stop means 505'.

To accommodate differences in thickness of relatively thicker or thinner halves of fruit on the same peach when grasped by the transfer jaws 474 and 478, one of these jaws is broken and hinged and provided with supplemental springs to make up this difference in thickness. For instance, arms 474 and 478 come together in unison to a common distance from the central plane 480, Fig. 12. Arm 474 is provided intermediate its height, as at 510, with a pivotal connection to a lower portion 512. Arm 512 below pivot 510 has an outstanding lug 514 between which and another lug 516 on the upper part of arm 474 a coiled spring is confined at each end. In operation this provides the necessary resilience to take up the variation in thicknesses. If desired, both arms may be provided with this type of resilient adjustment.

To provide against turning the peach as it is dragged over the surfaces of the saw, after splitting, there is provided on the inner surface of the transfer cups 481 sharp, knife-like fins 518, 520, which lie in a vertical plane to prevent the peach halves turning in the transfer cups about horizontal axes. This means preserves the positions of the halves of the peaches during the transfer from the sawing station to the pitting station.

*The pitting mechanism*

Figure 32:
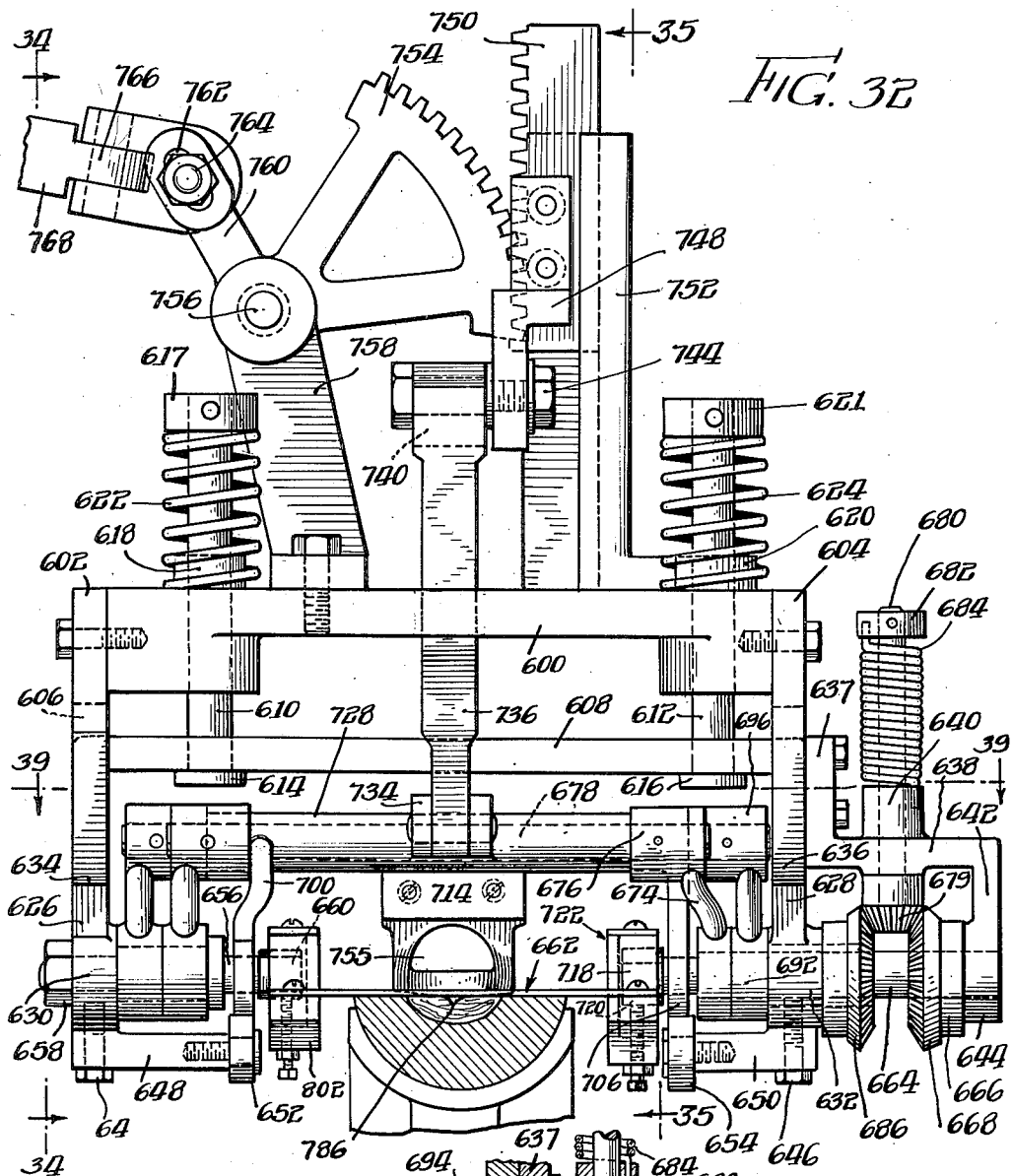
Fig. 32 is a side elevational view of the fruit pitting mechanism.

The pitting mechanism includes a preferably vertically reciprocating carriage 600, Figs. 32 to 35 and 43 to 46, which is preferably horizontally disposed. This plate 600 has its opposite ends provided with depending furcations 602 and 604 suitably bolted thereto, as shown in Figs. 32 and 34. These furcations provide vertical guideways 606 for slidably receiving a vertically, resiliently adjustable pitting frame 608. This frame 608 has spaced portions receiving pins 610, 612, which pins have heads 614, 616 on their bottoms below the frame. The upper portions of these pins pass through the bores of the carriage 600 and are provided thereabove with adjustable stop collars 618 and 620 which determine the lowermost positions of this pitter frame 608 with respect to the carriage 600. The upper ends of these pins 610 and 612 are provided with coiled springs 622 and 624 spaced between the collars 618, 620 and the top of carriage 600. These springs resiliently support and balance the main frame 608 on the carriage. One end of the main frame 608 is heavier than the other because of the gearing thereat. These two adjustable springs 622 and 624, when adjusted, serve to balance the weight of the main pitter frame 608 with respect to the carriage 600, and also reduce to a minimum the pressure exerted on the tender face of the peach. This pitter frame 608 is preferably formed like an inverted yoke and comprises a horizontal cross portion and two legs 626, 628. Each of these legs is a straight, vertical leg and is provided with a bearing. Leg 626 is provided with a bearing 630 and opposite leg 628 is provided with a bearing 632. The bottoms of the vertical guideways 602 and 604 of the main carriage 600 terminate at 634 and 636 respectively. Vertical leg 628 has bolted to it an extension leg 637 formed with a lateral horizontal extension 638, provided in turn with an upstanding boss 640. The boss and the lateral extension are bored to receive a vertical shaft, later to be described. Extension 638 is formed with a vertical leg 642 having a bearing 644 which is bored and is in registration with the bore in the bearing 632 of the adjacent leg 628. Thus the vertical legs 626, 628 and 642 slide vertically in the vertical guideways of the carriage 600. The two bearings 630, 632 each have bolted to the under side thereof, as at 645 and 646, a short bar-like support 648, 650, which supports extend inwardly and each has a roller 652, 654 rotatably supported thereon. These rollers form supports for mechanism hereinafter described.

Bearing 630 clampingly supports a fixed shaft 656 by means of a nut 658, which shaft has on its opposite innermost end a boss 660 which is flattened on its opposite vertical sides to form a guide for slidingly supporting and guiding the apertured presser plate 662. A second short shaft 664 is loosely disposed on bearings 644 and 632. This shaft 664 has pinned thereto, as at 666, a bevel gear 668, and also has pinned thereto, at 670, in spaced relation therefrom, a collar 672 carrying a lever 674 which at its upper end is formed as a bored collar 676, to which is pinned a cross shaft 678. Bevel gear 668 meshes with a bevel pinion 679 fixed to shaft 680 which passes through the boss 640 on the extension arm 638. The upper end of this shaft is formed with an adjusting collar 682 and a coiled spring 684 is fixed to the collar and to the extension. A second bevel gear 686 meshes with pinion 679. This bevel gear 686 is pinned at 688 to a sleeve 690, through which the shaft 664 passes. This sleeve 690 oscillates in bearing 632 and extends inwardly to a collar 692 which is integral therewith. This collar 692 has an integral lever 694 which has on its upper end another collar 696 pinned to a second cross shaft 698 running parallel to the first shaft 678. Each of these shafts 678 and 698 has a long sleeve 728 and 730 loosely surrounding it. Each of these sleeves has intermediate its length a lug or arm 710, 712, to which are detachably fastened the pitter blades 714 and 716, illustrated in Figs. 39 and 43 to 51, and hereinafter described. Sleeve 728 has in addition an integral arm 700 having on its bottom an enlargement 702 formed with an elongated slot 704 through which passes the fixed extension shaft 656 carried by the bearing 630. This slotted enlargement cooperates with roller 652 so that such roller in certain positions of the enlargement will limit its downward movement.

The other elongated sleeve 730 likewise has integrally depending therefrom an arm 706, the bottom part of which forms an enlargement 708, likewise provided with an elongated slot 709. This enlargement 708 in turn cooperates with roller 654 so that the latter in certain positions of the enlargement will limit the downward movement of the enlargement 708.

The extreme inner end of shaft 664 is of reduced diameter, as shown at 718, Fig. 42, and is provided with a bushing 720 which is flattened on its two opposite vertical sides 722, 724, slidingly to support and guide the opposite upstanding block 782 on the apertured presser plate 662.

The slots 704 and 709 in the enlargements of arms 700 and 706 are on an arc that corresponds to the distance between the center of rotation of the sleeves and the center of rotation of the shafts on which they are pivotally supported for oscillation.

The rollers 652 and 654 comprise means for preventing these slotted enlargements from dropping down when the arm 700 and 706 are swung to substantially a horizontal or diagonal position with respect to the presser plate 662, as shown in Fig. 49. If these arms 700 and 706 were to drop downwardly at this time it would permit the pitter blades carried by the sleeves 728 and 730 to open and to swing downwardly and into the body of the peach during the pitting operation, whereas it is necessary to cause the pitter blades to move in a truly circular arc and to keep them together to complete the severance of the under side of the half fruit. To this end the bottoms of the main pitter frame 608 are provided with these rollers 652 and 654 which are thus positioned immediately under the path of oscillation of each of these slotted arms 700 and 706 to permit free, unsupported swinging movement of each of said slotted arms 700 and 706 for about a distance equivalent to less than one-third of the way around the under side of the pit, at which time the under surfaces of these slotted enlargements come in contact with the rollers 652 and 654, thereby preventing each arm from dropping down and compelling each arm and hence each pitting blade to swing in a truly circular path and hence follow closely the contour of the under side of the pit. The ends of the slots 704 and 709 cooperating with the shafts 656 and 664 give control of the cutting edges so that they will meet properly at the finish of the cutting.

Figure 33:
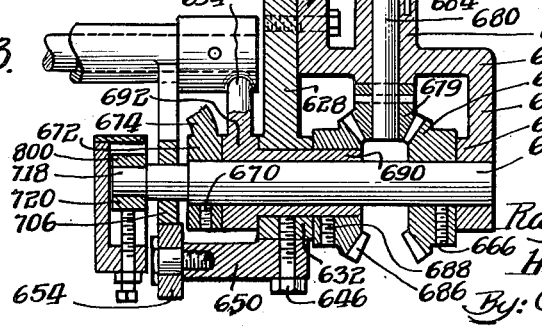
Fig. 33 is a fragmentary sectional view of parts shown in the lower right-hand portion of Fig. 32.

The function of the bevel gearing 668, 679 and 686 and the spring 684 is to provide tension between the pitter sleeve arms 700 and 706 through the bevel gears whereby to keep these arms together in their uppermost positions, see Fig. 33, and to provide sufficient spring resistance to be greater than the resistance offered by the drag of the pitter blades across the face of the flesh of the half fruit into contact with the marginal walls of the pit. At this time the pit offering greater resistance to the further dragging movement of these pitter blades, the spring resistance of the spring 684 is now overcome and the pit stopping this dragging movement of the blades in their inward pit-locating movement, the blades then start to swing down through the flesh under the pit, around a common fulcrum or pivot point. The central axis about which these arms 700 and 706 now swing is the axis of the stationary shaft 656 and the axis of the coaxial oppositely disposed movable shaft 664. During the locating movement of the pitter blades, the axis about which each of the pitter blades swings is the axis of the elongated sleeve that carries such particular pitter blade. For instance, referring to Figs. 47–51, inclusive, during the pit finding or locating movement of the pitter blades, blade 714 will first swing about the axis of the shaft 678 carrying the sleeve 728, and blade 716 will first swing about the axis of the shaft 698 carrying sleeve 730. However, as soon as the pitter blade contacts the side walls of the pit, the pit will then form a fulcrum preventing further independent swinging of the arms 700 and 706 about their respective axes 678 and 698 and thereafter the said arms will swing about the common axis 656, which is the central axis of the coaxial shafts 656 and 664. By this means the pitter blades which swing with these arms will then follow closely, in a truly circular pathway, the marginal outlines of the pit, thus reducing to a minimum the amount of flesh cut from the fruit during the pitting operation. In short, the pitter blades will shift across the cut face of the half fruit, swinging on their respective axes 678 and 698, until each blade locates its respective edge of the pit, and thereafter each blade will then swing about the common axis 656 which is located very close to the cut face of the half fruit. The location of this shaft 656 is adjustably predetermined so that the arcuate swing of the pitter blades will be of just sufficient depth to cut cleanly around the under side of the pit without digging any extra amount of flesh of the peach.

The bevel gears of the gearing 668, 679 and 686 equalize and cause the pitter blades to move uniformly through their cutting strokes, i. e., they tend to prevent one blade running ahead of the other.

Each sleeve 728 and 730 is provided intermediate its length with an outstanding short furcation 732 and 734, to which is pivoted the bottom of an arm 736 and 738, Figs. 32 and 43 to 46, curved outwardly at its bottom and extending upwardly. Means is provided to compensate for varying thicknesses of the half fruit to be pitted or cored. To this end the top of each arm 736 and 738 is slotted as at 740, 742, to slidingly engage a pin 744, 746 adjustably carried by a block 748 fastened to a vertical rack 750 supported by a guide 752 on the carriage 660. This rack 750 is reciprocated by a sector 754 pivoted at 756 on a mounting 758 on the carriage 600. This sector in turn is oscillated by an arm 760 having a slotted hole 762 engaging a pin 764 on a universal 766 on the end of an adjustable rod 768 operated by the vertically disposed oscillatable shaft 50, Figs. 2 and 4, hereinbefore described.

Figure 43 shows the drive studs 744, 746 in the upper end of the slot, thereby holding the pitting blades in an open position as the assembly lowers down onto a half peach. Figure 44 shows the gauge plates 662 in contact with the fruit, and an example is depicted wherein the fruit is thick enough to raise the assembly to a point where the drive studs 744, 746 are in the center of the slots. If these slots were not provided, a thin piece of fruit would not get proper contact and a thick piece would be smashed, due to the fact that studs 744, 746 were rigidly placed at this time.

At the initiation of the pitting operation, in view of the fact that the successive half pits may be located either centrally of or to either side of the center of the half peach to be pitted, we have provided means for causing the pitting mechanism to travel laterally across the cut face of the half fruit and to contact the peripheral edge of the severed half pit before digging into the flesh of the fruit at the cut face thereof. In order to accomplish this action, the pitting means, which is shown particularly in Figs. 36, 37 and 38, is provided with one or more, preferably one, relatively sharp points centrally located, which is the only part of the pitting means which actually penetrates the flesh of the fruit at the cut face thereof prior to the acual pitting operation, during which operation the cutting edges of the pitting means actually cut into the body or flesh of the half fruit, starting at the cut face of the half fruit at the peripheral or marginal edges of the severed half pit and following along the under surface in a true circular path and substantially exactly cutting the flesh of the peach cleanly at the juncture of the pit curved surface and the flesh.

To carry this out, at the initiation of the pitting operation it is desirable to project the point or points of the cutting edge of each pitting blade a predetermined short distance slightly into the flesh of the fruit at the cut face of the half fruit and on each side of the severed half pit. This projection of each point on the pitter blade is relatively slight but is sufficient so that during the lateral shift of each blade across the cut face of the half fruit these relatively small points on each pitter blade cut through a slight superficial layer of the cut face of the half fruit, the cut being practically of a line width and being imperceptible due to the stickiness and moist nature of the cut face of the half fruit after it has been pitted and processed. This projection of each point on the pitter blade is sufficient, however, so that during the lateral shift these relatively small points on each pitter blade cut through the superficial layer of the cut face of the half fruit until they come into contact with the outer opposed edges of the half pit at the margins of the cut face, and since these points project slightly into the cut face this insures that the points of the pitter blades will contact the pit half slightly beneath the cut surface of the pit at its margin, whereby to insure that the pitter blades will thereafter be directed downwardly around the under surface of the half pit in their cutting movement, so that they will swing around, under or beneath the pit.

Thus means is provided for adjustably insuring and also determining this initial projection of the points of the pitter blades a desired relatively small depth into the cut face of the half fruit on opposite sides of the half pit. In the present embodiment of the invention there is provided means for contacting the cut face of the half fruit on opposite sides of the central seed containing section, to wit, in the case of a peach or apricot the half pit, and thereafter utilizing this contacting means adjustably to determine the depth of projection of the pitter blades into the cut face of the half fruit as before described. In the specific construction utilized, the presser plate 62 is preferably formed of two flat, shallow plates 770 and 722, Fig. 40. The central edges of these plates are cut out, as at 774 and 776 and these cut-outs are in registration to provide an opening or aperture considerably larger than the greatest diameter of the half pit in order to accommodate variations in eccentric location of the various pits in successive half fruits. By spacing the plates apart as at 778, a sufficient aperture is provided. At opposite ends of these plates, blocks 780 and 782, Figs. 41 and 42, are provided, which in general shape are similar except for a vertical guideway. Each block is formed with a pair of oppositely projecting arms 784 and 786 to which an end of the presser plate is secured, as at 788.

In addition, each block is formed centrally with an upstanding portion generally rectangular and provided with a vertically extending rectangular cut-out 790, 792, forming guideways to receive the bushing 720 at one end and the flattened portion 660 of shaft 656 at the other. This is for the reason that shaft 656 does not rotate and therefore the flattened portion 660 holds the presser plate in horizontal alignment and still permits vertical movement. Since shaft 664 rotates, a bushing is provided principally to take up undue wear in operation, otherwise the reduced shaft 718 could slide and rotate in a groove 792 made to fit its own diameter.

The top of each cut-out 790, 792 is closed by a plate 794 secured by a screw 796. The cut-out guideway 790 of block 780 is narrower than the cut-out guideway 792 of block 784. Cut-out 792 receives the bushing 720, Figs. 40 and 42, on the inner end of oscillating shaft 664. The vertical sides of this bushing and of the cut-out are parallel and vertical, whereby to permit the presser plate and bushing to have relative vertical movement while the plate is prevented from rotating. Similarly, the somewhat smaller cut-out 790 of block 780 has parallel vertical walls slidingly to receive the flat, parallel, vertical walls 660 of an otherwise round sleeve 656 held securely against rotation in the bearing 630 by the nut 658, Fig. 32. It will be remembered that shaft 656 is stationary, while coaxial shaft 664 oscillates, being oscillated by arm 674 integral with sleeve 728, in turn oscillated by lever 736 from the sector and rack mechanism shown in Fig. 32. In addition, each block is provided with a centrally depending portion 802, 803, each bored vertically and threaded to receive an adjusting screw 806, 808, the upper ends of which are adapted adjustably to contact, and in one position support, the bottom portion of the bushing 720 in the case of the block 784, and the circular sleeve 660 in the case of block 780. The height of each vertical guideway 790, 792 is sufficient to provide a space between the bushing 720 and the sleeve 660 when supported on their respective screws and the top plate 794 of each block. The adjustment of the screws through the blocks in a clockwise direction will raise the pitting blades relative to the presser plate so that they will not project downwardly through the apertures in the presser plate as far as they would project prior to turning the screws. Adjustment of the screws in the opposite direction will serve to lower the pitter blades relative to the presser plate, whereby when the presser plate contacts the cut face of the half peach the bottom edges of the pitting blades will adjustably project more or less into the cut face of the half fruit, which is to say that the pointed central tips 786 will so project.

On lowering movement of the pitter carriage 600, the presser plate is brought to its lowermost position. If no half fruit is in the cup the presser plate 662 will either rest upon the top of the cup, or if no cup is there, the top plates 794 closing the tops of the cut-out guideways 790, 792 will contact the tops of the pin 660 and bushing 801, respectively. This pin and this bushing rest upon the tops of the screws 806 and 808, respectively, when the presser plates rest on the fruit. These screws provide means for regulating the depth of projection of the cutting edges below the under surface of the presser pads or plates 770 and 772. These cutting edges must extend below far enough to assure closing in under the pit. Now, if upon lowering the pitter head a cup is in proper position and the head contacts a half fruit to be pitted, such as a half peach with its half pit unsevered from the half peach, the presser plate 662 will first contact the upper cut face of the half fruit and there will be relative vertical movement between the blocks 780 and 784 fixed to the now stationary presser plate and the still lowering pin and bushing 660 and 720 until said pin and bushing contact the tops of the adjusting screws 806 and 808. Thus when the presser plate contacts the cut face of the fruit and can move no lower, and when the presser plate screws 806, 808 have been adjusted to the correct setting, the points of the pitter blades will project through the opening in the presser plate the desired amount and the points 786 on the pitting blades will be projected the desired distance into the cut face of the half fruit on opposite sides and spaced from the half pit.

If too much of the half fruit should project above the upper rim of the fruit cup—that is, if the half section of the fruit should be of extraordinary size, then the entire main frame 608 will rise vertically relative to the pitter carriage 600 in the frame plate guideways, the springs 622 and 624 in this action taking the weight of the frame off the fruit face, the slots 740 and 742 between the actuating arms 736 and 738 and the rack 750 permitting this rise of the main frame. At this time the pitters are in an outwardly swung position, as shown in Fig. 47, and the sleeves 728 and 730 are pressed together by the spring 684. On preliminary downward movement of the rack 750, the arms 736 and 738 first swing the blades inwardly across the surface of the fruit, the points 786, Fig. 36, cutting slightly thereinto until these points strike the periphery of the pit. During this movement the pitter blades have swung about the individual axes 678 and 698. When the blades strike the periphery of the pit at the cut face of the fruit, the blades then swing or pivot about the common axis 656 of the coaxial shafts 656 and 664. If, during the swinging of the pitter blades about the separate axes 678 and 698 which are relatively remote from the cut face of the half fruit, the pit should be off center of the fruit, as in Figs. 52–56, inclusive, and one blade only contacts the pit, the other blade still approaching the pit, the approaching blade will continue its inward pit-locating motion until it also contacts the marginal edge of the pit. Thereafter, the blades striking the pit, the blades will then swing simultaneously about the common axis 656, thereby swinging the blades downwardly arcuately under the pit, cutting the flesh closely adjacent the pit, the blades tending to follow a true arc of a circle, the center of which is the axis 656 and the radius of which is the distance from the axis 656 and the underside of the pit wall.

As shown in Figs. 47–51, during the movement of the pitter blades from afar up to and around the pit for approximately the first one-third of the distance under the pit or somewhat less than the first one-third, the slotted arms 700 and 706 are out of contact with the rollers 652 and 654; but from the one-third distance on, these arms 700 and 706, due to their eccentric shape, will contact the upper surface of these rollers and will therefore be prevented from dropping and will compel the pitting blades to swing in an arc of a true circle, which will keep the pitting blades up against the under surface of the pit instead of digging down deeply into the flesh of the fruit beneath the pit. In short, these supporting rollers compel the pitting blades to make a shallow cut, thus following the natural contour of the pit. In addition, due to the construction wherein the pivoted actuating arms 736 and 738 moving downwardly are pivoted to arms 732 and 734 disposed substantially at 90 degrees to the face of the pitter blades, these actuating arms 736 and 738 tend to cause the blades to swing in a true circular arc closely following the curvature of the under side of the pit.

Just after the pitting blades 714 and 716 have started under the pit, the whole assembly rises so that the fruit is held clear from the cup, thereby causing the weight of the pitter pad assembly 662 to exert a force or pressure on the flesh only of the half fruit at its cut face in a direction away from the pitter blades, thus effecting a cut close to the under surface or peripheral curved wall of the pit. This action insures the cutting of a minimum of flesh of the pit, whether the pit is large or small.

The pitting blades

The preferred construction of the pitting blades 714 and 716 is shown clearly in Figs. 36, 37 and 38. These blades are drop forged from sheet metal. They include a straight, substantially rectangular portion 751 attached to the arms 710 and 712 of the pitter carrying sleeves 728 and 730 and are adapted to oscillate or swing in an arc toward and from the cut face of the half fruit. The main body 751 of each blade has integrally formed therewith a curved, relatively narrow blade member 753 curved laterally out of the plane of the body 751 and provided with an opening 755. The central portion of the curved cutting edge 757 is provided with a point located in the same plane of the curved portion 753 of the blade. The arcuate cutting edge 757 conforms somewhat to the elongated curvature of the peach pit when constructed for pitting peaches. The point 787 on the edge of the blade is desirable as it allows some portion of the blade to get down to the cut face of the fruit whereby to contact the edge of the pit without causing the main portion of the blade to mar the surface of the flesh during the pit locating operation. The opening 755 in the blade is provided to permit the maximum curvature of pit wall to pass or project therethrough during the pitting action, which eliminates tearing action which would otherwise occur if the blade were not apertured. A pit is wider than it is deep, and with a solid blade cutting would occur only part way and then the pit would be torn out, leaving a rough, jagged, unsightly cavity. This relief is due to the inner arcuate wall 759 forcing the pit upwardly away from the flesh of the fruit. It will be noted that each pitting blade during the actual pitting operation swings only approximately through one-fourth of an arc of a complete circle, the two blades finally meeting at the bottom of the pit to complete the severance of the half pit.

The function of the rollers 652 and 654 acting in conjunction with the slotted enlargement 704 and 709 on the lower ends of arms 700 and 706 is to provide means for supporting the pitting knives after they have traversed part way along the under side of the half pit and thereby compelling the blades to follow the under side outline of the half pit. If the rollers were not present, after contacting the under side of the half pit and pivoting about the common axis 656 the pitting blades would tend to move downwardly into the flesh of the half fruit beneath the pit and would dig very deep cuts into the flesh, which would be wholly undesirable. By suitably shaping the arc or curvature of the portion 757, see Figs. 47-51, when the pitter blades have moved arcuately approximately one-third of the distance, and this length is preselected and may be changed by altering the shape of the portion 757, around the under surface of the half pit, the arms 700 and 706 by such time will have swung upwardly sufficiently so that these cam-shaped portions 757 will have shifted to now rest upon the rollers, and from there on, during the subsequent swinging movement of the arms 700 and 706, these arms and hence the pitting blades will be confined to a circular movement which will closely follow the curvature of the under side of the half pit.

By reference to Figs. 2 and 39 of the drawings, it will be noted that when a half fruit is brought by the turret beneath the vertically shiftable pitting head, the pitting means 714 and 716 are positioned on opposite sides of the pit and that the pitting means moves about an axis substantially parallel with the longer or longitudinal axis of the pit, the blades conforming to the curvature of the pit that corresponds with this longitudinal axis. This is the preferred arrangement.

The pitting method and mechanism form the subject matter of a divisional application.

The half fruit holding means

Except for the size and round shape of the cups to accommodate peaches in lieu of pears as illustrated in the prior filed applications of Mark Ewald and except for the absence of grooves and except for a greater shallowness in the depth of these cups, their construction and operation is identical to the cup structures disclosed in said prior mentioned Ewald applications.

Referring to Fig. 6, the turret disc 276 is provided with a plurality of radially extending spokes 770' uniting with a rim or web 272' forming an intermittently rotating spider. At equally spaced angular intervals about this spider the web is formed with a vertical countersink suitably bored and threaded to receive a bolt 774'. The shank 776' of a half fruit holding means is thus removably mounted in each one of these countersinks on the web. In the present instance six half fruit holding means are so mounted. Each half fruit holding means preferably comprises a cup formed of two relatively hinged halves 778. One of the halves is stationary and is formed with the depending rigid shank 776' heretofore described as bolted to the turret web whereby to carry each complete cup intermittently to and past each operating station. The other half 780' of each cup is formed with rigid furcations 782' and 784', Figs. 29 and 68. These furcations and the shank 776' of cup half 778' are provided with registering bores to receive a pivot pin 786', thereby pivotally holding the cup halves together in closed position or permitting the cup half 780' to swing outwardly from the fixed cup half 778'.

In order to cause an opening movement of the cup half 780', it is provided with a rigid depending arm 788' formed with a lateral offset 790' carrying a roller 792' which is adapted to be contacted by a lug 794' on the bottom of an arm 796' on the peeler head, soon to be described.

The peeling station

Except for certain modifications forming the subject matter of the disclosure and claims of this present application, the construction and operation of the peeling action is precisely the same as that of the machine disclosed and claimed in certain pending applications filed by Mark Ewald, and particularly in application Serial No. 78,508, filed May 7, 1936, jointly filed by Mark Ewald and Henry Skog.

The important differences in the peeling mechanism and its cooperation with the fruit cups reside in the fact that in the operation of pitting the peaches, particularly the clingstone variety, the cups are more shallow than existing half pear holding cups, because it is important to have the gauge or presser plate 662 that determines the depth of penetration of the pitter blade points 787 into the cut face of the half fruit at the subsequent pitting station contact the cut face of the half peach and not the upper rim of the peach cup. By this means there is effected the positive positioning of the cutting edges of the pitting blades a predetermined distance into the cut face of the half fruit to initiate the pit locating action as hereinbefore described. It is not desirable to utilize an apertured paddle in pitting a peach as in coring a pear, because of the necessity of providing an aperture sufficiently large in diameter with relation to the different loci of the half pit in variant shapes of successive peaches operated upon as they pass through the machine. In short, in the average run of peaches the half pits will be eccentrically located with respect to the curved outer walls of the whole or half peach, which will require a larger range of locating or lateral travel of the pitter blades, which in turn demands a larger opening in the presser plate. If the presser plate were to be confined wholly within the inner wall confines of the half peach holding cup, the area of the cross section of the presser plate remaining would be too small and would tend to cut into the cut face of the half fruit, injuring its appearance. Therefore, in the case of pitting peaches the relatively large and wider presser plate is utilized—a presser plate which projects beyond the rim of the cup and this demands that the walls of the cup be cut down or be shallower.

At the peeling station it is important that the cup wall or that half of the cup which supports the half peach from or through which the peeling knife emerges be sufficiently high to support the entire curved wall of the half peach. Experience has shown that as the peeling knife comes up on its emerging travel through the flesh of the half fruit, if the outer wall at the peel is not supported, the presser foot which contacts the center portion of the half fruit will cause the outer peel carrying wall to project slightly over the cup rim so that as the peeling knife emerges it will form a diagonal cut in the flesh of the fruit at the juncture of the cut face of the half fruit and the peel. This is unsightly and ruins the appearance and salability of the half fruit. Hence in the present invention, in connection with the peeling mechanism and cup there is provided means for supplementally supporting that outer wall of the half peach or half fruit located at the arc of emergence of the peeling knife at the cut face of the half fruit.

Referring now to the details of construction of the peeling mechanism, and beginning with an inspection of Figs. 26, 29 and 30, of the drawings, shaft 14 is provided with cam yoke 800' formed with a roller 802' operating in cam race 804' on one face of the double faced cam 24. This cam yoke 800' is provided with a lateral arm 806' having a pin 808' adjustable in a vertical slot 810 formed in a depending ear 812 of a vertically reciprocable peeling slide 814 adapted to slide in guideways 816 of the main upstanding frame. In addition, the upright on which one of the guides 816 is attached is also provided with a bracket 818 having a lateral toe 820 threaded to receive an adjusting screw 822 adapted to contact the bottom of the slide 814 to adjustably limit its downward position, which in turn determines the thickness of the peel taken from the peach at the bottom of the cup. The adjustment 810 is for the same purpose, since it adjustably determines the throw of the slide 814. The screw stop 822 is provided to fixedly determine this adjustment in case the cam race 804 or roller 802 wear.

On the upper end of slide 814 is provided a horizontally disposed platform 824 bolted as at 826 to the top of slide 814. Platform 824 has bolted to its top, as at 828, a bearing 830 for shaft 832. This shaft has keyed thereto a short lever 834 connected at 836 to a universal 838 attached to a rod 840 connected to an arm in turn actuated by vertical shaft 36, see Fig. 2. The shaft 832 integrally has a toothed sector 842 oscillatably depending therefrom for actuating a pinion 844 on a shaft 846 in a bearing formed in depending arms 848 carried by the plate 824. These arms are spaced apart to receive therebetween this pinion 844. In like manner, the opposite side of the plate or platform 824 is provided with depending arms 850 and 852 forming spaced bearings to receive a shaft 854 on which is pinned a pinion gear 856 in turn actuated by a second sector 858 on the end of a depending arm 860 pinned to shaft 832; the end of this shaft has a second bearing 862 on the platform 824. In other words, shaft 832 on its opposite ends has sectors for driving pinion gears 844 and 856 on shafts 846 and 854 which actuate the peeling knife. This peeling knife is thus driven from both ends.

The inner ends of the two spaced short shafts 846 and 854 each have a rotatable block 858, 860, to each one of which is fixed a substantially triangularly shaped block 862, 864 with a groove and screw 866 and 868 for fixing thereto the end of the peeling knife 870. Thus the peeling knife is oscillated from each end. On each shaft 854 and 846, adjacent each block 858 and 860 is a round collar 872 and 874, loosely surrounding the shaft. The collar 874 has an integral curved arm 876 carrying a cross bar 880 which laterally interconnects with the arm 878 on the collar 872, and these two arms are generally horizontally arranged at one side of shafts 846 and 854, see Figs. 67 and 70. The cross bar 880 has extending from its edge a lug 881 which contacts a stud 883 which is attached or screwed into the peeling head 850, and thereby prevents the downward swing of the peeling cup extension 890 when the peeling head 824 rises, but will allow a sufficient movement upward to allow the peeling cup to close. This cross bar has two threaded openings 882 to receive threaded bolts 886 for fastening to the under side of the cross bar a detachable plate 888, the inner wall of which is arcuately formed, as at 890, and shaped to form a vertical extension of the cup rim 892 of the movable sector 780, see Fig. 31. By mounting the collars 874 and 876 loosely on the shafts 846 and 854, the plate 888 may rise and fall as the loose half 780 of the cup moves in under the action of its cam.

Keyed on shaft 846 adjacent to an arm 874 is a cam 882 which cooperates with a roller 891 on an arm 893 pivoted at 894 and having a depending arm 896 carrying screws 898 which pass through a slot 900 into threaded engagement with the arm 796. Another extension of the arm 893 which pivots at 894 is provided with a toothed extension 902, to which is connected spring 904. Teeth 902 provide an adjustment for soft or hard fruit. The farther out the greater the spring tension and the more the pressure of the cup segment upon the fruit in the cup. When fruit is hard it is harder to push over against the stationary section of the cup. Hence this adjustment 902. When the roller 891 is in the low part of cam 882, the arm 796 acts on roller 792 to close the cup sections. The spring 904 resiliently and yieldably holds the cup sections in closed position, and the cups may therefore accommodate fruit halves of various sizes. When the roller 891 is on the high side of cam 882, the finger 796 is moved away from roller 792, thereby releasing the movable section of the cup to allow it to open to normal size such that its inner walls are concentric to the axis of the shaft 854 and the axis of rotation of the peeling knife.

The upstanding platform 824 is provided with a substantially centrally disposed vertical bore to receive the presser foot mechanism, including the vertically operating pressure foot 910 which is adapted to keep the half fruit from turning in the cup during peeling and also to keep the half fruit down in the cup during peeling. The details of construction and operation of this presser foot mechanism are disclosed and claimed in the prior pending application of Mark Ewald and Henry Skog, filed May 7, 1936, Serial No. 78,508, and therefore no further detailed disclosure is given here other than to say that when the peeling head descends to position the peeling blade relatively to the then stationary cup containing a half fruit with its cut face uppermost, the peeling pad mechanism is likewise brought down and is positioned so that the peeling pad 910 contacts resiliently and adjustably with the cut face of the half fruit and is locked by the rack mechanism 912 in such abutting position. During this contacting action the ejector pad 914 is resiliently forced upwardly into the countersink of the peeling pad until such time as the peeling head rises, carrying the peeling pad 910 with it. Since the inner spring 916 is urging the ejector foot downwardly, the ejector foot 914 will be held in contact with the cut face of the half fruit, whereas the entire peeling pad 910 will have risen out of contact with the cut face of the half fruit. This action will break the suction or adhesion between the face of the peeling pad and the wet, sticky, smooth surface of the half fruit. As soon as the peeling head 824 ascends sufficiently, it will likewise carry the ejector foot 914 out of contact with the half fruit. The adjustment 918 is to vary the tension of the peeling pad on the half fruit to accommodate the tension pressing down on relatively hard or relatively softer fruit so as to prevent injury thereto while maintaining the required pressure. The double rack teeth 912 provide a fine setting for the single pawl or tooth 920 which as the presser foot descends into contact with different sizes of successive half fruit, rides freely over the successive ratchet teeth and takes a desired setting of several vertical settings with respect to the series of teeth on the ratchet mechanism. This is due to the spring 924 constantly urging the racks 912 toward the tooth 920. As the peeling knife descends into the half fruit, the tooth 920 is incapable of rising against the rack teeth and therefore the presser foot is firmly held in its adjusted position until released by the cam roller 922 actuated by cam 924 on the shaft 832 to urge the ratchets 912 laterally out of contact with the pawl or tooth 920, thereby releasing the peeling pad and whereby to now permit the free ascent of the peeling pad with the ascent of the peeling head.

By reference to Figs. 2 and 29, it will be noted that when the half fruit is positioned under the peeler head, the axis of turning of the peeler mechanism will be substantially parallel to the longitudinal axis of the pit, whereby to facilitate the peeling operation.

The peeling mechanism forms the subject matter of a divisional application.

The processed half fruit discharge

The fruit discharge mechanism is mounted on the vertically reciprocable frame that also carries the peeling and pitting heads and therefore operates in timed relation thereto. Referring to Figs. 57-60, inclusive, this discharge mechanism comprises a horizontal plate or support 930 having spaced upstanding bosses 932 and 934 through which pass vertical rods 936 and 938. Rod 936 has a bevel gear 940 fixed to its bottom, and rod 938 has a yoke 939 fixed to its bottom. A cross saddle or frame 942 is pivotally carried by the yoke 939 at one end and has a bearing 941 rotatably mounted on the rod 936 at the other end above the bevel gear 940. Cross saddle 942 has spaced depending arms 944 and 946 forming spaced bearings on which are mounted the opposite ends of shaft 948 carrying the half fruit discharge means. In the present instance this is shown as a paddle 950. One end of shaft 948 carries a bevel gear 952 meshing with bevel gear 940 whereby to oscillate the paddle 950 by means of the actuation of the shaft 948. The discharge paddle is preferably of the general type disclosed in certain of the prior Mark Ewald patents and applications. It is formed with flat, spaced apart members 954 and 956 forming therebetween a recess generally conforming to and slightly larger in cross section than the maximum diameter of the half pits of fruit being pitted. In addition, the upper surface of this paddle has pivoted thereto at 958 a flat kick-off member 960 which has an upstanding lug 962 above the pivoted part 958. This upstanding lug 962 is actuated by an arm 964 pivoted at 967 to that bearing 934 on the plate 930 through which rod 938 passes. The upper end 966 of pivoted arm 964 carries a roller 970 working in a cam slot 972 mounted on the upright corner frame 8 between the discharge station and the scavenging station. The rods 936 and 938 above their bearings on the plate 930 are provided with set collars 974 and 976 to prevent the yoke dropping below a predetermined point when the plate 930 is raised. These set collars are vertically adjustable. The upper ends of each rod are provided with caps 978 and 980, and between each cap and the upper portion of the rod bearing is located a coiled spring 981, 983 for normally resiliently supporting the saddle on the plate 930 so that when the plate is lowered the discharge paddle will be resiliently positioned upon the upper face of the half fruit in the fruit holder. Rod 936 is provided with a gear 982 and a keyway which receives a key pinned in the gear 982. This allows the rod 936 to slide freely through the gear and also provides a medium for transferring power from the gear to the rod 936, the rods 936 being disposed in a bearing between the bearing 932 for this rod and a yoke 974 against which the coiled spring 981 presses. This gear 982 meshes with a toothed sector 988 pivotally mounted on the plate 930. The sector 988 is reciprocated by a rod 990 in turn actuated by an arm 992 fixed to the upper end of oscillatable vertical shaft 36, see Fig. 2.

The peel and pit scavenging means

After the processed half peach, properly peeled and pitted, is discharged from the machine by means of the fruit discharger or extractor, leaving the peeling and pit in the cup, the cups then move with an intermittent movement to the peel and pit scavenging station, whereat means is provided for discharging the peel and pit from the cup and in such a manner as to permit the turret subsequently to convey the scavenged cup to the next station in the closed cycle, to wit, the half fruit receiving station, which is directly associated with the spreader plate, and to present a fresh cup to the peel and pit scavenging means. See Figs. 61-66.

To this end, shaft 60 carries intermediate its ends mechanism for operating the scavenging mechanism. This comprises a gear sector 994 pinned to the shaft. This sector has bevelled teeth 996 on its vertical side face meshing with teeth on a bevelled pinion 998 fixed on a cross shaft 1000 mounted on a block or bearing 1002 carrying a friction hub. Shaft 60 oscillates through approximately 148 degrees. A friction collar 1004 is compressed about the hub 1006 by a spring 1008. This hub 1006 is rotatably mounted on shaft 60, while the segment gear 994 is keyed to shaft 60. Ninety-nine degrees of the 148 degrees of turning are used to turn the whole assembly with the shaft 60 to expel the peel and pit. Shoulder 1010 on bearing 1002 then contacts a stop screw 1012. A continued rotation of shaft 60 causes the segment gear keyed to this shaft to turn the pinion 998, which now rotates the scavenger blade 1014 through 180 degrees. The friction band 1004 merely sets up a resistance so that the assembly will turn with the shaft until the stop shoulder 1010 contacts the stops. On the reverse turning of shaft 60, the shoulder 1011 contacts the stop 1013. This is the position at which the peel and pit are taken out of the cup.

The peel and pit scavenging means forms the subject matter of a divisional application.

The fruit receiving and discharging chute

By reference to Figs. 2 and 28, it will be seen that shaft 68 carries fixedly thereon an arm 1016 in turn carrying a fruit discharge trough 1018, which during the oscillation of shaft 68 as hereinbefore stated will be raised and lowered. In lowered position this fruit chute is provided with an arcuate portion 1020 carrying a rubber lip which is adapted to be lowered onto an edge of the cup and slightly to overlie the same in such a manner that when the fruit discharge mechanism shown in Figs. 57-60, inclusive, is operated, the rubber lip will serve to prevent the peeling from being discharged from the cup during the discharge of the half fruit. During this discharge movement the half fruit will be thrown by the ejector blade 960 laterally into the fruit discharge chute 1018, at which time said fruit discharge chute, through the instrumentality of a timed oscillation of shaft 68, will be thrown forwardly, whereby to positively discharge the processed half fruit away from the machine. During this forward movement of the chute 1018, the turret mechanism will have moved a succeeding cup into position so that upon a downward movement of the fruit chute 1018 as hereinbefore described, the rubber lip will be placed again into position to prevent the discharge of the peeling. The details of construction and operation of this type of fruit discharge mechanism are no part of the present invention, except as the same may enter into association with the elements of the present invention to form a new combination. The mechanism per se is disclosed in the prior filed application of Henry Skog, Serial No. 64,526, filed February 18, 1936, in which application the same is claimed.

Operation

Figure 1:
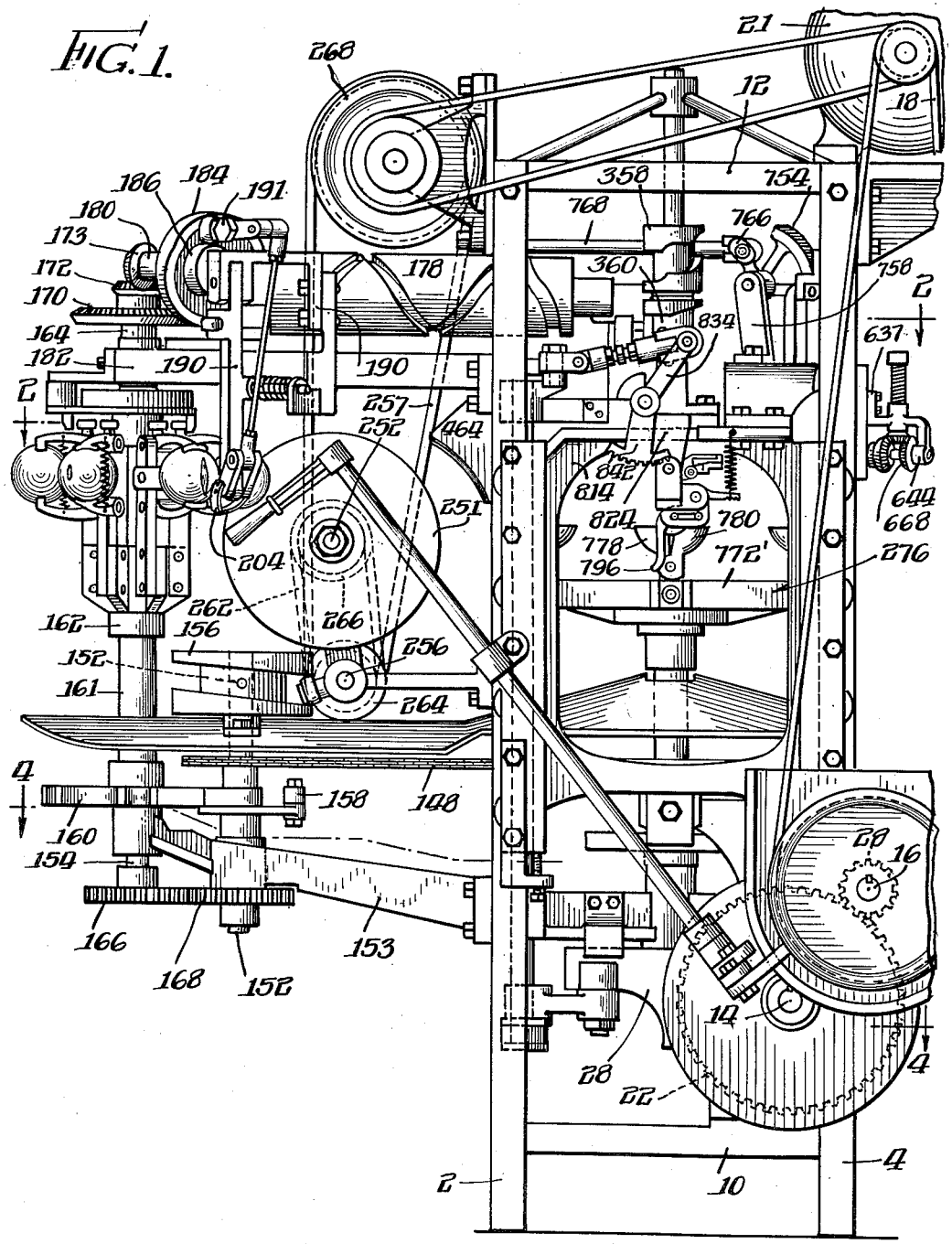
Fig. 1 shows a side elevation of one embodiment of the present invention, disclosing a completely automatic machine.

In the operation of the machine, from the motor 21, when the clutch control handle, shown in Fig. 1, is properly thrown to actuate the main driving shaft from the motor 21, the various shafts, including the two horizontal shafts 14 and 16 and the various reciprocable slides shown in Figs. 27 and 28, are put in operation, whereby not only to advance the feed-in turret 162 step by step but also through the instrumentalities of the driving means shown in Fig. 6 of the drawings to actuate the main turret 276 carrying the cups intermittently in synchronism with the feed-in turret and at a speed twice as fast as that of the feed-in turret. In addition thereto, the endless screw 178 for actuating the transfer jaws will likewise be actuated to carry these jaws back and forth between the feed-in turret and the stationary blade 464 adjacent the oscillatable spreader blades. In addition, through the cam 156 the rotating saw will be oscillated between the feed fingers 232 and 234 of the feed-in turret and the stationary plate 464 as shown in Fig. 3. Likewise, through the instrumentalities of the various slides hereinbefore described, including the slide 814, see Fig. 1, as hereinbefore described, the slide 814 in its up and down reciprocation carries not only the peeling platform and pitting platform but also carries the whole fruit extracting and discharge mechanism, so that as the slide 814 moves upwardly the pitting, peeling and discharging mechanism will move upwardly away from the fruit cups, whereby to permit the main turret intermittently to move and present a fresh pair of cups to the oscillatable spreader plates while at the same time carrying a cup with a half fruit disposed therein with its cut face uppermost in correct position beneath the peeling head, and simultaneously therewith to convey a cup carrying a half peach, which has been properly peeled, to the pitting station for the pitting operation, and at the same time carrying the cup which has heretofore been at the pitting station to the fruit discharging station; and in addition shifting the cup which has been at the fruit discharging station and from which the fruit has been discharged, leaving the peel and half pit therein, to the scavenging station. In addition, that cup which has been scavenged at the scavenging station in the prior cycle of operations will thence be moved to the fruit depositing station. Inasmuch as the main fruit cup holding turret will move twice as fast as the main feed-in turret moves, there will always be two empty cups at the half fruit receiving station to receive the half fruits from the spreader jaws.

Referring now to the details of operations, the operator standing at the end of the machine as shown in Figs. 1 and 3, as the jaws 232 and 234 of the intermittently operated feed-in turret come opposite to such operator, the jaws are in open position. A whole peach is inserted in position with its butt end abutting the stationary jaw 230 and with the stem cavity end facing outwardly. The maximum diameter of the fruit is centered in the central plane of the jaws 232 and 234. Prior to the next intermittent movement of the feed-in turret, the jaws 232 and 234 will be permitted to close by the action of the cam means 246 acting on rollers 250, plus the action of the springs 237, so that before the feed-in turret moves, these fingers will have closed upon the peach, each finger moving a predetermined amount, which is equal exactly to the predetermined movement of the other finger. In other words, these two fingers 232 and 234 always center the peach with respect to a horizontal plane, uniformly at the same horizontal elevation.

In the next intermittent movement of the feed-in turret, the fingers 232 and 234 carrying the whole peach are moved to the peach stem cavity slitting station and stopped thereat so that through the instrumentalities of the mechanism shown in Fig. 9, the nose 197 will find the peach cavity and will hold the peach cavity firmly and gauge the depth which the blades will cut, while the spaced slitting blades 204 will move upwardly on either side of the nose 197 to slit the side walls of the peach at the stem cavity, forming two substantially vertical, substantially elliptical slits therethrough. Subsequent to this operation, the feed-in turret will again move intermittently to convey the whole peach to the position shown in Fig. 3. At this time the rotating saw 250 will be oscillating toward the left so that the saw will thence cut through the peach stationarily held between the two stationary fingers 232 and 234. The saw, in cutting through the peach, will pass through the slots in these fingers and also through a slot in the stationary finger 230. These fingers 232, 234 and 230 are preferably arranged to permit a complete severance of the whole peach into two halves, while stationarily held between the fingers 232 and 234. However, in some instances it is desirable to have the saw 250 swing inwardly, cutting through the half peaches to such extent as completely to sever the pit and to sever entirely all the flesh of the fruit except a small segment thereof, as shown by the dotted lines in Fig. 3, in which case the unsevered portion will serve to hold the peach sections together until grasped by the transfer jaws to avoid possible dropping out of the feed jaws. This also permits the utilization of a relatively smaller saw. During this cutting of the peach, the feed jaws press in on the peach only from the top and bottom and adjacent a line passing centrally approximately through the pit, thereby tending to spread and thereby eliminating any pressing action of the sides of the peach against the saw blade and whereby to provide a cleaner cut and preventing pit dust from embedding in the peach. In addition, this same operation gives the pit dust opportunity to pass out of the peach and not become embedded in the flesh.

Upon the completion of the severing operation, and through the instrumentality of the endless screw 178, the transfer jaws have now arrived opposite the severed peach held between the fingers 232 and 234, except that the transfer jaws are in open position. At this time the transfer jaws are moved laterally inwardly due to the mechanism illustrated in Figs. 12 and 13, whereby resiliently to grasp the peach from opposed lateral sides and intermediate the zones from which the peach is held by the fingers 232 and 234. Due to the resilient mounting of these transfer jaws as shown in Fig. 12 and as hereinbefore described, the variations in half peach sections are resiliently taken up by the transfer jaws, it being noted however that due to the intermeshing of the gearing as shown in Fig. 12, each transfer jaw will be bodily moved the same distance, yet due to the resilient mounting of the lower portions of the jaws, such portions can resiliently move to accommodate thicker or thinner half peach sections.

Slightly after the grasping of the peach by the transfer jaws, the fingers 232 and 234 are now positively opened and the transfer carriage is then carried forward away from fingers 232 and 234 before the feed-in turret starts to turn intermittently, and the transfer jaws are then carried in a straight line motion, as shown in Fig. 3, carrying the half peach sections across the saw 250. It is desirable to give the transfer jaw a greater speed of movement than the speed of oscillation of the rotating saw to the right, so that if there be any uncut portion of the flesh of the peach which has not been completely severed by the saw when the peach is stationarily held between the jaws 232 and 234, this remaining portion will be severed by being conveyed past the toothed cutting edge of the saw.

Figure 20:
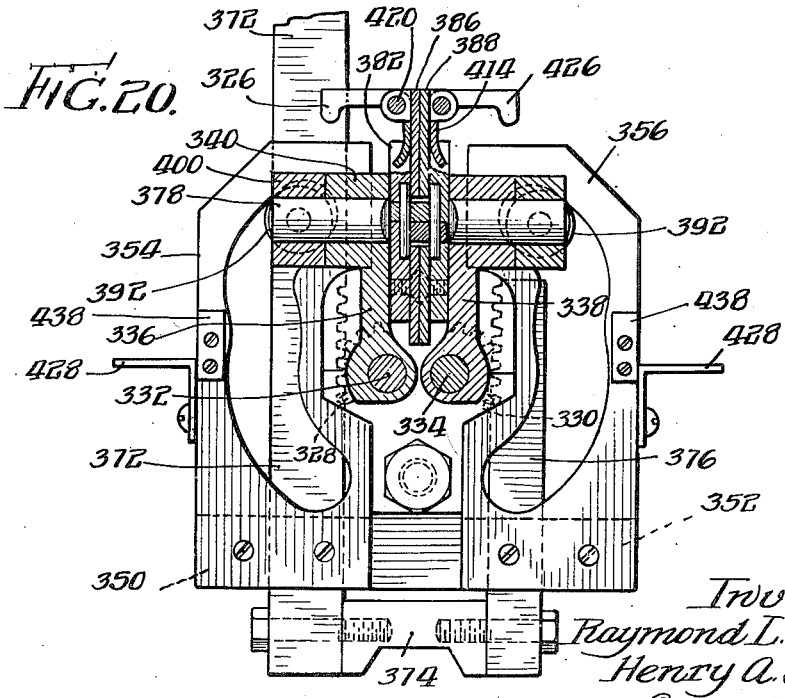
Fig. 20 is a vertical section taken on line 20—20 of Fig. 17.

The two half peaches in the transfer jaws 481 are now conveyed to the right, as seen in Fig. 3, directly onto the stationary spreader plate 464 which is directly in the plane of the saw 250 and the entering edge of which is substantially of the same width as the saw. The spreader plate, if desired, is slightly thicker at its rear than at its front, so as to slightly spread the half sections on the stationary spreader plate 464 and as they are held between the jaws. The transfer jaws 481, continuing to move, next carry the half sections directly onto the oscillatable spreader plates which in this stage of the operation are in vertical juxtaposition, as shown in Figs. 20 and 21, see particularly Fig. 21. In this movement the lower edge of the peach will contact the downwardly flared lip of the lower ledge of each spreader plate, while the upper periphery of each half peach will ride under the outwardly flaring lip 424 of each spreader plate, whereby resiliently to raise each clamping plate 416 of the spreader plate to permit the peach to be held on each vertical spreader plate between the lip 410 and this resilient clamping plate 414. This is shown in Fig. 21. At this time, through the action of the mechanism shown in Figs. 19–24, inclusive, the transfer jaws will move quickly outwardly at right angles to their direct line of travel, and after the jaws have so moved out, the spreader plates 386 and 388 will be shifted from a vertical position, shown in Fig. 21, to a horizontal position, shown in Fig. 19, it being noted that the outer ends of each spreader plate will move through a greater arc than the inner ends thereof. This is for the purpose of properly depositing one half peach into the radially aligned cups.

In explanation, by reference to Fig. 2 it will be noticed that each cup has its central axis 390 radially of the vertical axis 136 of rotation of the main cup carrying turret, so that in order to prevent turning of a peach angularly from the parallel, straight line motion while carried in the transfer carriage, and while the half peaches are deposited onto the spreader plates and transferred thence to the cups, it is necessary to move the spreader jaws so that the peach pits will occupy the correct position in the peach cups when the cups carrying the half peaches with the pits are moved to the peeling and pitting stations. As the spreader plates are moved to downward horizontal position, through the action of the sector 328 intermeshing with the rack 372 and sector 330 intermeshing with the rack 376, and as the outer ends are moved arcuately through the action of the silent cams and rollers 392 and 394 running in the cam slots of the cam blocks 354 and 356, the trigger 426 of the releasing clamp will be opened by striking the angle plates 428 against the tension of the spring 422 to release the upper edges of the clamped peaches and at the same time the kicker discharge mechanism 430 will be actuated to positively kick the half fruit into the registering cups which are now immediately below the horizontally disposed presser plate by striking on the stop 438. It will be noted that during the transfer of the fruit sections by the transfer jaws, each fruit section is held in a predetermined plane by means of the relatively small pointed blades 518 and 520, see Fig. 12.

The action of the kick-off mechanism and of the trigger is accomplished by the stationary steps 428 and 439 as hereinbefore described.

Upon the depositing of each half fruit section in its cup, this being done simultaneously for the two half sections, the main feed turret carrying the cups will move in a counter-clockwise direction, as seen in Fig. 2, carrying one of said cups having a half fruit therein with its cut face uppermost and with the pit unsevered from the flesh thereof to the peeling station as shown in Fig. 2. Simultaneously the spreader plates will be swung back to vertical position to receive a subsequent severed whole peach.

Upon the arrival of the half fruit at the peeling station, in synchronized sequence the peeling head will descend through the operation of the slide 814. By reference to Fig. 29, upon the descent of this peeling head the half peach will be held in the cup, the two cup sections being in closed position at this time. The presser foot 916 will be resiliently brought down upon the cut face of the half fruit, the ejector foot 914 moving resiliently upwardly into the chambered presser foot. The reversed locking mechanism will then lock the presser foot in this adjusted position and in proper timed sequence the peeling knife, as shown in Fig. 31, will swing downwardly through the cup between the inner wall of the cup and the margin of the presser foot 916, whereby to start the peeling of the peach. As the peeling knife reaches the bottom of the righthand sector 780', and through the action of the arm 788' on the shiftable cup section, the latter will be thrown open. The peeling knife is constructed in accordance with the disclosure in the Mark Ewald application, Serial No. 750,151, filed October 26, 1934. The blunt edge on the outer face of the peeling knife is formed at such an angle as to cause the knife not only to peel the fruit but likewise to force the half peach bodily toward the right, as seen in Fig. 31, whereby to cause the outer wall of the peach snugly to fit against the inner wall of the movable section 780'. In explanation, during the downward movement of the knife the two body sections have been forced together whereby firmly to force the half peach against the inner wall of the stationary section of the cup so as to cause the peeling knife always to pass through the peach at a uniform distance from the inner wall of the half fruit. Then as the knife reaches the bottom zone of the stationary section of the cup, the movable section of the cup will then open to a position such that its inner wall is exactly concentric with the center axis of the cup, and at this time the outer blunt face or inclined face of the peeling knife is formed at the proper angle, as disclosed in the aforementioned application, so as to force the half peach bodily over and firmly against the inner wall of the now shifted cup section so that the inner wall will present a true concentric continuation of the inner stationary wall of the cup, so that the peeling knife in its continued movement will swing upwardly through the peach, always at a uniform distance so as always to take the uniform thickness of peeling from the peach.

Due to the fact that in the subsequent pitting operation it is necessary to have a more shallow cup in order to permit the presser plate to flatly contact the cut face of the half peach as it comes down, and since the sections of half peaches are of variant size, it is necessary to have a shallow cup so that the presser plate will not contact the rim of the cup. In order to prevent the peeling knife, as it swings upwardly through the section 780' of the cup, from breaking off the flesh at the margin of the cup, it is necessary to reinforce the outer periphery of that portion of the peach which extends above the cup wall at this point. Therefore it will be noted that the reinforcing lip or rim 880, which is carried upon the peeling head, when the peeling head descends to peeling position will exactly coincide with the outwardly moved position of the cup section 780' and will form a continuation thereof, and that the peeling knife in swinging upwardly will act against this continuation, which reinforces the peach at this point.

Upon the completion of the peeling operation the peeling head will move upwardly in timed relation; the presser foot, being carried by the peeling head, will move upwardly, leaving the discharge foot 914 in contact with the sticky surface of the severed pit, thereby breaking any vacuum or adhesion between the presser foot 910 and the sticky surface of the half peach. As the peeling head continues to move upwardly, the presser foot is the last to be removed from the half peach. Upon the upward movement of the peeling head, the mechanism is unlocked for subsequent movement. When the peeling head has cleared the cups in the turret on its ascent, the turret is then given an intermittent motion in a counter-clockwise direction to carry the cup containing the peeled half fruit to the pitting station, as shown clearly in Fig. 2. At this station, the peeled half peach, lying on its severed peeling and lying in the cup, is brought under the pitting head and the releasing arm 788' has been removed from contact with the trigger 794' so that the sections of the cup grasp the half peach with its pit uppermost.

At the pitting station, when the slide 814 descends, the pitting head is brought downwardly, somewhat in the position shown in Fig. 32. The pitter gauge plates 770 and 772 are suspended by means of the slotted member 780 and 782, which in turn are slidably mounted on the stems 790 and 792. The member 780 and 782 have their adjusting screws 806 and 808 for the purpose of setting the gauge plates to a position where the points 787 of the pitting blades will extend below the peach contacting surface of the gauge plates a sufficient distance to insure contact with the pit as the blades close in to start the severing of the pit from the flesh of the fruit.

The blades must be opened a predetermined distance so that the cutting edges will always be away from the pit as the blades come down to sever the pit from the peach. The pitting blades, after contacting the cut flesh of the half fruit, must drag across the face of the fruit until they come to the pit before any cutting action of the blades takes place. The cutting blades are first opened by the upward movement of the arms 736 and 738. The predetermined distance of opening is governed by the slots 704 and 709. This is because the arms are parts of the sleeves 728 and 730 which carry the pitting blades, and since the ends of the slots come in contact with the shafts 656 and 664, no further outward movement of the pitting blades can take place. Upon descent of this pitter head, the gauge plate sections 662 are moved downwardly until they contact the cut face of the half peach, the cut face projecting above the upper rim of the cup sections. This downward movement through the proper adjustments heretofore described adjustably positions the points 787 slightly into the cut face of the half fruit on each side of the pit and in spaced relation therefrom.

Upon the actuation of the pitting arm 736, as hereinbefore described in detail, each pitter blade will swing about its individual pivotal axis 678 and 698, as shown in Figs. 47-51, thereby causing the blades to drag or move laterally across the cut face of the half fruit, the points digging only slightly into the cut face of the half fruit. To insure that the pitter blades preliminarily swing about their own individual pivots 678 and 698, the bevel gears 668, 679 and 686, together with spring 684, operate as follows: the spring 684 sets up on the shaft 640 and the pinion 679 keyed thereto a torsional urge which tends to turn the pinion. This turning is transferred through the pinion to the two intermeshing bevel gears 668 and 686. Bevel gear 686 is keyed to its sleeve 692 which is a part of the lever 694. This arrangement transmits the turning urge from the spring 684 to the lever 694, thereby creating a resistance to turning of the arm 694 about the fulcrum through the shaft 664. Bevel gear 668 creates a resistance to the turning of the arm 674 in the same manner but in the opposite direction. Since resistance has been set up to keep the arms 674 and 694 from turning about the fulcrum through shafts 664 and 656, the sleeves 728 and 730 will turn about the shafts 678 and 698, see Fig. 47, until the cutting edges of the pitting blades engage the pit. Now, since the pit offers a greater resistance than the spring urge from spring 684, the urge is overcome and the arms 674 and 694 turn about the fulcrum through shafts 664 and 656, thereby compelling the pitting blades to complete the cut around and under the pit. The bevel gears also function to compel the cutting blades to move about the pit at a uniform rate of speed whereby to insure a uniform cavity when the pit has been removed, by acting as stabilizers between the two arms. Since the gears 686 and 668 are meshed with the pinion 679, and since the arms 674 and 694 are keyed to the stems of these gears, the arms 674 and 694 must turn uniformly together about the common fulcrum through shaft 664.

The pit locating movement of each pitting blade brings each blade into contact with the outer curved wall of the pit at a point slightly below the cut face of the pit. At this time the blades form fulcrum points which thereafter causes each blade not to swing about its axis 678 and 698 but to swing about a common axis 656, which axis instead of being remote from the cut face of the half peach, as are the axes 678 and 698, is relatively close to the cut face of the half fruit. At this point the slot in each arm 700, 706 will shift with respect to the axial portion 656 so that as the end of each slot is reached by each respective shaft, the bottom portions of the arms 700 and 706 will have contacted the upper surfaces of the rollers 652 and 654. In other words, this contacting action takes place when the pitter blades have moved slightly less than one-third around the under surface of the pit. At this instant it is important that the pitter blades be supported so that they will swing in true circles about the axis 656 and snugly and closely follow the under wall of the pit until they meet at a point centrally of the under surface of the pit, thereby in their overlapping meeting completely severing the pit; for if these arms were to drop down they would be permitted to open, whereas it is necessary to keep them together to complete the severance of the under side of the half pit along the line closely following the outline of the pit. By inspection of Figs. 52-56 it will be noted that through the bevel gearing and the action of the spring 684, the spring serves to keep the arms 700 and 706 substantially together vertically or in their uppermost position and provides sufficient spring resistance, greater than the drag of the pitter blades across the face of the fruit flesh until the time of contact of the blades with the pit, which offering greater resistance to the further movement of the pitter blades, the spring resistance is now overcome and the pit forming the stopping movement of the blades, the blades will then start down through the flesh, which causes the arms now to swing about the central or common axis 656 instead of their own separate axes 678 and 698 as heretofore. The bevel gears 668 and 679 and 686 cause the blades to move uniformly through the cutting stroke; that is, they tend to prevent one blade running ahead of the other in the cutting, all as hereinbefore described.

In the preferred embodiment of the construction of the present application, the peach is raised slightly out of the cup after the pitting blades have started cutting under the pit, which action creates a downward pressure or force on the peach by the presser or gauge plates equal in intensity to the weight of these plates 662 and the weight of the end castings 780 and 784 secured thereto. While this lifting action at this point in the cutting operation is not wholly necessary in so far as the actual severing of the pit is concerned, it does tend to eliminate marring or bruising of the fruit during the pitting operation.

Upon the completion of the pitting operation the pitter head moves up in synchronized relation and the cup carrying the half fruit, peeled and pitted, with the pit lying in the pit cavity and the half peach overlying the loose peeling.

Upon intermittent succeeding counter-clockwise rotation of the cup-carrying turret, the cup carrying this pitted and peeled half peach is next brought under the half peach extractor and ejector, as shown in Fig. 2. Upon the next succeeding downward movement of the vertically reciprocating main slide, the discharge and extractor mechanism carried thereby, the details of which are shown in Fig. 57, is brought down upon the cut face of the half fruit. The paddle mechanism is first brought into the position shown in Fig. 59. At this time the paddle mechanism is turned to the position approximately shown in Fig. 60, which as shown is not completely inverted but is slightly at an inclination. This action inverts the half fruit. During this turning of the half fruit by the paddle mechanism, the rubber lip upon the fruit discharging chute 1018 slightly overlies the inner wall of the cup directly in the path of the loose peeling so as to prevent the peeling being turned out of the cup during this inversion. The direction of turning is in such a manner that the rubber lip prevents dislodgment of the peeling in the cup while permitting the turning.

As the paddle mechanism reaches the inverted position shown in Fig. 60, the cam 972 will actuate the striking finger 964 whereby forcibly to flip the discharge ejector 960 so as to kick the fruit laterally into the fruit chute 1018 and at this time simultaneously the fruit discharge chute is given an oscillatory movement by the shaft 68 to throw the chute forwardly to project the processed half peach completely out of the machine to a desired point, the ejection being sufficiently gentle so as not to injure the fruit, but causing it to be ejected from the machine.

The vertical movement of the paddle carriage in nowise interferes with the oscillatory movement of the fruit chute, since the latter is mounted laterally thereof. Upon the completion of this ejection of the processed half fruit the paddle mechanism rises with the main sliding head heretofore described and since the fruit chute has carried the flexible lip from the fruit cup, this cup upon the next intermittent counter-clockwise movement of the main feed turret, and with the loose peeling therein and the pit therein, will next move to the scavenging station. At this point it is to be noted that the paddle mechanism 950, 960 is provided with a central opening so that during the inversion of the paddle, the pit, which is loose in the half fruit, will be dumped through this hole into the cup so that after this cup, with the loose pit and the loose peeling therein, is positioned under the scavenging mechanism, which is shown in Figs. 61-66, inclusive, the scavenging mechanism is then swung downwardly to horizontal position and is thence turned to scavenge the peeling and the pit from the cup in the manner hereinbefore described. Subsequent to this scavenging movement, the scavenging blade is then moved away from the cup and upon the next successive intermittent counter-clockwise movement of the cup carrying turret this cup will be carried to the next station, which as shown in Fig. 2 brings the cup to the first of the stations on one side of the spreader plates.

The mechanism for raising the carriage that vertically shifts the pitting head carrying the pitting blades is the same mechanism that raises the slide 814. The cam race 804', see Fig. 26, is so designed that the slide 814 is maintained in downward position sufficiently long for the peeling knife, the fruit extractor and the peeling scavenger to have completed their work before the said slide 814 starts to raise. In certain constructions the cam race 804 is constructed and arranged so that after the slide has moved to position the pitting head to start the pitting cut as hereinbefore described, and during which time the pitting knives have begun their cuts in approaching directions around the under side of the pit, the slide is raised about ⅝ inch and then held there until the pitting blades have finished their cut, at which time the slide is then raised the full amount to clear the turret in its next intermittent turning movement. This raising of the pitter head slightly out of the cup after the pitting blades have started cutting under the pit causes the creation of a downward pressure or force on the peach by the presser or gauge plate as hereinbefore described.

In another design or construction of the cam race 804', the race is formed so as to make one gradual rise of the slide in its upward movement, which upward movement includes a portion of the finishing operation of the pitting cut. By this modification in the operation of the machine, a much smoother running machine is provided and at the same time there is secured the same effect of causing the pitting blades, as the pitting head rises, to tend bodily to lift the pit, due to the fact that the pitting knives have moved around and beneath the curved walls of the pit while at the same time the presser or gauge plate is still, by its weight, pressing downwardly solely on the flesh of the half peach and not on the pit, which as hereinbefore described causes the pitting knives more closely to follow the curved under walls of the pit so as to cut the minimum of flesh from the half peach during the pitting operation.

The pitting mechanism is claimed in our copending application, Serial No. 293,252, filed September 2, 1939, which matured as Patent No. 2,216,165, granted October 1, 1940, and the claims to the stem cavity trimming and peeling mechanisms and method are contained in our copending application, Serial No. 293,253, filed September 2, 1939.

What we claim is:

1. In an automatic machine for treating peaches, the combination of means forming an intermittently rotatable turret having spaced fruit holders adapted to receive and hold whole peaches, means for severing the peaches into halves, a second intermittently rotatable turret having an equal number of spaced holders, each adapted to receive and hold a half peach with its cut face exposed, means for conveying the two severed halves of the whole peach from a holder of the first turret in planes parallel to a plane which lies parallel to and intersects the axes of the turrets and spreader means for depositing each half in one of the half fruit holders with its longitudinal stem axis disposed radially of the second turret, and synchronized driving means for said turrets.

2. In an automatic machine for treating peaches, the combination of means forming a whole fruit turret having radially extending fruit holders, a half fruit turret having radially extending half fruit holders, means for intermittently advancing the turrets, means for severing a whole fruit into two sections, and transferring the severed sections from the first to the second turret means shiftable relatively to the fruit holders of the second turret for shifting the severed halves relatively and for depositing the halves in the adjacent holders of the second turret with the projections of the stem axes of the halves intersecting.

3. In combination, means providing an intermittently rotatable turret, said turret having a plurality of spaced apart, radially extending fruit grippers each comprising relatively shiftable parts forming fruit contacting portions, each of said parts being slotted, the slots being disposed radially of the turret, said fruit contacting portions including means constructed and arranged to receive therebetween a whole fruit and to hold the fruit with the maximum diameter of the fruit disposed in the plane of said slots, a backing holder radially disposed on said turret between said shiftable fruit contacting members whereby to receive and position the curved, blossom end of the whole fruit, said backing member having a slot likewise in the radial plane of the turret and registering with the slots of the fruit contacting portions, means for opening and closing said fruit contacting portions to grip the whole fruit on opposite sides of said slots, and whole fruit severing means operable in the plane of said slot to sever the flesh and pit of the fruit while held in said fruit contacting members.

4. In an automatic machine of the character described, the combination of a turret including a vertically disposed, turnable shaft, means for intermittently turning said shaft, said turret being provided with spaced apart, vertically extending supports, a pair of fruit gripping members mounted in vertically superimposed relation on each of said supports, the inner portions of said members being provided with toothed sectors adapted to intermesh, and each of said members being pivotally mounted, the outer portion of each of said members extending outwardly radially of the central shaft, the outer portion of said member being arcuately curved to grip the curved surface of a whole peach, each of said members having spaced portions disposed on opposite sides of a plane radially of the central shaft of the turret, means normally to close said members upon the curved surface of a peach, each of said supports including a backing member having a curved concave backing surface disposed intermediate each of the vertically superimposed members whereby to receive and support the blossom end of a whole peach, one of said members of each pair of peach supports having a friction roller, a reciprocable head disposed adjacent said rollers and cam means adapted to engage each of the rollers of the respective pairs of fruit contacting members, said reciprocable head having upon its opposite face means for reciprocating said support, and rotatable means cooperating with said reciprocating means and driven by said central shaft for reciprocating said support, whereby to operate said friction rollers to positively open the members to permit the insertion and withdrawal of peaches therefrom.

5. In an automatic machine, the combination of means comprising an intermittently operating turret having relatively shiftable power actuated gripping members adapted to shift relatively to a fruit gripping position and constructed and arranged to receive and hold a peach uniformly positioned with its plane of maximum diameter vertical and parallel to a plane disposed radially of the turret, cutting means operable in a plane radially of the turret, means for intermittently shifting said turret to a position such that the plane of maximum diameter of the peach lies parallel to the plane of operation of the cutting means, and means for shifting said cutting means in its plane of action to cause it to sever the flesh and pit of the peach while held in the turret holding means.

6. The combination of two spaced apart, intermittently and synchronously operated rotatable turrets, each having a plurality of peach holders, the holders of one of said turrets being constructed and arranged to receive and hold whole peaches and the holders of the other turret being constructed and arranged to receive and hold half peaches, severing means disposed between said turrets, means for operating the severing means to cause it to sever a peach and its pit while held in the holding means of the first turret, and relatively shiftable conveying means adapted to grasp the opposed halves of a severed peach and convey the halves from the holders of the first turret and deposit said halves into adjacent holders of the second turret.

7. The combination of two spaced apart, intermittently and synchronously operated rotatable turrets, each having a plurality of fruit holders, the holders of one of said turrets being constructed and arranged to receive and hold whole fruit and the holders of the other turret being constructed and arranged to receive and hold half fruit, rotary severing means disposed between said turrets, means for operating the severing means to cause it to sever a fruit and its seed containing section while held in the holding means of the first turret, and relatively shiftable conveying means adapted to grasp the opposed halves of a severed fruit and convey the halves from the holders of the first turret and deposit said halves into adjacent holders of the second turret, the conveying means being operative to convey the fruit halves across the opposed faces of the rotary severing means, whereby said severing means forms a flat support for the transported halves.

8. The combination of two spaced apart, intermittently and synchronously operated rotatable turrets, each having a plurality of peach holders, the holders of one of said turrets being constructed and arranged to receive and hold whole peaches and the holders of the other turret being constructed and arranged to receive and hold half peaches, rotary severing means disposed between said turrets, means for shifting the severing means to cause it to sever a peach and its pit while held in the holding means of the first turret, relatively shiftable conveying means adapted to grasp the opposed halves of a severed peach and convey the halves from the holders of the first turret and deposit said halves into adjacent holders of the second turret, the conveying means being operative to convey the half peaches across the opposed faces of the rotary severing means, whereby said severing means forms a flat support for the transported halves, and means cooperating with the conveying means for preventing movement of the halves relatively to the conveying means while being transported across and in contact with the rotary severing means.

9. The combination of two spaced apart, intermittently and synchronously operated rotatable turrets, each having a plurality of fruit holders, the holders of one of said turrets being constructed and arranged to receive and hold whole fruit and the holders of the other turret being constructed and arranged to receive and hold fruit halves, rotary severing means disposed between said turrets, means for shifting the severing means to cause it to sever a fruit and its seed while held in the holding means of the first turret, relatively shiftable conveying means adapted to grasp the opposed halves of a severed fruit and convey the halves from the holders of the first turret and deposit said halves into adjacent holders of the second turret, and means for shifting the rotary severing means in the same direction and simultaneously with the movement of the transporting means, the transporting means being movable at a greater rate of speed than the shifting movement of the rotary severing means, whereby to cause the severing means to complete any unsevered portion of the fruit while being transported.

10. The combination of two spaced apart, intermittently and synchronously turnable turrets, each having a plurality of peach holders, the holders of one of said turrets being constructed and arranged to receive and hold whole peaches and the holders of the other turret being constructed and arranged to receive and hold half peaches, rotary severing means disposed between said turrets and shiftable in a plane passing through the hubs of each of said turrets, means to shift the rotary severing means into contact with a whole peach while held in the first of said turrets for severing the flesh and pit of the whole peach, means for grasping the opposed faces of the cut peach and conveying the peach toward the second turret, relatively shiftable spreading means disposed in the path of travel of the conveying means, said spreading means including a pair of relatively flat surfaces onto which the peach halves are conveyed by the conveying means, and a substantially stationary wedge-shaped member disposed between the severing means and the spreading means for laterally shifting the halves of the peach out of the plane of the rotary severing means and into the opposed planes of the spreading means, and means for operating the spreading mechanism for depositing the peach halves thereon, cut face up, into two adjacent peach holding means of the second mentioned turret.

11. In combination, means for holding whole fruit, a turret spaced therefrom and having a plurality of spaced apart half fruit holders, a rotary saw shiftable in a vertical plane between the whole fruit holder and the half fruit holder and through the fruit in the whole fruit holder to sever the whole fruit into halves, conveying means for bodily grasping the severed halves of fruit in the whole fruit holder and for conveying them across the opposed face of the rotating saw onto spreader mechanism, spreader mechanism adapted to receive the halves of fruit, and means for actuating the spreader mechanism for laterally depositing the halves into adjacent half fruit holders of the turret.

12. In combination, means providing an intermittently actuated turret having a plurality of radially extending holders each adapted to receive a whole peach, each holder having vertically disposed fruit grippers provided with vertically extending openings disposed in the plane of action of a saw, a rotary saw adapted to rotate in said plane of action of the holders, means for shifting the saw in said plane to cause it to sever the whole fruit while held in said grippers of the turret, and means for intermittently shifting the rotary saw in timed relation with the shifting movement of the turret.

13. In combination with a whole peach turret, means for intermittently operating the same, said whole peach turret including a plurality of spaced apart, radially extending holding means each constructed to receive and hold a whole peach with the maximum diameter of the whole peach extending radially of the turret, a rotary saw adapted to rotate in a plane extending radially of the turret, means for intermittently shifting the turret to cause each holder successively to be disposed in the plane of action of the saw, means for shifting the saw in its plane of rotation to cause the saw to cut through the flesh and pit of the whole peach while held in the holding means of said turret, said holding means and saw cooperating to sever all of the whole peach except a chordal portion thereof, conveying means adapted to grasp the partially severed portions of the peach, means for opening the holding means of the turret to release the peach, means for transporting the conveying means away from the holding means of the turret across opposite sides of the rotating saw, and means for shifting the saw in the direction of movement of the transporting means but at a slower rate of speed whereby the differential movement of the saw and the transporting means will effect the completion of the severance of the flesh of the peach.

14. In combination, means providing an intermittently operating turret having a backing member radially disposed thereon and having means to receive the curved, blossom end of a whole peach, and including means to receive and hold the peach when positioned with its maximum diameter vertically and centrally of the member and with the longitudinal axis of the pit horizontal and disposed substantially radially of the turret, supplemental means shiftable on the turret equal distances toward and from said horizontal axis and adapted to grip the upper and lower portions of the peach on opposite sides of and spaced from the maximum diameter of the peach, means to shift said turret to a splitting station, and means operable in the plane of maximum diameter of the whole peach for severing it into two sections, said severing means cutting the pit through a plane parallel to the plane of maximum diameter of the pit.

15. In combination, means providing an intermittently rotatable turret having a plurality of radially extending holders for receiving and holding a half fruit with its cut face exposed, a whole fruit turret spaced therefrom and provided with a plurality of radially disposed holders for receiving and holding a whole fruit, guide mechanism located between said holders and including a longitudinal member disposed parallel to the plane passing through the hubs of the two turrets, a carriage adapted to slide along said guide mechanism, means disposed parallel to the guide mechanism for reciprocating the carriage along the guide mechanism toward and from the two turrets, said carriage having interconnected depending arms adapted for closing and opening movement equal distances in planes normal to the direction of movement of the carriage along the guide mechanism, said depending arms each having a holding means for engaging and grasping the curved outer surface of a fruit, means actuated synchronously with the intermittent movements of the turrets for reciprocating the carriage along the guide mechanism into positions adjacent the fruit holders of the spaced apart turrets in alternate order, means synchronized with the movement of the carriage adjacent each of said holders in alternation for shifting the depending arms of the carriage normally to the direction of movement of the carriage along the guide mechanism to open and closed position whereby to release and grasp respectively the curved walls of the fruit, for removing a peach from the holding means of the whole fruit turret, for transporting the fruit to the half fruit holders of the second turret, means for severing the fruit into halves prior to its transportation to the half fruit holders, and means resiliently connecting each depending arm with the carriage whereby to permit each arm to yield outwardly whereby to accommodate severed fruit sections of varying thickness.

16. In combination, means providing an intermittently rotatable turret having a plurality of radially extending holders for receiving and holding a half fruit with its cut face exposed, a whole fruit turret spaced therefrom and provided with a plurality of radially disposed holders for receiving and holding a whole fruit, a track mechanism located between said holders and including a longitudinal member disposed parallel to the plane passing through the hubs of the two turrets, a carriage adapted to slide along said track mechanism, means disposed parallel to the track mechanism for reciprocating the carriage along the track mechanism toward and from the two turrets, said carriage having interconnected arms adapted for closing and opening movement equal distances in planes normal to the direction of movement of the carriage along the track mechanism, said depending arms each having a holding means for engaging and grasping the curved outer surface of a peach, means actuated synchronously with the intermittent movements of the turrets for reciprocating the carriage along the track mechanism into positions adjacent the fruit holders of the spaced apart turrets in alternate order, means synchronized with the movement of the carriage adjacent each of said holders in alternation for shifting the arms of the carriage normally to the direction of movement of the carriage along the track to open and closed position whereby to release and grasp respectively the curved walls of the peach, for removing a peach from the holding means of the whole fruit turret for transporting the peach to the half fruit holders of the second turret, means for severing the peach into halves prior to its transportation to the half fruit holders, and means associated with the holding means of said depending arms adapted to engage the half fruit sections for preventing them from turning angularly with respect to said holding means.

17. In combination, means providing a frame having a centrally disposed upstanding bearing sleeve having a cam on its upper end, a horizontally disposed, intermittently rotatable turret on said support about the bearing sleeve as an axis, means for intermittently rotating said turret and said cam, an extension frame, a second turret mounted on said extension frame, intermittent means for driving said second turret synchronously with said first turret, each of said turrets having a plurality of radially extending fruit holders, the holders of said first turret being adapted to receive and hold half fruit, and the holders of said second turret being adapted to receive and hold whole fruit, a rotary saw disposed between said turrets, means for shifting said rotary saw into engagement with the whole fruit to sever the same while held in the holding means of the second turret, means for shifting said rotary saw toward and away from said second mentioned turret, track means disposed above and parallel to the plane of shifting action of the rotary saw, including a pair of parallel spaced apart tracks, a carriage slidable along said tracks, said carriage including a pair of depending arms, one of said arms having a spline connection with one of said tracks for turning therewith while sliding therealong, said depending arms having intermeshing teeth at their upper portions whereby upon the turning of one of said arms to cause the simultaneous equal turning of the other of said arms, means actuated by said cam for turning one of said tracks to cause the simultaneous and equal opening and closing movement of said depending arms, said turnable arm having a friction roller extending laterally therefrom, a third elongated track mechanism extending parallel with said first mentioned track mechanism and engaged by said friction roller, spring means for normally pressing said track mechanism into contact with said friction roller, the arm carrying said last mentioned track mechanism having a hinged extension, a lug thereon pressing against said spring means, the bottom portion of said hinged extension having a holder having a concave portion adapted to engage the curved surface of a whole peach, the opposite depending arm having a hinged portion, a coiled spring interconnecting said hinged portions for resiliently pressing said hinged portion toward the cooperating hinged portion of the carriage, a similar concave fruit holder for said second mentioned depending portion, and means synchronized with the intermittent movements of said turrets for reciprocating said carriage along its tracks alternately toward and from the spaced apart holders of the two turrets, said cam means synchronously causing the opening and closing movement of said fruit holders on said depending arms as said depending arms approach the fruit holders of the two turrets.

18. In combination, means providing a first turret having a plurality of spaced apart fruit holders adapted to receive and hold whole fruit, a spaced second turret having a plurality of spaced fruit holders each adapted to receive and hold a half fruit, means for intermittently and synchronously driving said turrets, guide mechanism extending parallel to a plane intersecting and extending parallel to the axes of said turrets, fruit transfer mechanism carried by the guide mechanism and adapted to grasp a fruit held by the fruit holder of the first turret and to transport the fruit to the holders of the second turret, and an endless screw disposed parallel to the guide mechanism and having connection with the fruit transfer mechanism cyclically to shift the transfer mechanism back and forth a predetermined distance along the guide mechanism, and means to open and close the jaws of the transfer mechanism to grasp and hold and subsequently release fruit from the transfer mechanism, and means for providing an additional length of travel to the transfer means along the guide mechanism over and above the travel for a predetermined distance given to it by the endless screw.

19. In combination, means providing a first turret having a plurality of spaced apart fruit holders adapted to receive and hold whole fruit, a spaced second turret having a plurality of spaced fruit holders each adapted to receive and hold a half fruit, means for intermittently and synchronously driving said turrets, fruit transfer mechanism having a path of movement parallel to a plane intersecting and lying parallel to the axes of said turrets and adapted to grasp a fruit held by the fruit holder of the first turret and to transport the fruit to the holders of the second turret, mechanism for shifting the transfer mechanism cyclically back and forth along its path of action within fixed extreme limits, means to open and close the jaws of the transfer mechanism to grasp and hold and subsequently release fruit from the transfer mechanism, and means providing an additional travel for the transfer mechanism beyond the fixed limits of travel given to it by the first-mentioned mechanism.

20. In combination, means providing a first turret having a plurality of spaced apart fruit holders adapted to receive and hold whole fruit, a spaced second turret having a plurality of spaced fruit holders each adapted to receive and hold a half fruit, means for intermittently and synchronously actuating said turrets, fruit transfer mechanism carried by the track mechanism and adapted to grasp a fruit held by the fruit holder of the first turret and to transport the fruit in a direction parallel to a plane lying parallel to and intersecting the axes of said turrets to the holders of the second turret, driving means having connection with the fruit transfer mechanism cyclically to shift the transfer mechanism back and forth along the track, means to open and close the jaws of the transfer mechanism to grasp and hold and subsequently release fruit from the transfer mechanism, and means actuated by the driving means for imparting to the transfer mechanism adjustable additional travel in said direction over and above that imparted by said driving means.

21. In combination, means providing a first turret having a plurality of spaced apart fruit holders adapted to receive and hold whole fruit, a spaced second turret having a plurality of spaced fruit holders each adapted to receive and hold a half fruit, means for intermittently and synchronously driving said turrets, guide mechanism extending parallel to a plane intersecting and lying parallel to the axes of said turrets, fruit transfer mechanism carried by the guide mechanism and adapted to grasp a fruit held by the fruit holder of the first turret and to transport the fruit to the holders of the second turret, an endless screw disposed parallel to the guide mechanism and having connection with the fruit transfer mechanism cyclically to shift the transfer mechanism back and forth along the guide mechanism, means to open and close the jaws of the transfer mechanism to grasp and hold and subsequently release fruit from the transfer mechanism, a lever pivoted to the transfer mechanism at one end of said lever, said lever having a pivotal connection with the endless screw between its pivotal point and said free end, and adjustable stop means disposed in the path of travel of the free end of said lever for shifting said lever to impart an additional travel to the transfer means.

22. In combination, means providing a first turret having a plurality of spaced apart fruit holders adapted to receive and hold whole fruit, a spaced second turret having a plurality of spaced fruit holders each adapted to receive and hold a half fruit, means for intermittently and synchronously driving said turrets, guide mechanism extending parallel to a plane intersecting and lying parallel to the axes of said turrets, fruit transfer mechanism carried by the guide mechanism and adapted to grasp a fruit held by the fruit holder of the first turret and to transport the fruit to the holders of the second turret, an endless screw disposed parallel to the track mechanism and having connection with the fruit transfer mechanism cyclically to shift the transfer mechanism back and forth along the guide mechanism, means to open and close the jaws of the transfer mechanism to grasp and hold and subsequently release fruit from the transfer mechanism, a lever pivoted to the transfer mechanism at one end of said lever, said lever having a pivotal connection with the endless screw, said connection being disposed between the pivotal point of said lever and the free end of said lever, adjustable stop means disposed in the path of travel of the free end of said lever for shifting said lever to impart an additional travel to the transfer means, and additional stop means in the path of travel of said transfer means disposed at each end of its reciprocative travel.

23. In combination, means providing a first turret having a plurality of spaced apart fruit holders adapted to receive and hold whole fruit, a spaced second turret having a plurality of spaced fruit holders each adapted to receive and hold a half fruit, means for intermittently and synchronously driving said turrets, track mechanism extending parallel to a plane intersecting and lying parallel to the axes of said turrets, fruit transfer mechanism carried by the track mechanism and adapted to grasp a fruit held by the fruit holder of the first turret and to transport the fruit to the holders of the second turret, an endless screw disposed parallel to the track mechanism and having connection with the fruit transfer mechanism cyclically to shift the transfer mechanism back and forth along the track and providing a rest period at the end of the travel in each direction, means to open and close the jaws of the transfer mechanism to grasp and hold and subsequently release fruit from the transfer mechanism, and means providing a longer rest period at the end of each directional travel of the transfer mechanism than is normally imparted by the endless screw for providing additional delay for the fruit transferring action of the transfer means.

24. In combination, fruit transporting means adapted to transport two sections of a cut fruit with their cut faces in confronting relation, a fruit holding turret having radially disposed half fruit holders, means for intermittently rotating the turret to position a pair of half fruit holders on opposite sides of the plane of action of the fruit transporting means, spreading mechanism disposed parallel to and in the plane of action of the fruit transporting means and adapted to be shifted to position to receive on opposite sides of the spreading means the cut faces of each section of the half fruit, and means for shifting the spreading mechanism simultaneously in opposite directions to deposit a half section into each of said fruit receiving means with the cut face thereof exposed, including mechanism for shifting the axis of the fruit at an angle to the axis it occupied when being transported by the transfer mechanism.

25. In an automatic machine the combination of an intermittently rotatable turret having a plurality of spaced apart, radially extending holders each adapted to receive and hold a half fruit, transfer means adapted to move in a straight line parallel to a radial plane of the turret, said transfer means including devices adapted to grasp the opposed curved faces of a peach which has been severed into two sections and to hold the sections with their cut faces confronting and with the longitudinal pit axis horizontal and with the maximum diameter of the pit parallel with said plane, spreading means disposed in said radial plane, said spreading means being adapted to be shifted into parallel relation so as to receive on its opposed faces the cut surface of each of the two halves of fruit carried by the transporting means, and means for shifting the spreading means simultaneously in opposed directions to deposit the halves of fruit in the receiving means of the turret with their cut faces exposed, including means for shifting the peach halves so that the longitudinal axes of the pits lie in the half fruit holding means in a direction radially of the turret.

26. In combination, means providing an intermittently rotatable turret having a plurality of radially extending half fruit holders, means for intermittently rotating said turret, means for transporting a peach severed into two halves with its cut faces confronting and with the pit severed in a plane parallel to the maximum diameter of the pit and with the longitudinal axis of the severed portions of the pit lying parallel to a plane passing radially through the turret, means for translating the peach halves in their said planes, and means for shifting the peach halves out of said plane and for depositing them into adjacent holders of the turret, including means for shifting the cut faces into horizontal planes and for shifting the longitudinal axis of the pits into planes extending radially of the turret while maintaining the longitudinal axis of the pits parallel with a plane lying parallel to and passing through the axis of the turret.

27. In combination, means providing an intermittently rotatable turret having a plurality of radially extending half fruit holders, means for intermittently rotating said turret, means for transporting a peach severed into two halves with its cut faces confronting and with the pit severed in a plane parallel to the maximum diameter of the pit and with the longitudinal axis of the several portions of the pit lying parallel to a plane passing radially through the turret, means for translating the peach halves in their said planes, and a pair of spreaders disposed back to back in vertical, parallel juxtaposition and disposed in the path of translation of the peach halves and onto which the peach halves are deposited by the movement of translation, and means to swing the spreaders downwardly and simultaneously their outer portions outwardly to bodily shift the half peaches and deposit them with their cut faces uppermost and disposed horizontally and with their longitudinal pit axes angularly shifted from the positions they occupied when being translated.

28. In combination, an intermittently rotating turret having a plurality of spaced apart half fruit holders, means for translating a whole fruit severed into halves with the cut faces confronting, a pair of flat plate spreaders disposed with their faces in vertical confronting position in the path of translation of the fruit and onto which each cut face of a half fruit is deposited, a horizontal ledge disposed at the bottom of each flat plate and adapted to receive the lower curved edge of a half fruit for preventing the same from slipping downwardly, a spring clamping member carried by the upper outer edge of each plate, under which the upper curved edge of the half fruit is adapted to enter and whereby said clamping means serves to hold each half fruit upon its vertical plate, and power actuated means synchronized with the periods of rest of said turret for automatically transferring each vertically disposed half fruit into horizontal position in an adjacent fruit holder of the turret, including means for angularly, bodily shifting the half fruit to angularly turn the longitudinal pit axis of such half fruit.

29. In combination, an intermittently rotating turret having a plurality of spaced apart half fruit holders, means for translating a whole fruit severed into halves with the cut faces confronting, a pair of flat plate spreaders disposed with their faces in vertical confronting position in the path of translation of the fruit and onto which each cut face of a half fruit is deposited, a horizontal ledge disposed at the bottom of each flat plate and adapted to receive the lower curved edge of a half fruit for preventing the same from slipping downwardly, a spring clamping member carried by the upper outer edge of each plate, under which the upper curved edge of the half fruit is adapted to enter and whereby said clamping means serves to hold each half fruit upon its vertical plate, power actuated means synchronized with the periods of rest of said turret for automatically transferring each vertically disposed half fruit into horizontal position in an adjacent fruit holder of the turret, including means for angularly, bodily shifting the half fruit to angularly turn the longitudinal pit axis of such half fruit, and means automatically actuated as the half fruit is deposited into each half fruit holder for releasing the spring actuated clamping means to release the half fruit from its plate.

30. In combination, an intermittently rotating turret having a plurality of spaced apart half fruit holders, means for translating a whole fruit severed into halves with the cut faces confronting, a pair of flat plate spreaders disposed with their faces in vertical confronting position in the path of translation of the fruit and onto which each cut face of a half fruit is deposited, a horizontal ledge disposed at the bottom of each flat plate and adapted to receive the lower curved edge of a half fruit for preventing the same from slipping downwardly, a spring clamping member carried by the upper outer edge of each plate, under which the upper curved edge of the half fruit is adapted to enter and whereby said clamping means serves to hold each half fruit upon its vertical plate, power actuated means synchronized with the periods of rest of said turret for automatically transferring each vertically disposed half fruit into horizontal position in an adjacent fruit holder of the turret, including means for angularly, bodily shifting the half fruit to angularly turn the longitudinal pit axis of such half fruit, means automatically actuated as the half fruit is deposited into each half fruit holder for releasing the spring actuated clamping means to release the half fruit from its plate, and means automatically actuated by the deposit of each half fruit into its receiving means for forcibly ejecting the half fruit from its plate.

31. In combination, an intermittently actuated turret having a plurality of spaced apart holding means each adapted to receive a half fruit and to hold a half fruit in horizontal position with its cut face uppermost, means for translating a whole fruit with a vertical line of severance therethrough to provide two confronting cut halves with the pits thereof likewise severed, spreader means comprising a pair of plates adapted to be shifted to vertical confronting position to receive the cut face of a half fruit on a surface of each, releasable means shiftable relatively to each plate for temporarily holding the half fruit in said vertical position, means for shifting each plate to bodily shift each half fruit to a horizontal position and within a receiving means of the turret, and means for releasing the fruit holding means upon deposition of the half fruit into its receiving means.

32. In combination, an intermittently actuated turret having a plurality of spaced apart holding means each adapted to receive a half fruit and to hold a half fruit in horizontal position with its cut face uppermost, means for translating a whole fruit with a vertical line of severance therethrough to provide two confronting cut halves with the pits thereof likewise severed, spreader means comprising a pair of plates adapted to be shifted to vertical confronting position to receive the cut face of a half fruit on a surface of each, means for temporarily holding the half fruit on each spreader plate, means for shifting each plate to bodily shift each half fruit to a horizontal position and within a receiving means of the turret, means for releasing the fruit holding means upon deposition of the half fruit into its receiving means, and means for forcibly discharging the half fruit from its plate-like member to prevent sticking thereto as the half fruit is deposited into its receiving means.

33. In combination, an intermittently rotating turret having a plurality of spaced apart half fruit receiving means each adapted to receive and hold a half fruit, means for translating a whole fruit severed into halves and lying with their cut faces extending parallel to a vertical plane, means for simultaneously depositing each half section onto a shiftable member, relatively shiftable element for clamping a section on a shiftable member, means for shifting said member from a vertical position to a horizontal position to deposit the half section into one of the receiving means, and means acting concurrently with the deposition of said half section into its receiving means for positively discharging the same from its shifting member and for relatively shifting said elements to release a section from a shiftable member.

34. In combination, an intermittently rotating turret having a plurality of spaced apart half fruit receiving means each adapted to receive and hold a half fruit, means for translating a whole fruit severed into halves and lying with their cut faces extending parallel to a vertical plane, means for simultaneously depositing each half section onto a shiftable member, a pair of spreader plates disposed with their faces vertical and back to back and lying in a parallel, vertical plane and adapted to receive on their opposite faces the cut face of a half fruit section, a pair of spaced apart short shafts horizontally disposed, a short arm on the outer end of each shaft, a bearing on the outer end of said arm, a second short shaft in said bearing, one end of said short shaft having a block carrying one of said plates, the outer end of the second short shaft having an additional bearing therein, a second shaft carried by said second bearing, a friction roller carried by said last mentioned shaft, a cam plate disposed normally to the vertical plane of said spreader plate and having a cam slot adapted to receive said friction roller, and means for synchronously actuating said first mentioned pair of short shafts for shifting said spreader plates simultaneously and in opposite directions from a vertical plane to a horizontal plane and whereby said cam slot will diagonally shift said spreader plates in a direction substantially radially through the axis of the turret.

35. In combination, an intermittently rotating turret having a plurality of spaced apart half fruit receiving means each adapted to receive and hold a half fruit, means for translating a whole fruit severed into halves and lying with their cut faces extending parallel to a vertical plane, means for simultaneously depositing each half section onto a shiftable member, a pair of spreader plates disposed with their faces vertical and back to back and lying in a parallel, vertical plane and adapted to receive on their opposite faces the cut face of a half fruit section, a pair of spaced apart short shafts horizontally disposed, a short arm on the outer end of each shaft, a bearing on the outer end of said arm, a second short shaft in said bearing, one end of said short shaft having a block carrying one of said plates, the outer end of the second short shaft having an additional bearing therein, a second shaft carried by said second bearing, a friction roller carried by said last mentioned shaft, a cam plate disposed normally to the vertical plane of said spreader plate and having a cam slot adapted to receive said friction roller, means for synchronously actuating said first mentioned pair of short shafts for shifting said spreader plates simultaneously and in opposite directions from a vertical plane to a horizontal plane and whereby said cam slot will diagonally shift said spreader plates in a direction substantially radially through the axis of the turret, a fruit discharging ejector pivotally mounted on each spreader plate and having a toe, an abutment disposed in the path of movement of the toe whereby upon the lowering of said spreader plate said ejector will be actuated to dislodge the half peach from the spreader plate, a spring pressed fruit holding member carried by said plate including a toe, and a second abutment disposed in the path of movement of said toe whereby upon lowering of said spreader plate said clamping member will be released to permit the deposit of the half section into said receiving member.

36. In combination, a rotating saw, means for holding the whole peach, means for shifting the saw into contact with the whole peach while thus held whereby to sever the peach in a plane parallel to and substantially adjacent the suture plane of the peach, conveying means adapted to grasp the severed portions of the whole peach and for transporting said portions across opposite sides of the rotating saw, and means for shifting the saw in the direction of movement of the transporting means.

37. In combination, means for holding a whole peach, an actuatable cutting means, means for rotating the cutting means to cause the same to cut through flesh and pit of the whole peach while held in the holding means, said holding means and cutting means cooperating to sever all of the whole peach except a chordal portion thereof, conveying means adapted to grasp the severed portions of the peach and for transporting the peach from the holding means across opposite sides of the cutting means, and means for shifting the cutting means in the direction of movement of the transporting means but at a slower rate of speed, whereby the differential movement of the cutter and the transporting means will effect the completion of the severance of the flesh of the peach.

38. In combination, a guideway, means comprising an endless screw disposed parallel to the guideway, transfer mechanism movable back and forth a predetermined distance along the guideway by said endless screw, said transfer mechanism including shiftable jaws, means to open and close the jaws of the transfer mechanism to grasp and close and subsequently release objects from the transfer mechanism, and means disposed between the endless screw and the transfer means for providing an additional travel along said guideway to the transfer mechanism over and above the travel given to it by the endless screw.

39. In combination, means for translating a whole fruit severed into halves with the cut faces confronting, a pair of flat plate spreaders disposed with their faces in vertical conforming position in the path of translation of the fruit upon which a cut face of a half fruit is deposited, means carried by each said plate for yieldingly engaging an outer curved wall portion of the half fruit whereby to hold clampingly each such half fruit upon its vertical plate, and power actuated means for automatically transferring each vertically disposed plate and the half fruit into substantially horizontal position to deposit the half fruit in a fruit holding means.

40. In combination, means for translating a whole fruit severed into halves with the cut faces confronting, a pair of flat spreader plates disposed with their faces in vertical conforming position in the path of translation of the fruit and upon which each cut face of a half fruit is deposited, shiftable fruit clamping means carried by each said spreader plate for yieldingly engaging an outer curved wall portion of the half fruit whereby yieldingly to hold each such half fruit upon its spreader plate, and power actuated means for automatically transferring each vertically disposed plate and the half fruit into substantially horizontal position to deposit the half fruit in a fruit holding means, and means automatically releasing said fruit engaging means to permit the free deposit of the fruit in said holding means.

41. In combination, means for translating a whole fruit severed into halves with the cut faces confronting, a pair of flat spreader plates disposed with their faces in vertical conforming position in the path of translation of the fruit and upon which each cut face of a half fruit is deposited, relatively shiftable fruit clamping means carried by each said spreader plate for yieldingly engaging an outer curved wall portion of the half fruit whereby yieldingly to hold each such half fruit upon its spreader plate, and power actuated means for automatically shifting each vertically disposed plate and the half fruit into substantially horizontal position to deposit the half fruit in a fruit holding means, and means for positively discharging the fruit from said spreader plates onto said fruit holding means.

42. In combination, means for translating a whole fruit severed into halves with the cut faces confronting, a pair of flat spreader plates disposed with their faces in vertical conforming position in the path of translation of the fruit and upon which each cut face of a half fruit is deposited, yieldable, clamping means carried by each said spreader plate for yieldingly engaging an outer curved wall portion of the half fruit to hold each such half fruit upon its spreader plate, and power actuated means for automatically shifting each vertically disposed plate and the half fruit into substantially horizontal position to deposit the half fruit in a fruit holding means, and means automatically actuated to release said yieldable clamping means and also positively to eject the fruit from the spreader onto said holding means.

43. In combination, means for translating a whole fruit severed into halves with the cut faces confronting, a pair of flat spreader plates disposed with their faces in vertical conforming position in the path of translation of the fruit and upon which each cut face of a half fruit is deposited, clamping means yieldably and shiftably carried by each said spreader plate for yieldingly engaging an outer curved wall portion of the half fruit to clamp yieldably each such half fruit upon its spreader plate, and power actuated means for automatically shifting each vertically disposed plate and the half fruit into substantially horizontal position to deposit the half fruit in a fruit holding means, means to automatically release said clamping means to release said fruit from said spreader plates, a fruit ejector carried by said spreader, and means for automatically actuating said ejecting means for discharging said fruit from said spreader plate.

44. In combination, an intermittently actuated turret having a plurality of spaced apart holding means each adapted to receive a half fruit and to hold a half fruit in horizontal position with its cut face uppermost, means for translating a whole fruit with a vertical line of severance therethrough to provide two confronting cut halves with the pits thereof likewise severed, spreader means comprising a pair of plates adapted to be shifted to vertical confronting position to receive the cut face of a half fruit on a surface of each, relatively shiftable means on each plate for temporarily clamping the half fruit thereon, means for shifting each plate to bodily shift each half fruit to a horizontal position and within a receiving means of the turret, and means for releasing the fruit clamping means upon deposition of the half fruit into its receiving means, and means shiftably mounted on each spreader plate and adapted upon actuation to eject a half fruit from said spreader plate.

45. In combination, an intermittently actuated turret having a plurality of spaced apart holding means each adapted to receive a half fruit and to hold a half fruit in horizontal position with its cut face uppermost, means for translating a whole fruit with a vertical line of severance therethrough to provide two confronting cut halves with the pits thereof likewise severed, spreader means comprising a pair of plates adapted to be shifted to vertical confronting position to receive the cut face of a half fruit on the outside surface of each, means for temporarily holding the half fruit in said vertical position, means for shifting each plate to bodily shift each half fruit to a horizontal position and within a receiving means of the turret, means for releasing the fruit holding means upon deposition of the half fruit into its receiving means, and means for forcibly discharging the half fruit from its plate-like member to prevent sticking thereto as the half fruit is deposited into its receiving means, said means comprising a lever pivotally mounted on said plate and adapted upon actuation thereof to have one end strike the fruit to discharge it from said plate.

46. In a machine for treating peaches, a peach feeding turret, means on said turret providing shiftably mounted peach gripping members having spaced portions to engage opposite sides of the peach in the plane of its suture to prevent movement of the peach transversely to its suture plane whereby to hold the peach with its suture in predetermined position for the action of cutting means and peach cutting means positioned to cut through the peach in a plane lying parallel to and substantially coinciding with the suture plane of the peach.

47. In a devise for treating half fruit, the combination of a turret having radially extending angularly spaced cups, means for conveying halves of peaches with their cut faces in confronting relation along a plane between adjacent cups, said plane extending parallel to and substantially intersecting the axis of the turret and half fruit spreader means for revolving the peach halves about axes which lie closer to one end of the suture axis than to the other to position the peach halves in the adjacent cups with their suture axes extending radially of the turret.

48. In a device of the class described, the combination of a turret having angularly spaced radially extending peach cups, peach conveying means for transferring peach halves with their faces in confronting relation and lying in planes substantially parallel to a vertical plane, and with the planes of their suture axes substantially parallel to a plane passing through and lying parallel to the axis of a turret intermediate of two adjacent angularly disposed cups and spreader means adapted to revolve the peach halves from their former planes to a position such that each peach half is disposed into a cup with the cut face of each peach half lying substantially horizontal and with the suture axis of each peach half extending substantially radially of the turret.

RAYMOND L. EWALD.
HENRY A. SKOG.

CERTIFICATE OF CORRECTION.

Patent No. 2,280,813.  April 28, 1942.

RAYMOND L. EWALD, ET AL.

It is hereby certified that error appears in the printed specification of the above numbered patent requiring correction as follows: Page 5, second column, line 5, for "housing" read --holding--; page 8, first column, line 68, for "horizontl" read --horizontal--; page 9, second column, line 66, for "51" read --56--; line 69, before "formed" insert --, Figs. 47 to 51,--; page 11, first column, line 66, for the reference numeral "722" read --772--; page 13, first column, line 47, for "web 272'" read --web 772'--; page 17, second column, line 36, for "439" read --438--; page 22, second column, line 8, claim 15, for "peach" read --whole fruit--; page 25, second column, line 46, claim 33, for "element" read --elements--; page 27, second column, line 31, claim 47, for "devise" read --device--; and that the said Letters Patent should be read with this correction therein that the same may conform to the record of the case in the Patent Office.

Signed and sealed this 12th day of January, A. D. 1943.

(Seal)

Henry Van Arsdale,
Acting Commissioner of Patents.